(12) United States Patent
Tanaka et al.

(10) Patent No.: US 9,844,960 B2
(45) Date of Patent: Dec. 19, 2017

(54) RECORDING APPARATUS AND RECORDING METHOD

(71) Applicant: CANON KABUSHIKI KAISHA, Tokyo (JP)

(72) Inventors: Hirokazu Tanaka, Inagi (JP); Gou Sasaki, Kawasaki (JP); Tsukasa Doi, Tokyo (JP); Satoshi Seki, Kawasaki (JP); Fumiko Suzuki, Kawasaki (JP); Mayuko Yamagata, Inagi (JP); Kiichiro Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/226,726

(22) Filed: Aug. 2, 2016

(65) Prior Publication Data
US 2017/0036466 A1 Feb. 9, 2017

(30) Foreign Application Priority Data

Aug. 7, 2015 (JP) .................. 2015-157605
Aug. 7, 2015 (JP) .................. 2015-157607
Aug. 7, 2015 (JP) .................. 2015-157712
Aug. 7, 2015 (JP) .................. 2015-157713

(51) Int. Cl.
| | |
|---|---|
| *B41J 2/21* | (2006.01) |
| *B41J 19/14* | (2006.01) |
| *B41J 25/00* | (2006.01) |
| *G06K 15/10* | (2006.01) |
| *B41J 15/04* | (2006.01) |

(52) U.S. Cl.
CPC .......... *B41J 25/001* (2013.01); *B41J 2/2132* (2013.01); *B41J 15/044* (2013.01); *B41J 19/142* (2013.01); *B41J 19/145* (2013.01); *G06K 15/107* (2013.01)

(58) Field of Classification Search
CPC ....... B41J 2/2132; B41J 19/142; B41J 19/145
See application file for complete search history.

(56) References Cited

U.S. PATENT DOCUMENTS

| | | | | |
|---|---|---|---|---|
| 6,099,104 | A * | 8/2000 | Sato | B41J 2/04581 347/15 |
| 2009/0002417 | A1* | 1/2009 | Uji | B41J 2/2132 347/12 |
| 2010/0060683 | A1* | 3/2010 | Edamura | B41J 2/04541 347/9 |
| 2012/0044287 | A1 | 2/2012 | Yamaguchi et al. | |

(Continued)

FOREIGN PATENT DOCUMENTS

| | | |
|---|---|---|
| CN | 1975764 A | 6/2007 |
| CN | 101002507 A | 7/2007 |

(Continued)

*Primary Examiner* — Jason Uhlenhake
(74) *Attorney, Agent, or Firm* — Canon U.S.A., Inc. IP Division

(57) ABSTRACT

The driving order of driving blocks is controlled so that ink landing positions from driving blocks differ from each other in multiple scans. Recording data is generated so that, of pixels where ink is discharged in one scan, the number of pixels adjacent at both sides in the scanning direction to pixels where ink is discharged in another scan is greater than the number of pixels not adjacent at both sides in the scanning direction to pixels where ink is discharged the other scan.

17 Claims, 66 Drawing Sheets

(56) References Cited

U.S. PATENT DOCUMENTS

2015/0158289 A1 6/2015 Marumoto et al.
2015/0183213 A1 7/2015 Baba et al.

FOREIGN PATENT DOCUMENTS

| CN | 101130299 A | 2/2008 |
|---|---|---|
| EP | 0564252 B1 | 9/2003 |
| JP | 2003-175592 A | 6/2003 |
| JP | 2004-122629 A | 4/2004 |
| JP | 2006-159798 A | 6/2006 |
| JP | 2013-159017 A | 8/2013 |

* cited by examiner

FIG. 6

|  | | DISCHARGE ORIFICE ROW | |
|---|---|---|---|
|  | | 2 pl | 5 pl |
| DATA | 0 | 0 | × |
|  | 1 | 1 | × |
|  | 2 | 2 | × |

FIG. 9A

| 700 | 701 | 702 | 703 |
|---|---|---|---|
| 704 | 705 | 706 | 707 |
| 708 | 709 | 710 | 711 |
| 712 | 713 | 714 | 715 |

FIG. 9B
<IMAGE DATA>

| 2 | 1 | 0 | 0 |
|---|---|---|---|
| 2 | 1 | 0 | 0 |
| 2 | 1 | 0 | 0 |
| 2 | 1 | 0 | 0 |

FIG. 9C1
<MASK PATTERN>

| 2 | 1 | 0 | 0 |
|---|---|---|---|
| 0 | 2 | 1 | 0 |
| 0 | 0 | 2 | 1 |
| 1 | 0 | 0 | 2 |

| 1 | 0 | 0 | 2 |
|---|---|---|---|
| 2 | 1 | 0 | 0 |
| 0 | 2 | 1 | 0 |
| 0 | 0 | 2 | 1 |

| 0 | 0 | 2 | 1 |
|---|---|---|---|
| 1 | 0 | 0 | 2 |
| 2 | 1 | 0 | 0 |
| 0 | 2 | 1 | 0 |

| 0 | 2 | 1 | 0 |
|---|---|---|---|
| 0 | 0 | 2 | 1 |
| 1 | 0 | 0 | 2 |
| 2 | 1 | 0 | 0 |

MP4

FIG. 9D1
<RECORDING DATA>

| 1 | 1 | 0 | 0 |
|---|---|---|---|
| 0 | 0 | 0 | 0 |
| 0 | 0 | 0 | 0 |
| 1 | 0 | 0 | 0 |

FIG. 9D2

| 1 | 0 | 0 | 0 |
|---|---|---|---|
| 1 | 1 | 0 | 0 |
| 0 | 0 | 0 | 0 |
| 0 | 0 | 0 | 0 |

FIG. 9D3

| 0 | 0 | 0 | 0 |
|---|---|---|---|
| 1 | 0 | 0 | 0 |
| 1 | 1 | 0 | 0 |
| 0 | 0 | 0 | 0 |

FIG. 9D4

| 0 | 0 | 0 | 0 |
|---|---|---|---|
| 0 | 0 | 0 | 0 |
| 1 | 0 | 0 | 0 |
| 1 | 1 | 0 | 0 |

FIG. 9E
LOGICAL SUM OF RECORDING DATA (NUMBER OF TIMES OF INK DISCHARGE)

| 2 | 1 | 0 | 0 |
|---|---|---|---|
| 2 | 1 | 0 | 0 |
| 2 | 1 | 0 | 0 |
| 2 | 1 | 0 | 0 |

FIG. 10

| ○ : RECORDED<br>× : NOT RECORDED | | CODE VALUE OF MASK PATTERN | | |
|---|---|---|---|---|
| | | 0 | 1 | 2 |
| PIXEL VALUE OF IMAGE DATA | 0 | × | × | × |
| | 1 | × | ○ | × |
| | 2 | × | ○ | ○ |

FIG. 11A
| | DRIVING ORDER | DRIVING BLOCK NO. |
|---|---|---|
| DRIVING ORDER | 1 | 1 |
| | 2 | 2 |
| | 3 | 3 |
| | 4 | 4 |
| | 5 | 5 |
| | 6 | 6 |
| | 7 | 7 |
| | 8 | 8 |
| | 9 | 9 |
| | 10 | 10 |
| | 11 | 11 |
| | 12 | 12 |
| | 13 | 13 |
| | 14 | 14 |
| | 15 | 15 |
| | 16 | 16 |
FIG. 11B
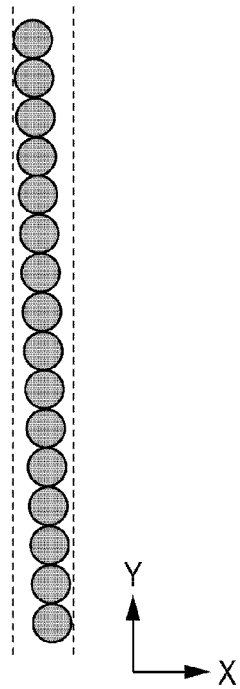
FIG. 11C
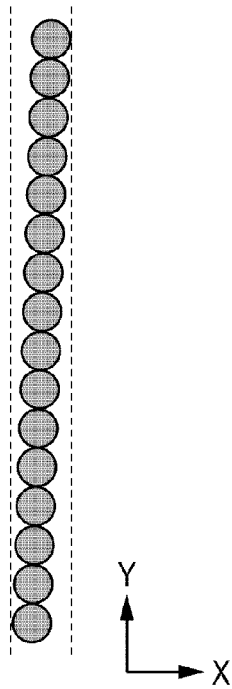

FIG. 12A1
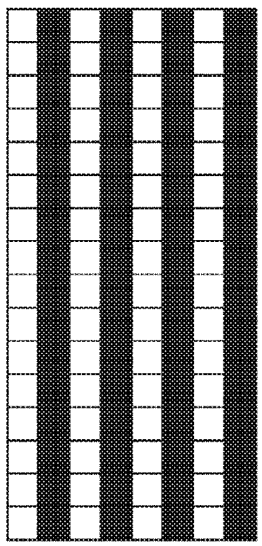
FIG. 12A2
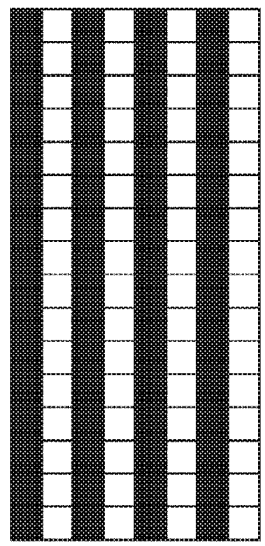
FIG. 12C
| | DRIVING ORDER | DRIVING BLOCK NO. |
|---|---|---|
| DRIVING ORDER A | 1 | 1 |
| | 2 | 2 |
| | 3 | 3 |
| | 4 | 4 |
| | 5 | 5 |
| | 6 | 6 |
| | 7 | 7 |
| | 8 | 8 |
| | 9 | 9 |
| | 10 | 10 |
| | 11 | 11 |
| | 12 | 12 |
| | 13 | 13 |
| | 14 | 14 |
| | 15 | 15 |
| | 16 | 16 |
FIG. 12B1
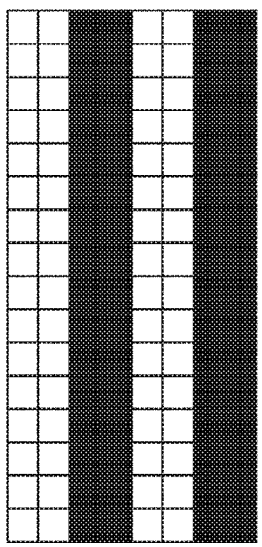
FIG. 12B2
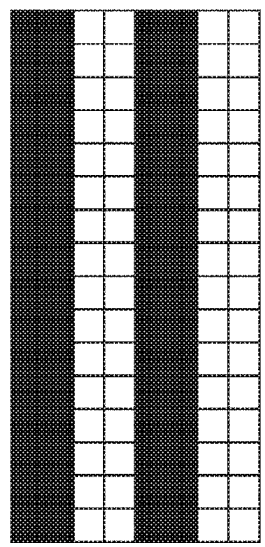
FIG. 12D
| | DRIVING ORDER | DRIVING BLOCK NO. |
|---|---|---|
| DRIVING ORDER B | 1 | 16 |
| | 2 | 15 |
| | 3 | 14 |
| | 4 | 13 |
| | 5 | 12 |
| | 6 | 11 |
| | 7 | 10 |
| | 8 | 9 |
| | 9 | 8 |
| | 10 | 7 |
| | 11 | 6 |
| | 12 | 5 |
| | 13 | 4 |
| | 14 | 3 |
| | 15 | 2 |
| | 16 | 1 |
FIG. 12E
| | RECORDING DATA | | DRIVING ORDER | |
|---|---|---|---|---|
| | FORWARD SCAN | BACKWARD SCAN | FORWARD SCAN | BACKWARD SCAN |
| FIRST SET | (b1) | (b2) | (c) | (d) |
| SECOND SET | (a1) | (a2) | (c) | (d) |
| THIRD SET | (b1) | (b2) | (c) | (c) |
| FOURTH SET | (a1) | (a2) | (c) | (c) |

FIG. 18A
| DRIVING ORDER | DRIVING ORDER | DRIVING BLOCK NO. |
|---|---|---|
| DRIVING ORDER | 1 | 1 |
| | 2 | 9 |
| | 3 | 6 |
| | 4 | 14 |
| | 5 | 3 |
| | 6 | 11 |
| | 7 | 8 |
| | 8 | 16 |
| | 9 | 5 |
| | 10 | 13 |
| | 11 | 2 |
| | 12 | 10 |
| | 13 | 7 |
| | 14 | 15 |
| | 15 | 4 |
| | 16 | 12 |
FIG. 18B
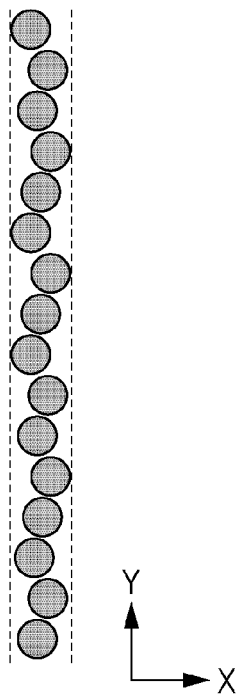
FIG. 18C
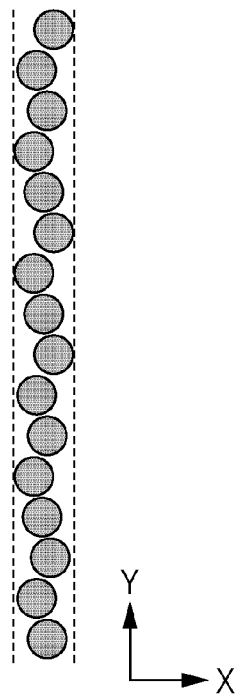

FIG. 22A
| DRIVING ORDER | DRIVING BLOCK NO. |
|---|---|
| 1 | 1 |
| 2 | 9 |
| 3 | 6 |
| 4 | 14 |
| 5 | 3 |
| 6 | 11 |
| 7 | 8 |
| 8 | 16 |
| 9 | 5 |
| 10 | 13 |
| 11 | 2 |
| 12 | 10 |
| 13 | 7 |
| 14 | 15 |
| 15 | 4 |
| 16 | 12 |
FIG. 22B
| DRIVING ORDER | DRIVING BLOCK NO. |
|---|---|
| 1 | 12 |
| 2 | 4 |
| 3 | 15 |
| 4 | 7 |
| 5 | 10 |
| 6 | 2 |
| 7 | 13 |
| 8 | 5 |
| 9 | 16 |
| 10 | 8 |
| 11 | 11 |
| 12 | 3 |
| 13 | 14 |
| 14 | 6 |
| 15 | 9 |
| 16 | 1 |
FIG. 22C
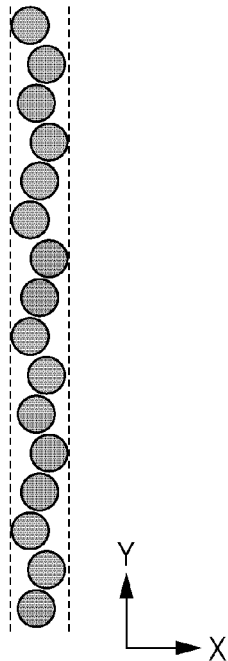
FIG. 22D
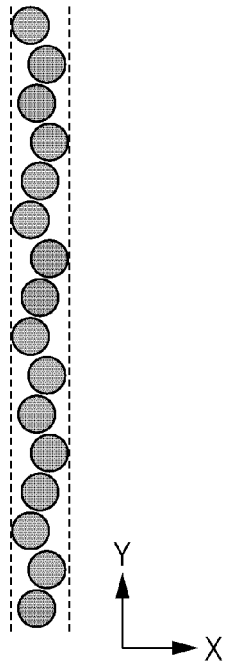

FIG. 28A
| DRIVING ORDER | DRIVING BLOCK NO. |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
FIG. 28B
| DRIVING ORDER | DRIVING BLOCK NO. |
|---|---|
| 1 | 8 |
| 2 | 7 |
| 3 | 6 |
| 4 | 5 |
| 5 | 4 |
| 6 | 3 |
| 7 | 2 |
| 8 | 1 |
| 9 | 16 |
| 10 | 15 |
| 11 | 14 |
| 12 | 13 |
| 13 | 12 |
| 14 | 11 |
| 15 | 10 |
| 16 | 9 |
FIG. 28C
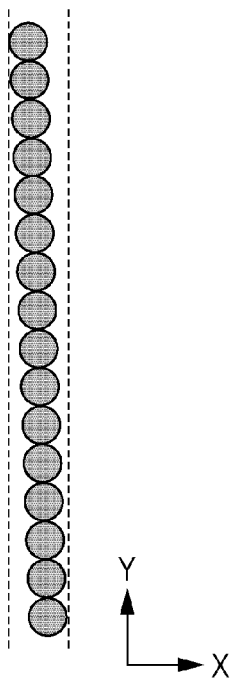
FIG. 28D
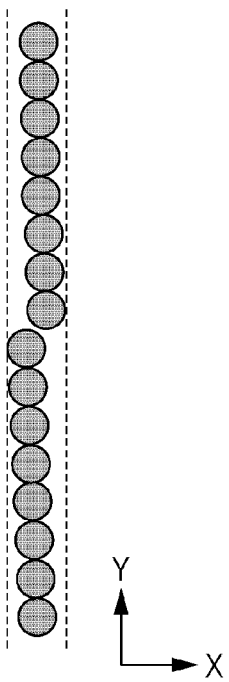

FIG. 31A
| | | DISCHARGE ORIFICE ROW | | |
|---|---|---|---|---|
| | | 1 pl | 2 pl | 5 pl |
| DATA | 0 | 0 | × | × |
| | 1 | 1 | × | × |
| | 2 | 2 | × | × |
| | 3 | 3 | × | × |
| | 4 | 4 | × | × |
FIG. 31B
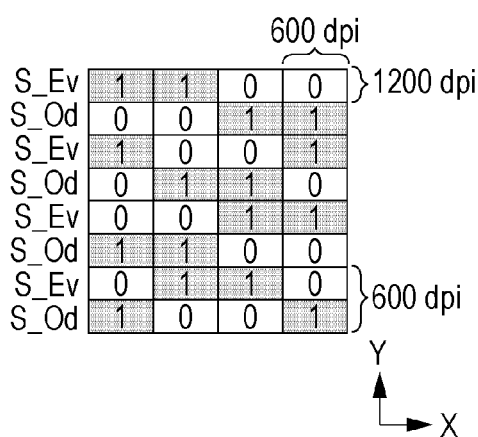
FIG. 31C
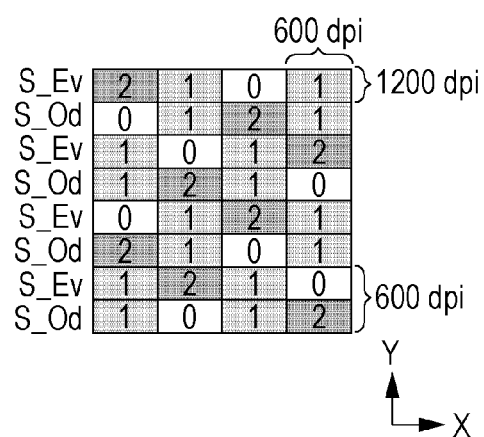
FIG. 31D
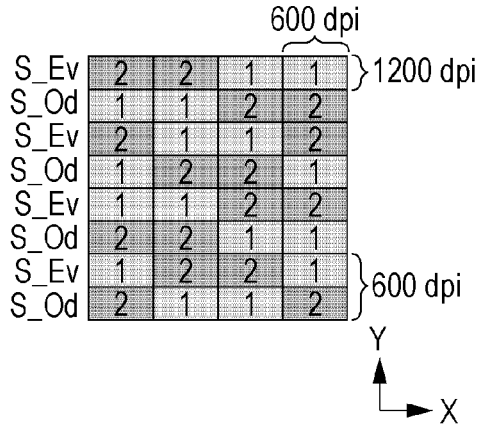
FIG. 31E
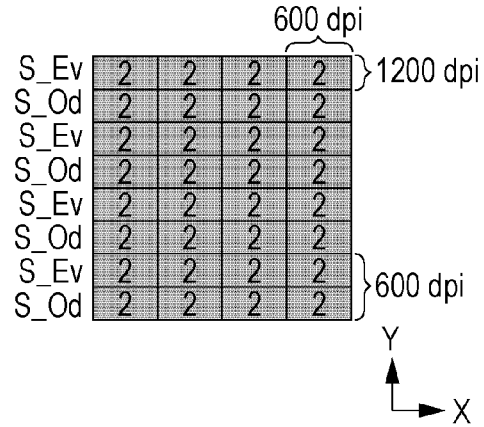

FIG. 33A
| DRIVING ORDER | DRIVING BLOCK NO. |
|---|---|
| 1 | 2 |
| 2 | 10 |
| 3 | 7 |
| 4 | 15 |
| 5 | 4 |
| 6 | 12 |
| 7 | 9 |
| 8 | 1 |
| 9 | 6 |
| 10 | 14 |
| 11 | 3 |
| 12 | 11 |
| 13 | 8 |
| 14 | 16 |
| 15 | 5 |
| 16 | 13 |
FIG. 33B
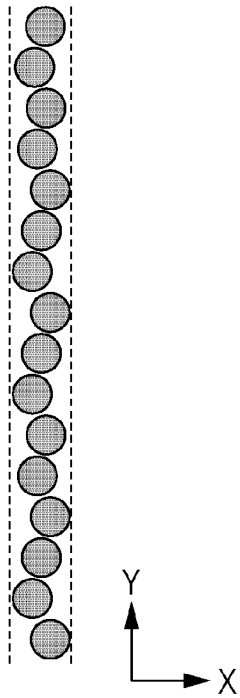
FIG. 33C
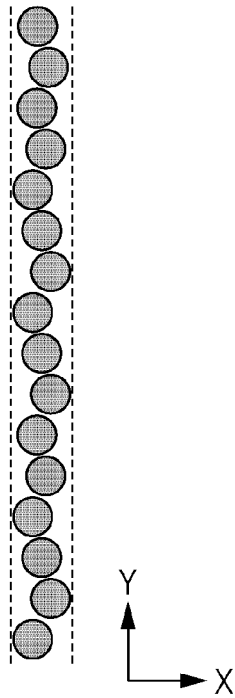

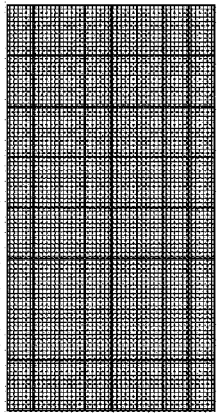
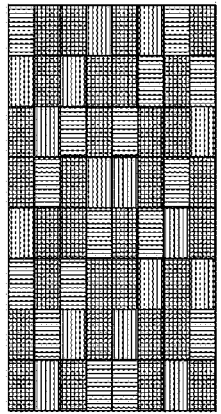
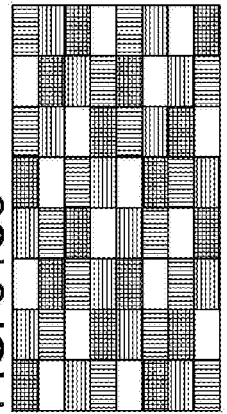
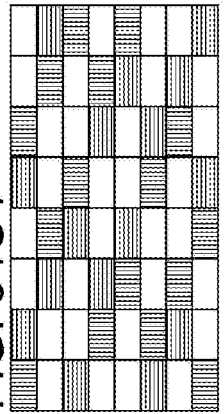
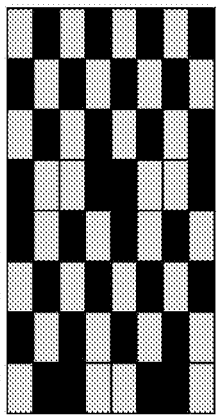
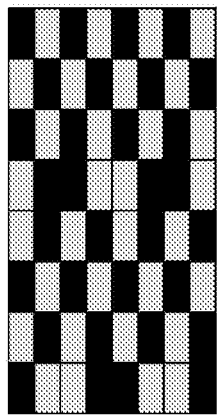

FIG. 46A

| | | DISCHARGE ORIFICE ROW | | |
|---|---|---|---|---|
| | | 1pl | 2pl | 5pl |
| DATA M3 | 0 | 0 | × | × |
| | 1 | 1 | × | × |
| | 2 | 2 | × | × |
| | 3 | 3 | × | × |
| | 4 | 4 | × | × |

FIG. 46B

| | | | | | |
|---|---|---|---|---|---|
| S_Ev | 0 | 0 | 1 | 1 | ) 1200 dpi |
| S_Od | 1 | 1 | 0 | 0 | |
| S_Ev | 0 | 1 | 1 | 0 | |
| S_Od | 1 | 0 | 0 | 1 | |
| S_Ev | 1 | 1 | 0 | 0 | |
| S_Od | 0 | 0 | 1 | 1 | |
| S_Ev | 1 | 0 | 0 | 1 | |
| S_Od | 0 | 1 | 1 | 0 | ) 600dpi |

FIG. 46C

| | | | | | |
|---|---|---|---|---|---|
| S_Ev | 0 | 1 | 2 | 1 | ) 1200 dpi |
| S_Od | 2 | 1 | 0 | 1 | |
| S_Ev | 1 | 2 | 1 | 0 | |
| S_Od | 1 | 0 | 1 | 2 | |
| S_Ev | 2 | 1 | 0 | 1 | |
| S_Od | 0 | 1 | 2 | 1 | |
| S_Ev | 1 | 0 | 1 | 2 | |
| S_Od | 1 | 2 | 1 | 0 | ) 600 dpi |

FIG. 46D

| | | | | | |
|---|---|---|---|---|---|
| S_Ev | 1 | 1 | 2 | 2 | ) 1200 dpi |
| S_Od | 2 | 2 | 1 | 1 | |
| S_Ev | 1 | 2 | 2 | 1 | |
| S_Od | 2 | 1 | 1 | 2 | |
| S_Ev | 2 | 2 | 1 | 1 | |
| S_Od | 1 | 1 | 2 | 2 | |
| S_Ev | 2 | 1 | 1 | 2 | |
| S_Od | 1 | 2 | 2 | 1 | ) 600dpi |

FIG. 46E

| | | | | | |
|---|---|---|---|---|---|
| S_Ev | 2 | 2 | 2 | 2 | ) 1200 dpi |
| S_Od | 2 | 2 | 2 | 2 | |
| S_Ev | 2 | 2 | 2 | 2 | |
| S_Od | 2 | 2 | 2 | 2 | |
| S_Ev | 2 | 2 | 2 | 2 | |
| S_Od | 2 | 2 | 2 | 2 | |
| S_Ev | 2 | 2 | 2 | 2 | |
| S_Od | 2 | 2 | 2 | 2 | ) 600dpi |

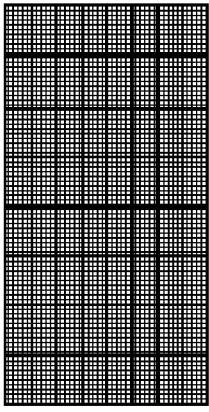
FIG. 48C1
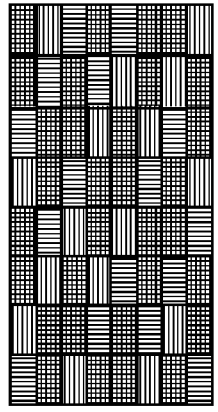
FIG. 48C2
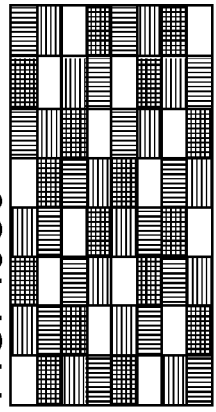
FIG. 48C3
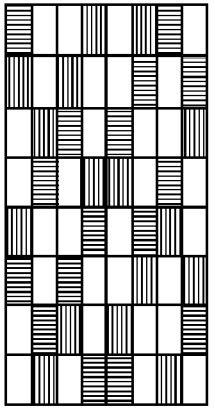
FIG. 48C4
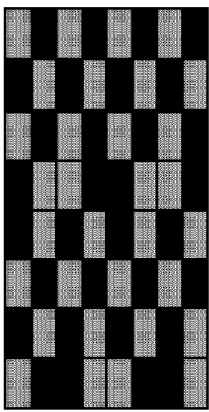
FIG. 48B1
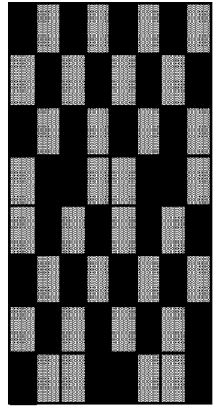
FIG. 48B2

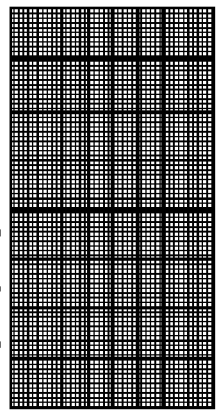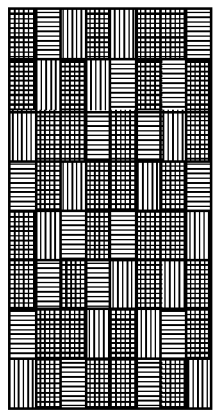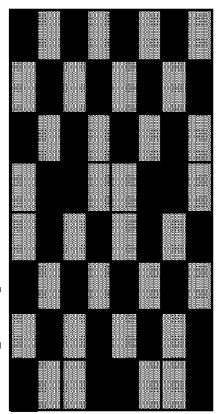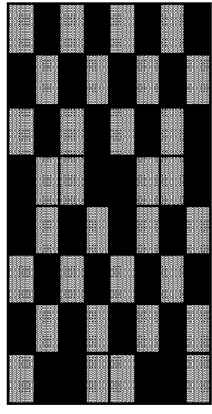

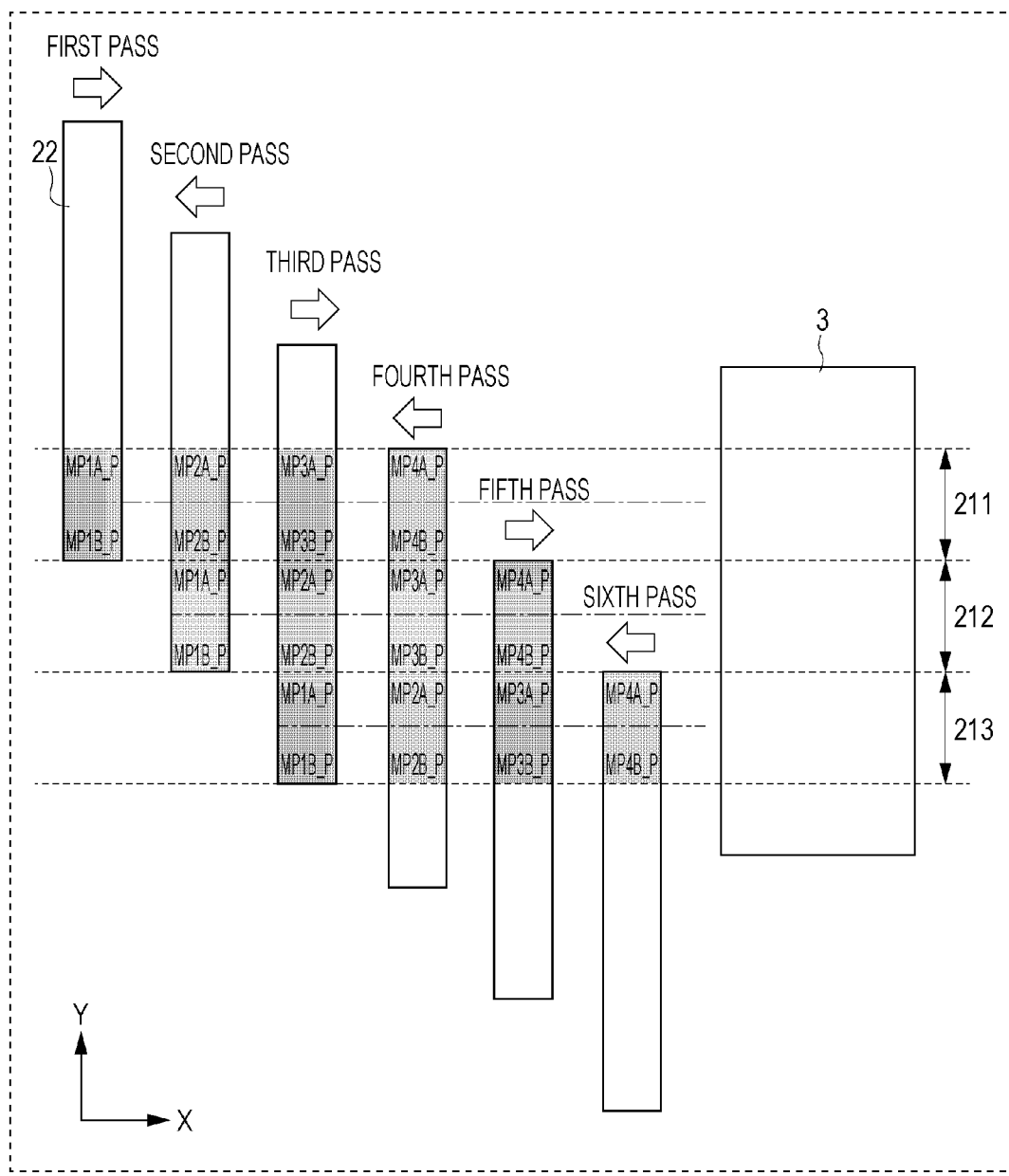

FIG. 63A
| DRIVING ORDER | DRIVING BLOCK NO. |
|---|---|
| 1 | 1 |
| 2 | 5 |
| 3 | 9 |
| 4 | 13 |
| 5 | 2 |
| 6 | 6 |
| 7 | 10 |
| 8 | 14 |
| 9 | 3 |
| 10 | 7 |
| 11 | 11 |
| 12 | 15 |
| 13 | 4 |
| 14 | 8 |
| 15 | 12 |
| 16 | 16 |
(leftmost column label: DRIVING ORDER)
FIG. 63B
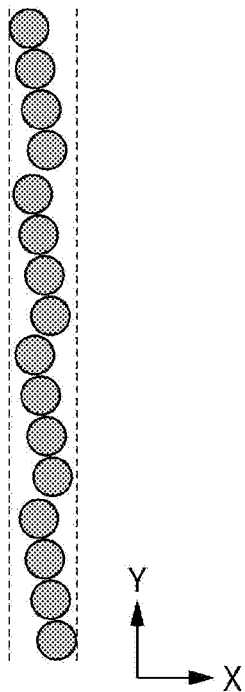
FIG. 63C
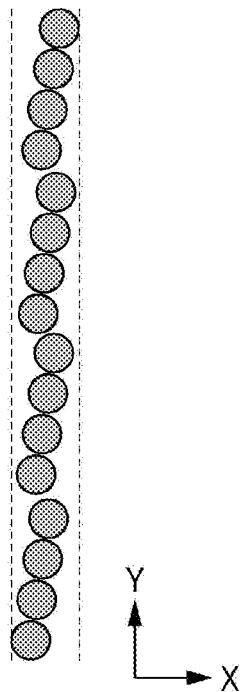

MP1A_P + MP3A_P
← BOUNDARY
MP1C_P + MP3C_P

MP2A_P + MP4A_P
← BOUNDARY
MP2C_P + MP4C_P

MP1A_P TO MP4A_P
← BOUNDARY
MP1C_P TO MP4C_P

FIG. 67

| O : RECORDING<br>× : NON-RECORDING | | CODE VALUE OF MASK PATTERN | | | | | | | |
|---|---|---|---|---|---|---|---|---|---|
| | | 0 | 1 | 2 | 3 | 4 | 5 | 6 | 7 |
| PIXEL VALUE OF IMAGE DATA | 0 | × | × | × | × | × | × | × | × |
| | 1 | × | × | × | × | × | × | × | O |
| | 2 | × | × | × | × | × | × | O | O |
| | 3 | × | × | × | × | × | O | O | O |
| | 4 | × | × | × | × | O | O | O | O |
| | 5 | × | × | × | O | O | O | O | O |
| | 6 | × | × | O | O | O | O | O | O |
| | 7 | × | O | O | O | O | O | O | O |

RECORDING APPARATUS AND RECORDING METHOD

BACKGROUND OF THE INVENTION

Field of the Invention

The present invention relates to a recording apparatus and a recording method.

Description of the Related Art

There is conventionally known a recording apparatus that records images by discharging ink onto a recording medium by driving recording elements, using a recording head having a recording element row where multiple recording elements that generate energy for discharging ink are arrayed. There also is known so-called multi-pass recording in such recording apparatuses, where multiple recording scans are performed as to a unit region to form images.

It is known as of recent in such multi-pass recording to generate recording data using image data expressed as multi-bit information that stipulates how many times ink is to be discharged to each pixel, and multiple mask patterns expressed as multi-bit information that stipulates how many times ink is permitted to be discharged to each pixel, corresponding to multiple scans. For example, Japanese Patent Laid-Open No. 2003-175592 discloses generating recording data using image data and mask patterns each expressed as 2-bit information.

On the other hand, there is commonly known the so-called time-division driving method for a driving methods of multiple recording elements within a recording element row, where the multiple recording elements are divided into multiple driving blocks, and the recording elements belonging to different driving blocks are driven at different timings from each other. This time-division driving method enables the number of recording elements being driven at the same time to be reduced, thereby enabling a recording apparatus to be provided with the size of the driving power source suppressed.

In a case of recording using the above multi-pass recording, there are cases where discharging position deviation of ink occurs among one type of scan and another type of scan in the multiple scans over a unit region, due to various factors. For example, in a case where floating (cockling) of the recording medium occurs in an arrangement where the recording head is reciprocally scanned in the forward direction and backward direction, the ink discharge direction slightly shifts between the forward direction and backward direction, so there is ink discharge position deviation between a region where recording has been performed by a forward direction scan and a region where recording has been performed by a backward direction scan.

In comparison with this, Japanese Patent Laid-Open No. 2013-159017 describes an arrangement to suppress ink discharge position deviation among two types of scans such as forward scan and backward scan described above. In this arrangement recording data is generated where ink is discharged in the same pixel region by these two types of scans, and further the above-described time-division driving is performed so that the landing positions of dots formed by each of the driving blocks in each of the two types of scans differ from each other. Now, in order for the landing positions of dots formed by each of the driving blocks to differ in a case of the recording head being reciprocally scanned in the forward direction and backward direction, the driving order of multiple driving blocks when scanning in the backward direction is described as being different from the reverse order of the driving order of multiple driving blocks when scanning in the forward direction. Also, in order for the landing positions of dots formed by each of the driving blocks to differ in a case of the recording head being scanned only in one direction, the driving order of multiple driving blocks in a certain type of scan is described as being different from the driving order of multiple driving blocks in another certain type of scan. According to Japanese Patent Laid-Open No. 2013-159017, recording can be realized where ink discharge position deviation between two types of scans is suppressed when performing recording using multi-pass recording and time-division driving.

Japanese Patent Laid-Open No. 2013-159017 describes distributing multi-value image data over two types of scans, and thereafter quantizes each image data, so as to generate image data that discharges ink to the same pixel regions in the two types of scans. Thus, recording data that discharges ink to the same pixel regions in the two types of scans is generated, regardless of the concentration of the image data. Accordingly, there is a possibility that recording data that discharges ink to the same pixel regions in the two types of scans will be generated even when processing image data corresponding to a low-concentration image where ink discharge amount is small. As a result, there are cases where ink is applied in a superimposed manner to the same pixel region, even though the dots should be dispersed for low-concentration images from the perspective of uniformity taking uniformity of the image into consideration, yielding an image where graininess is conspicuous.

SUMMARY OF THE INVENTION

It has been found desirable to provide recording with suppressed ink discharge position deviation among two types of scans without image defects, where graininess is less conspicuous, even when recording images with different concentration from other images, such as low-concentration images, for example.

A recording apparatus includes a recording head, a scanning unit, a generating unit, a time-division driving unit, and a control unit. The head includes a recording element row where a plurality of recording elements configured to generate energy to discharge ink are arrayed in a predetermined direction. The scanning unit is configured to execute a first scan of the recording head over a unit region on a recording medium, K (K≥1) times in a first direction following an intersecting direction intersecting the predetermined direction, and a second scan of the recording head over the unit region, L (L≥1) times in a second direction opposite to the first direction. The generating unit is configured to generate recording data stipulating discharge or non-discharge of ink, as to each of a plurality of pixel regions within the unit region, in each of K+L scans by the scanning unit, based on image data that corresponds to an image to be recorded in the unit region and stipulates a plurality of combinations of number of times of discharge of ink to each of the plurality of pixel regions, and K+L mask patterns corresponding to the K+L scans by the scanning unit. The time-division driving unit is configured to perform time-division driving of a plurality of recording elements corresponding to the unit region following first driving order in the K first scans, and perform time-division driving of a plurality of recording elements corresponding to the unit region following a second driving order, that is different from an opposite order to the first driving order, in the L second scans. The control unit is configured to effect control to discharge ink to the unit region by driving the plurality of recording elements by the time-division driving unit, based on the recording data generated by the generating unit, in the K+L scans by the scanning unit. Disposed in the K+L mask patterns are at least first recording permitted pixels regarding which discharge of ink is permitted in a case where the number of times of discharge of ink indicated by the image data is N (N≥1) times or more, second recording permitted pixels regarding which discharge of ink is permitted in a case where the number of times of discharge of ink indicated by the image data is M (M>N) times or more, but not permitted to discharge ink if less than M times, and recording non-permitted pixels not permitted to discharge ink regardless of the number of times of discharge of ink indicated by the image data. Of the pixel regions corresponding to the first recording permitted pixels in the L mask patterns corresponding to the L times of second scans, the number of pixels adjacent on both sides in the intersecting direction to pixel regions that correspond to the first recording permitted pixels in the K mask patterns corresponding to the K times of first scans, is larger than the number of pixels not adjacent on both sides in the intersecting direction to pixel regions that correspond to the first recording permitted pixels in the K mask patterns corresponding to the K times of first scans.

Further features of the present invention will become apparent from the following description of exemplary embodiments with reference to the attached drawings.

BRIEF DESCRIPTION OF THE DRAWINGS

FIG. 6 is a diagram illustrating a rasterization table in an embodiment.

FIGS. 9A through 9E are diagrams for describing recording data generating steps in a multi-pass recording method.

FIG. 10 is a diagram illustrating a decoding table.

FIGS. 11A through 11C are diagrams for describing correlation between driving order and ink landing position.

FIGS. 12A1 through 12E are diagrams for describing correlation of recording data, driving order, and ink discharge position.

FIGS. 18A through 18C are diagrams for describing driving order in an embodiment.

FIGS. 22A through 22D are diagrams for describing driving order in a comparative example.

FIGS. 28A through 28D are diagrams for describing driving order in an embodiment.

FIGS. 31A through 31E are diagrams illustrating a rasterization table and dot arrangement patterns in an embodiment.

FIGS. 33A through 33C are diagrams for describing driving order in an embodiment.

FIGS. 34A1 through 34C4 are diagrams for describing discharge position of ink and scanning direction in an embodiment.

FIGS. 46A through 46E are diagrams illustrating a rasterization table and dot arrangement patterns in an embodiment.

FIGS. 48A1 through 48C4 are diagrams for describing discharge position of ink and scanning direction in an embodiment.

FIGS. 52A1 through 52C4 are diagrams for describing discharge position of ink and scanning direction in a comparative example.

FIG. 61 is a diagram illustrating a mask pattern portion application method in an embodiment.

FIGS. 63A through 63C are diagrams for describing driving order in an embodiment.

FIG. 67 is a diagram illustrating a decoding table applied in an embodiment.

DESCRIPTION OF THE EMBODIMENTS

First Embodiment

Figure 1:
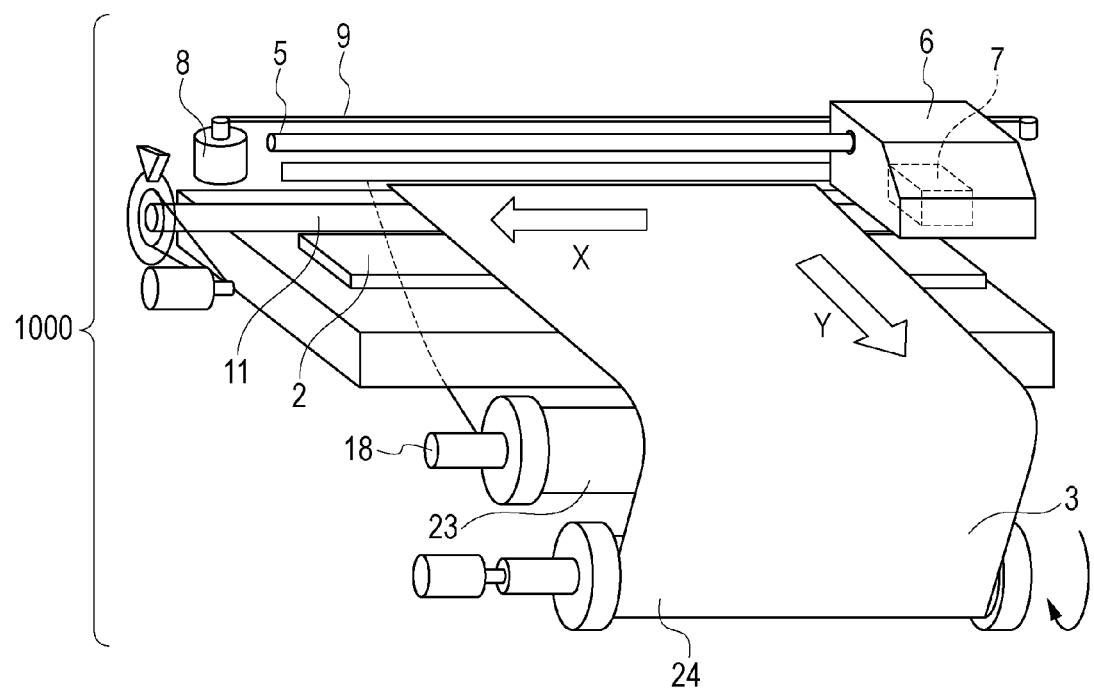
FIG. 1 is a perspective view of a recording apparatus according to an embodiment.
Figure 2:
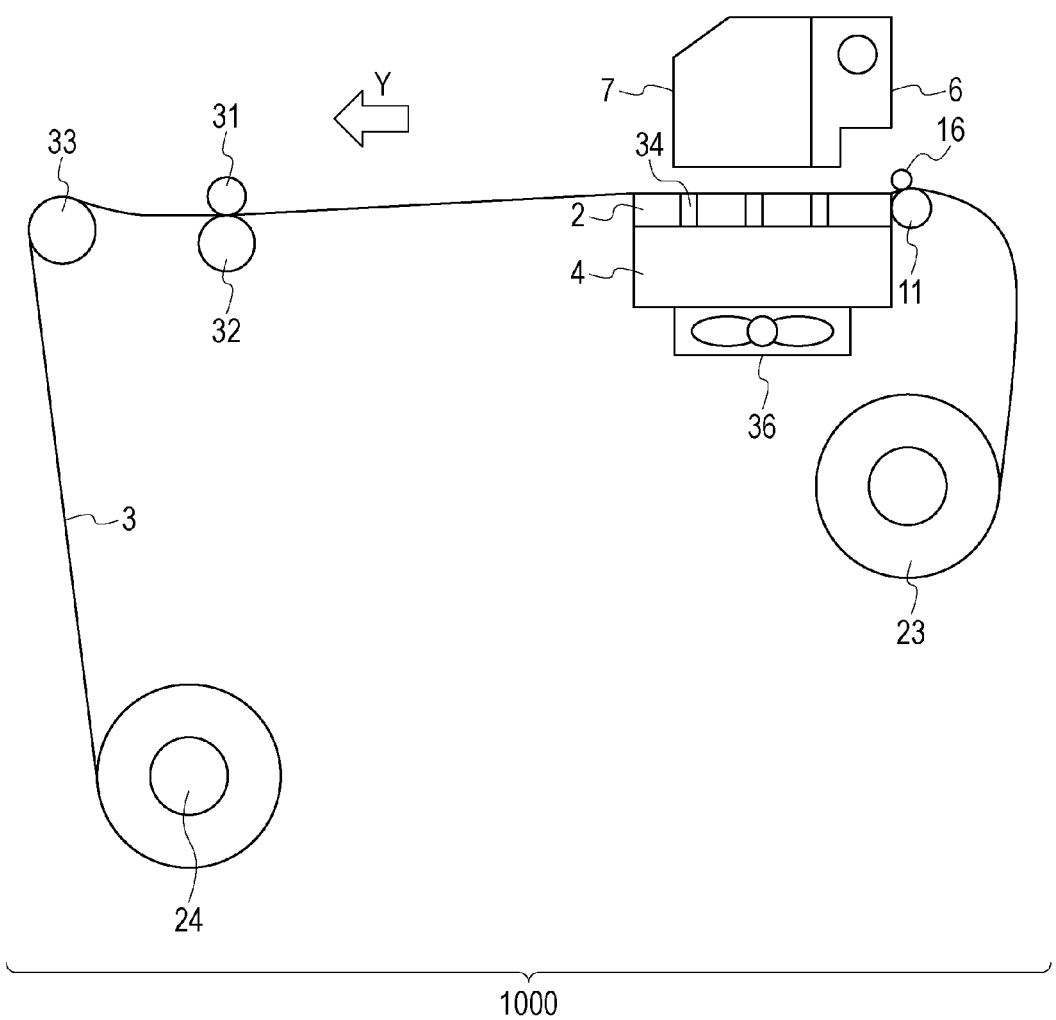
FIG. 2 is a schematic diagram illustrating the internal configuration of the recording apparatus according to an embodiment.

A first embodiment of the present invention will be described in detail below with reference to the drawings. FIG. 1 is a perspective view partially illustrating the internal structure of a recording apparatus 1000 according to the first embodiment of the present invention. FIG. 2 is a cross-sectional diagram partially illustrating the internal configuration of the recording apparatus 1000 according to the first embodiment of the present invention.

A platen 2 is disposed within a recording apparatus 1000. A great number of suction holes 34 are formed in the platen 2 so that a recording medium 3 can be suctioned and thus prevented from floating up. The suction holes 34 are connected to a duct, below which a suction fan 36 is disposed. The recording medium 3 is suctioned to the platen 2 by this suction fan 36 operating.

A carriage 6 is supported by a main rail 5 disposed extending in the width direction of sheets, and is configured so as to be capable of reciprocal scanning (reciprocal movement) in the forward direction and backward direction along an X direction (intersecting direction). Mounted on the carriage 6 is an ink jet recording head 7 which will be described later. Various recording methods can be used in the recording head 7, including the thermal jet method using heating elements, the piezoelectric method using piezoelectric elements, and so forth. A carriage motor 8 is a drive source for moving the carriage 6 in the X direction. The rotational driving force thereof is transmitted to the carriage 6 by a belt 9.

The recording medium 3 is supplied by being unwound off of a rolled medium 23. The recording medium 3 is conveyed in a Y direction (conveyance direction) intersecting the X direction on the platen 2. The recording medium 3 is nipped by a pinch roller 16 and conveyance roller 11, and is conveyed by the conveyance roller 11 being driven. Downstream in the Y direction from the platen 2, the recording medium 3 is nipped by a roller 31 and discharge roller 32, and further is wound onto a take-up roller 24 by way of a turn roller 33.

Figure 3A:
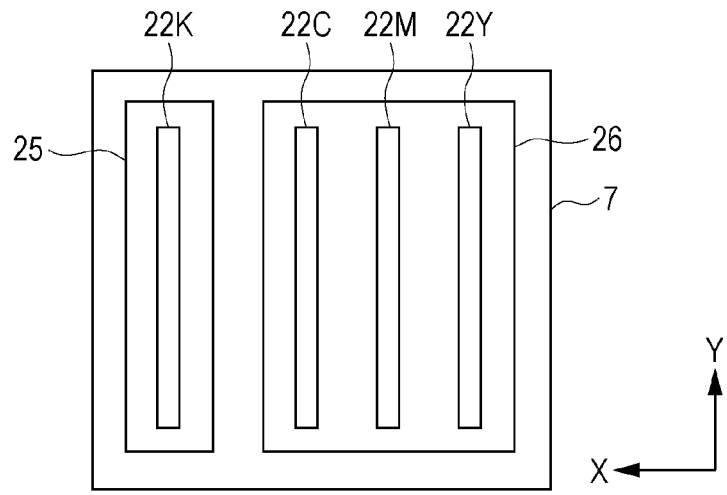
FIGS. 3A through 3C are schematic diagrams of a recording head according to an embodiment.
Figure 3B:
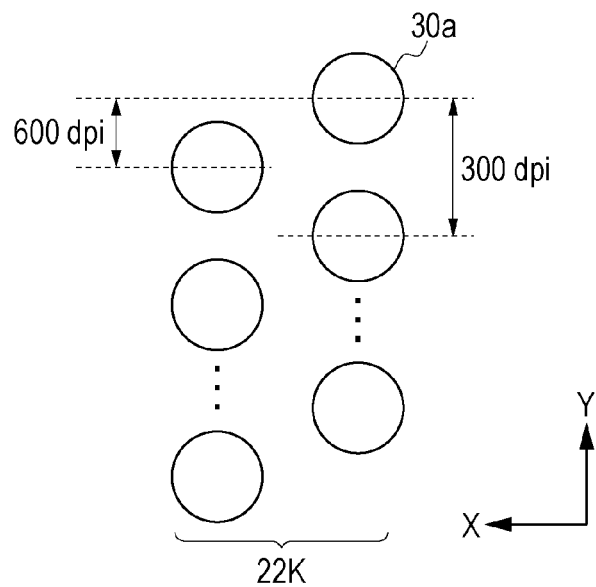
Figure 3C:
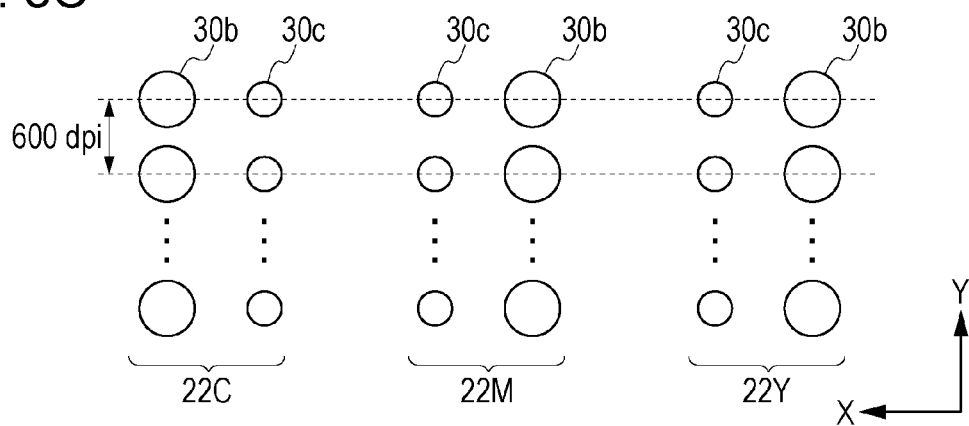

FIG. 3A is a perspective view illustrating the recording head 7 according to the present embodiment. FIG. 3B is an enlarged view of a chip 25 on which is disposed a discharge orifice row 22K for black ink inside the recording head 7. FIG. 3C is an enlarged view of a chip 26 on which are disposed a discharge orifice row 22C for cyan ink, a discharge orifice row 22M for magenta ink, and a discharge orifice row 22Y for yellow ink, inside the recording head 7.

It can be seen from FIG. 3A that a recording chip 25 for discharging black ink (Bk chip) and a recording chip 26 for discharging color ink (Cl chip) are provided separately within the recording head 7.

Two discharge orifice rows 22K for black ink are formed extending on the Bk chip 25 in the Y direction (predetermined direction), shifted at a recording resolution of 600 per inch (600 dpi), as illustrated in FIG. 3B. These two rows each have 300 discharge orifices 30a arrayed in the Y direction (predetermined direction) per inch (300 dpi). The discharge orifices 30a are capable of discharging approximately 25 picoliters (hereinafter "pl") of ink. The diameter of a dot formed by a discharge orifice 30a discharging one droplet of ink onto the recording medium is approximately 60 μm. Although only six discharge orifices 30a are illustrated in FIG. 3B for the sake of brevity, in reality 128 discharge orifices 30a are arrayed to make up the discharge orifice row 22K.

A discharge orifice row 22C for discharging cyan ink, made up of a row where discharge orifices 30b are arrayed on the Cl chip 26 in the Y direction at a recording resolution of 600 per inch (600 dpi) and a row where discharge orifices 30c are arrayed in the Y direction at a recording resolution of 600 per inch (600 dpi), as illustrated in FIG. 3C. The discharge orifices 30b are capable of discharging approximately 5 pl of ink, and the diameter of a dot formed by a discharge orifice 30b discharging one droplet of ink onto the recording medium is approximately 50 μm. The discharge orifices 30c are capable of discharging approximately 2 pl of ink, and the diameter of a dot formed by a discharge orifice 30c discharging one droplet of ink onto the recording medium is approximately 35 μm. Although only three discharge orifices 30b and three discharge orifices 30c are illustrated in FIG. 3C for the sake of brevity, in reality 128 discharge orifices 30b and 128 discharge orifices 30C are arrayed to make up the discharge orifice row 22C. Moreover, a discharge orifice row 22M for discharging magenta ink, and a discharge orifice row 22Y for discharging yellow ink, are formed on the Cl chip 26.

Recording elements (omitted from illustration) are disposed directly below the discharge orifices 30a, 30b, and 30c. Thermal energy generated by the recording elements being driven causes the ink immediately above to bubble, which discharges ink from the discharge orifices. In order to simplify description hereinafter, a row of multiple recording elements formed directly below multiple discharge orifices making up a row that discharges ink of the same color and same amount will be referred to as "recording element row".

Figure 4:
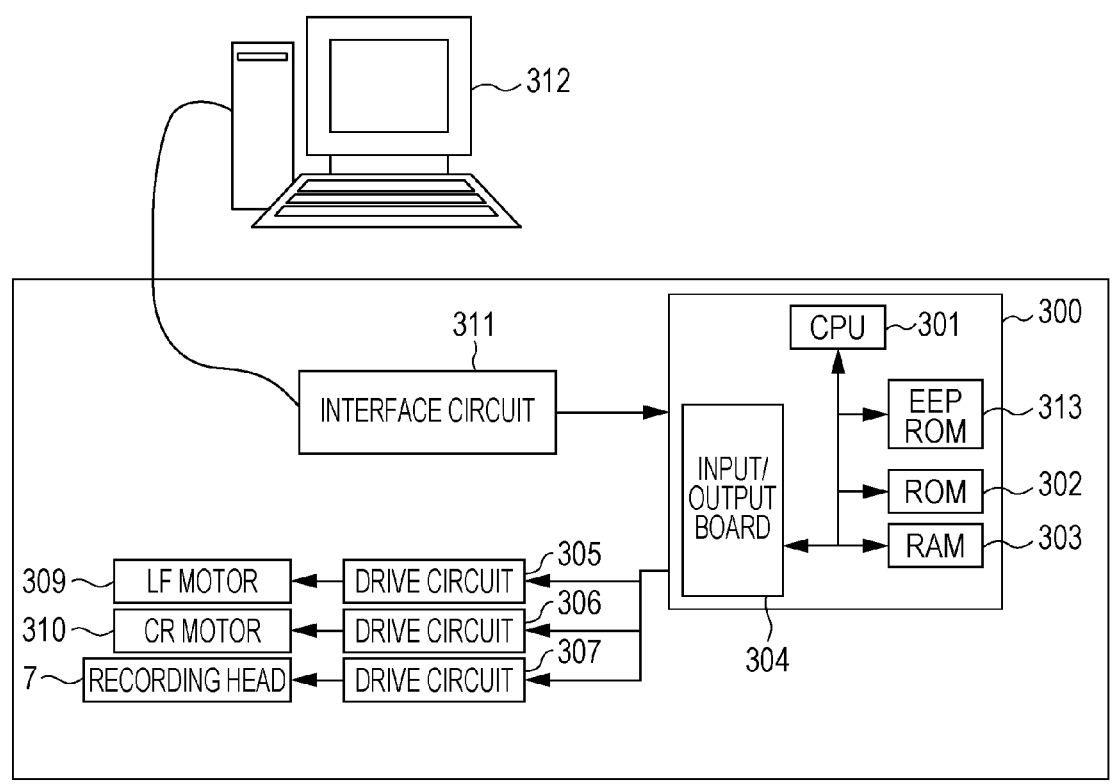
FIG. 4 is a diagram illustrating a recording control system in an embodiment.

FIG. 4 is a block diagram illustrating a schematic configuration of a control system in the present embodiment. A main control unit 300 includes a central processing unit (CPU) 301 that executes processing operations such as computation, selection, determination, control, and so forth, read-only memory (ROM) 302 that stores control programs and the like to be executed by the CPU 301, random access memory (RAM) 303 used to buffer recording data and so forth, an input/output port 304, and so forth. Electrically Erasable Programmable ROM (EEPROM) 313 stores image data, mask patterns, faulty nozzle data, and so forth, which will be described later. Drive circuits 305, 306, 307 corresponding to a conveyance motor (LF motor) 309, a carriage motor (CR motor) 310, and the recording head 7, are connected to the input/output port 304. The main control unit 300 is further connected to a personal computer (PC) 312 that is a host computer, via an interface circuit 311.

Figure 5:
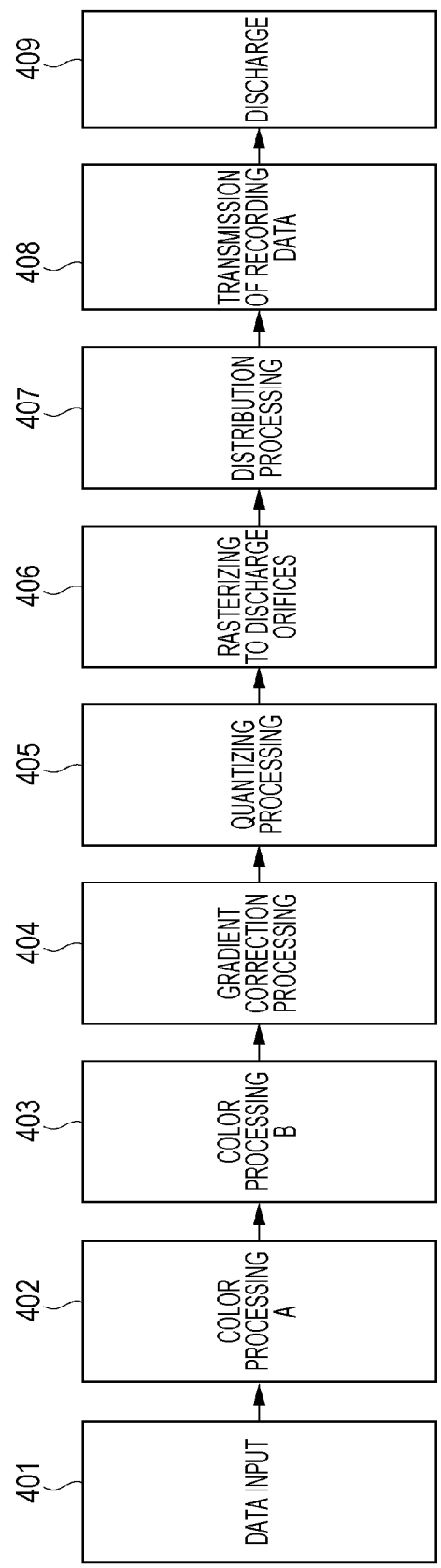
FIG. 5 is a diagram illustrating data processing steps in an embodiment.

FIG. 5 is a flowchart illustrating data processing steps that the CPU 301 executes in the present embodiment.

In step 401, original image signals that have 256 gradation levels (0 through 255) for each of red, green, and blue (RGB) acquired from an image input device such as a digital camera or scanner or the like, or by computer processing or the like, are input at resolution of 600 dpi.

In step 402, the RGB original image signals input in step 401 are converted to R'G'B' signals by color conversion processing A.

In color conversion processing B in the following step 403, the R'G'B' signals are converted into signal values corresponding to the respective color inks. The recording modes used in the present embodiment are the three colors of cyan (C), magenta (M), and yellow (Y).

Accordingly, the signals after conversion are data C1, M1, and Y1, corresponding to the cyan, magenta, and yellow ink colors. Each of C1, M1, and Y1 have 256 gradation levels (0 through 255) and resolution of 600 dpi. Specific color processing B involves using a three-dimensional look-up table (omitted from illustration) showing the relationship between the input values of R, G, and B, and the output values of C, M, Y. The output values for input values not within grid points of the table are calculated by interpolation from the output values of surrounding table grid points. Description will be made with data C1 representing the data C1, M1, and Y1.

In step 404, gradation correction using a gradation correction table is performed on the data C1, thereby obtaining post-gradation-correction data C2.

In step 405, the data C2 is subjected to quantization processing by error diffusion to obtain data C3 having three gradations (gradation levels 0, 1, 2) and resolution of 600 dpi×600 dpi. Although error diffusion has been described as being used here, dithering may be used instead.

Figure 6:
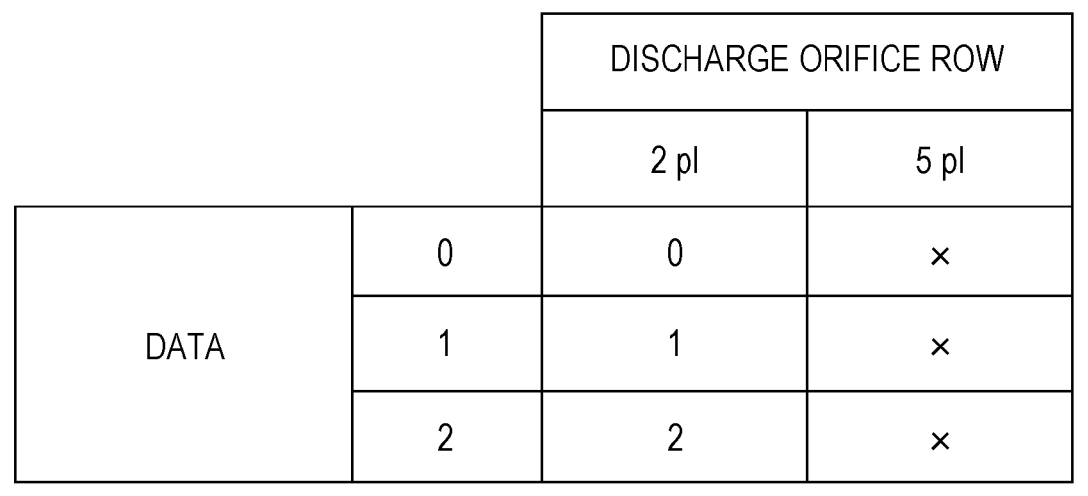

In step 406, the gradation data C3 is converted into image data C4 for the discharge orifice rows in accordance with the discharge orifice row rasterization table illustrated in FIG. 6. In the present embodiment, image data for 5 pl discharge orifice rows is not generated, and image data 2 pl discharge orifice rows is rasterized in the three gradations of "0", "1", and "2". Specifically, the image data C4 is made up of three types of 2-bit information "00", "01", and "10", at resolution of 600 dpi×600 dpi. Now, in a case where the 2-bit information making up the image data C4 is "00" at a certain pixel, the value which that information indicates (hereinafter also referred to as "pixel value") is "0". Also, in a case where the 2-bit information making up the image data is "01" at a certain pixel, the value which that information indicates (pixel value) is "1". In a case where the 2-bit information making up the image data C4 is "10" at a certain pixel, the value which that information indicates (pixel value) is "2". Details of the image data C2 will be described later In step 407, later-described distribution processing is performed regarding the image data C4, and recording data C5 stipulating discharge or non-discharge of ink for each pixel region in each scan is generated. Thereafter, the recording data C5 is transmitted to the recording head in step 408, and in step 409 ink is discharged in accordance with the recording data C5.

The PC 312 may perform all of the processing of steps 401 through 407, or part of the processing of steps 401 through 407 may be performed by the PC 312 and the remainder by the recording apparatus 1000.

Recording is performed using time-division driving and multi-pass recording in the present embodiment. Control of each of these will be described in detail.

Time-Division Driving

In a case of using a recording head where a great number of recording elements are arranged as illustrated in FIGS. 3A through 3C, performing ink discharging by driving all of the recording elements at the same time and discharging ink at the same timing would require a large-capacity power source. As a way to reduce the size of the power source, it is commonly known to perform so-called time-division driving, where the recording elements are divided into multiple driving blocks, and the timing at which each driving block is driven to record is made to differ within the same row. This time-division driving method enables the number of recording elements being driven at the same time to be reduced, so the size of the power source necessary for the recording apparatus can be reduced.

Figure 7A:
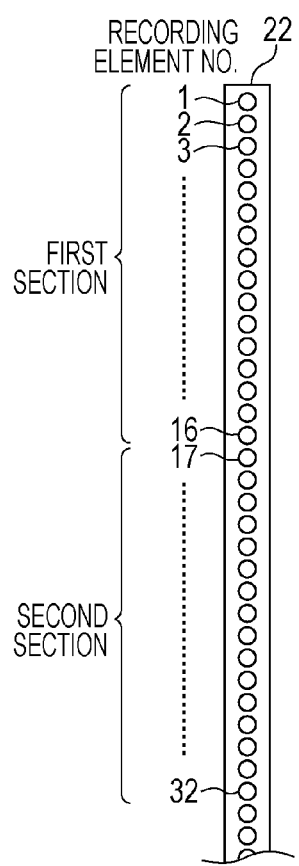
FIGS. 7A through 7C are diagrams for describing a common time-division driving method.
Figure 7B:
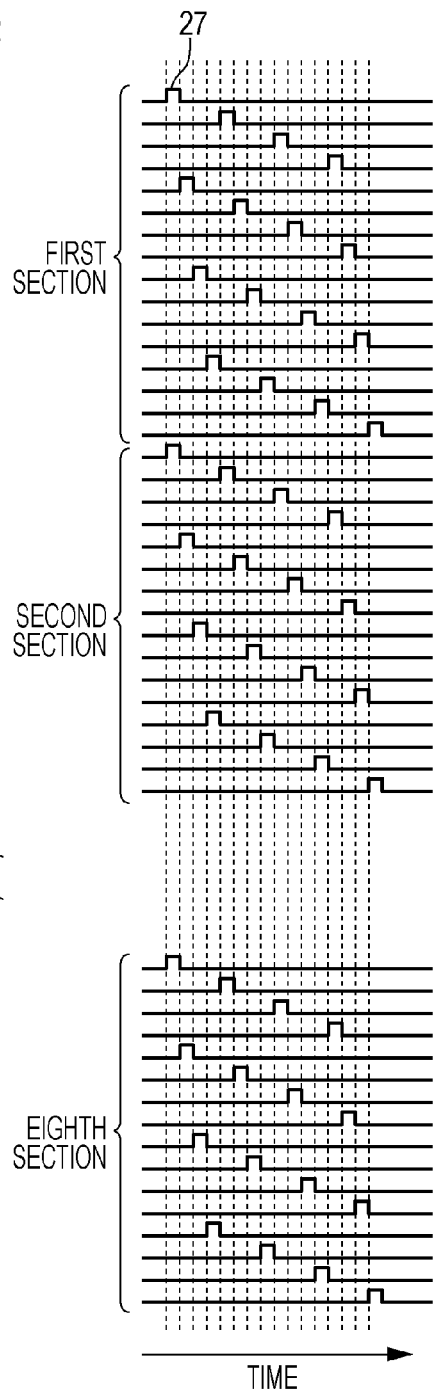
Figure 7C:
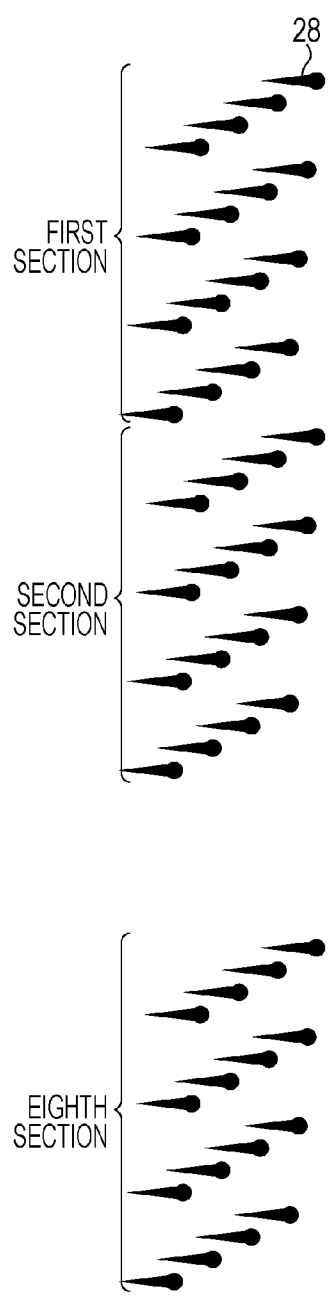

FIGS. 7A through 7C are diagrams for describing time-division driving according to the present embodiment. FIG. 7A is a diagram illustrating 128 recording elements making up a single recording element row, FIG. 7B is a diagram illustrating drive signals applied to the recording elements, and FIG. 7C is a diagram schematically illustrating actual ink droplets being discharged. Note that in the following description, the recording element farthest downstream in the Y direction of the 128 recording elements will be numbered recording element No. 1, with the numbers increasing toward the upstream in the Y direction in the manner of recording elements No. 2, No. 3, and so on, through No. 126, No. 127, and recording element No. 128 is the recording element farthest upstream in the Y direction, as illustrated in FIG. 7A.

In the present embodiment, the 128 recording elements are classified into eight sections from a first section through eighth section, each section being made up of 16 consecutive recording elements in the Y direction. Recording elements positioned at the same relative position in each of the eight sections form a driving block, and thus the 128 recording elements are divided into a total of 16 driving blocks, from driving block No. 1 through driving block No. 16.

In detail, the recording element farthest downstream in the Y direction of each of the eight selections from the first section through the eighth section are taken as recording elements belonging to driving block No. 1. As for a specific example, recording element No. 1, recording element No. 17, and so on through recording element No. 113, are recording elements belonging to driving block No. 1. In other words, recording elements satisfying recording element No. (16×a+1), where "a" is an integer of 0 through 7, are recording elements belonging to driving block No. 1.

Also, the recording element second farthest downstream in the Y direction of each of the eight selections from the first section through the eighth section are taken as recording elements belonging to driving block No. 2. That is to say, recording element No. 2, recording element No. 18, and so on through recording element No. 114, are recording elements belonging to driving block No. 2. In other words, recording elements satisfying recording element No. (16×a+2), where "a" is an integer of 0 through 7, are recording elements belonging to driving block No. 2. This holds for the other driving blocks No. 3 through No. 16. Specifically, recording elements satisfying recording element No. (16×a+b), where "a" is an integer of 0 through 7, are recording elements belonging to driving block No. b.

Driving of the recording elements is controlled in time-division driving according to the present embodiment so that the recording elements belonging to different driving blocks are sequentially driven at different timings from each other, following a preset driving order. The driving order settings are stored in the ROM 302 within the recording apparatus 1000 in the present embodiment, and are transmitted to the recording head 7 via the drive circuit 307. Block enable signals are transmitted to the recording head 7 at predetermined intervals, and the driving signals according to the AND of the block enable signals and recording data are applied to the recording elements. FIG. 7B illustrates recording elements belonging to the driving blocks being driven by driving signals 27 applied in the driving order of driving block Nos. 1, 5, 9, 13, 2, 6, 10, 14, 3, 7, 11, 15, 4, 8, 12, 16. As a result, ink droplets 28 are discharged as illustrated in FIG. 7C.

Multi-Pass Recording Method

Figure 8:
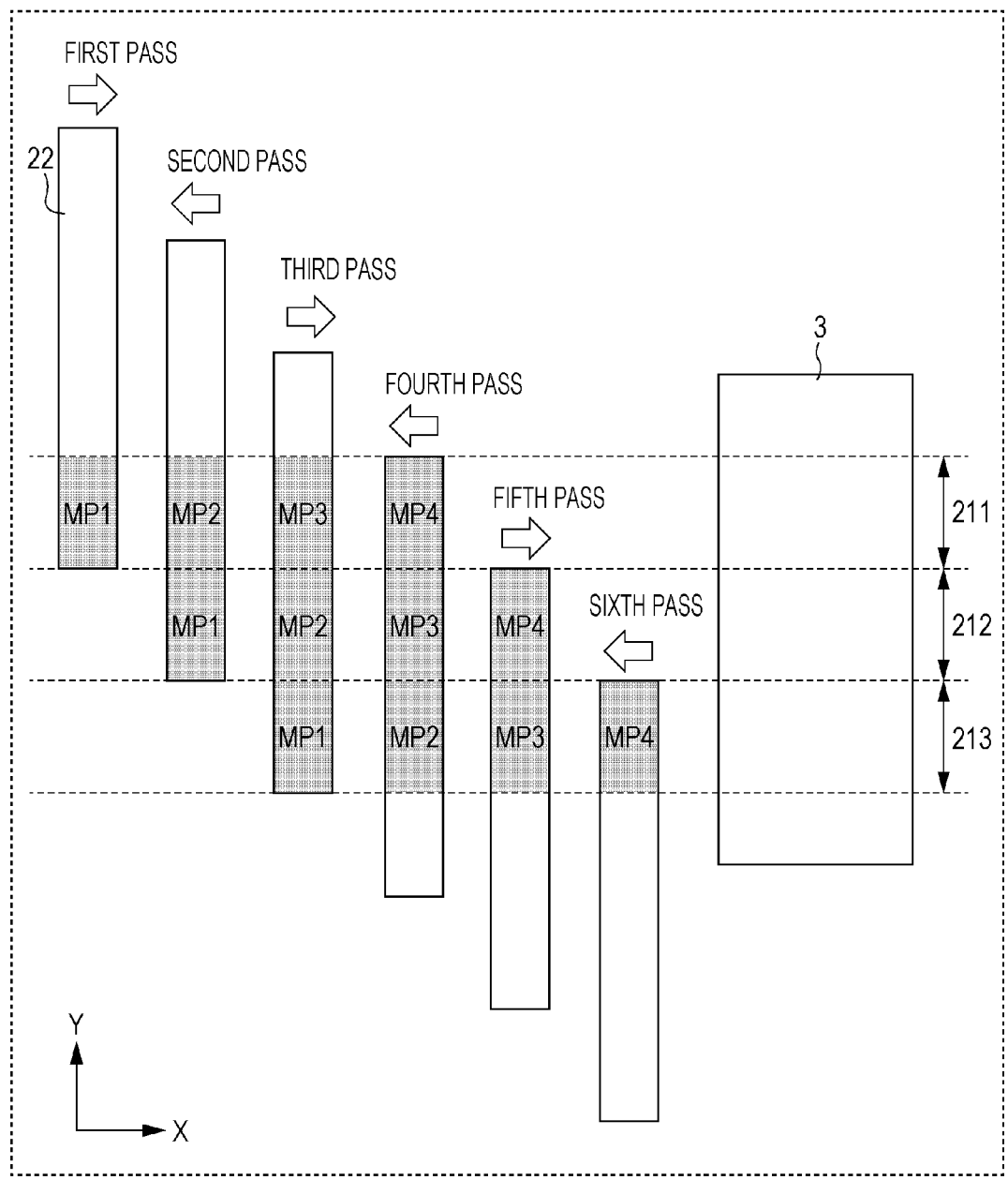
FIG. 8 is a diagram for describing a multi-pass recording method according to an embodiment.

Recording is performed in the present embodiment using multi-pass recording, where a unit region on a recording medium is recorded by multiple scans. FIG. 8 is a diagram for describing a general multi-pass recording method, illustrating an example where a unit region is recorded by four scans. The multi-pass recording method according to the present embodiment involves alternating scans from the upstream side in the X direction to the downstream side (hereinafter, also referred to as scanning in the "forward" direction) and scans from the downstream side in the X direction to the upstream side (hereinafter, also referred to as scanning in the "backward" direction).

The recording elements provided in recording element row 22 are divided into first, second, third, and fourth recording element groups in the Y direction. The first recording element group is made up of recording elements No. 97 through 128, the second recording element group is made up of recording elements No. 65 through 96, the third recording element group is made up of recording elements No. 33 through 64, and the fourth recording element group is made up of recording elements No. 1 through 32. The length of each of the first through fourth recording element groups in the Y direction is L/4, where the Y-directional length of the recording element row 22 is L.

In the first recording scan (first pass), ink is discharged from the first recording element group to a unit region 211 on the recording medium 3. This first pass is made from the upstream side toward the downstream side in the X direction.

Next, the recording medium 3 is conveyed relative to the recording head 7, from the upstream side toward the downstream side in the Y direction, by a distance L/4. Although a case is illustrated here where the recording head 7 has been conveyed over the recording medium 3 from the downstream side toward the upstream side in the Y direction for the sake of brevity, the relative positional relationship of the recording medium 3 as to the recording head 7 is the same as the recording medium 3 having been conveyed in downstream in the Y direction.

Thereafter, the second recording scan is performed. In the second recording scan (second pass), ink is discharged from the second recording element group to the unit region 211, and from the first recording element group to a unit region 212, on the recording medium 3. This second pass is made from the downstream side toward the upstream side in the X direction.

The reciprocal scanning of the recording head 7 and the relative conveyance of the recording medium 3 are alternately performed thereafter. As a result, after the fourth recording scan (fourth pass) has been performed, ink has been discharged onto the unit region 211 of the recording medium 3 once from each of the first through fourth recording element groups. Although a case of performing recording by four scans has been described here, recording can be performed in the same way by a different number of scans.

1-bit recording data to use in each scan is generated from the image data in the above-described multi-pass recording method according to the present embodiment, using image data having n (n≥2) bits of information, mask patterns having m (m≥2) bits of information, and a decoding table stipulating discharging or non-discharging of ink in accordance with a combination of values indicated by multiple bits of information in each of the image data and mask pattern. A case will be described below where both the image data and mask pattern are made up of 2-bit information.

FIGS. 9A through 9E are diagrams illustrating the process of generating recording data using image data and mask patterns, each having multiple bits of information. FIG. 10 is a diagram illustrating a decoding table used to generate recording data such as illustrated in FIGS. 9A through 9E.

FIG. 9A is a diagram schematically illustrating 16 pixels 700 through 715 in a certain unit region. Although a unit region made up of pixel regions equivalent to 16 pixels is used for description here, for sake of brevity, the unit region according to the present embodiment has a size corresponding to 32 recording elements, as described with reference to FIG. 8, so the unit region in the present embodiment actually is made up of pixel regions equivalent to 32 pixels in the Y direction.

FIG. 9B is a diagram illustrating an example of image data corresponding to the unit region. In a case where the 2-bit information making up image data corresponding to a certain pixel is "00", i.e., the pixel value is "0", the number of times of ink discharge to that pixel is zero in the present embodiment. In a case where the 2-bit information making up image data corresponding to a certain pixel is "01", i.e., the pixel value is "1", the number of times of ink discharge to that pixel is once. Further, in a case where the 2-bit information making up image data corresponding to a certain pixel is "10", i.e., the pixel value is "2", the number of times of ink discharge to that pixel is twice. Accordingly, the pixel value for pixel 703, for example, in the image data in FIG. 9B is "0", so the number of times that ink is discharged to the pixel region corresponding to pixel 703 is zero. Also, the pixel value for pixel 700 for example is "2", so the number of times that ink is discharged to the pixel region corresponding to pixel 700 is twice.

FIGS. 9C1 through 9C4 are diagrams illustrating mask patterns to be applied to the image data illustrated in FIG. 9B, corresponding to the first through fourth scans, respectively. That is to say, the mask pattern MP1 corresponding to the first scan illustrated in FIG. 9C1 is applied to the image data illustrated in FIG. 9B, thereby generating recording data used in the first scan. In the same way, the mask patterns MP2, MP3, and MP4, corresponding to the second, third and fourth scan illustrated in FIGS. 9C2 through 9C4, are applied to the image data illustrated in FIG. 9B, thereby generating recording data used in the second, third and fourth scan.

Each of the pixels in the mask patterns illustrated in FIGS. 9C1 through 9C4 have 2-bit information set to one of "00", "01", and "10". In a case where the 2-bit information is "10", the value that the information indicates (hereinafter also referred to as "code value") is "2". In a case where the 2-bit information is "01", the value that the information indicates (code value) is "1". In a case where the 2-bit information is "00", the value that the information indicates (code value) is "0".

It can be seen by referencing the decoding table in FIG. 10 that in a case where the code value is "0", no ink is discharged, regardless of whether the pixel value corresponding to that pixel is "0", "1", or "2". That is to say, the code value "0" in the mask pattern corresponds to not permitting ink discharge at all (the number of ink discharge permitted is zero). In the following description, a pixel in a mask pattern to which the code value "0" has been allocated is also referred to as a "recording non-permitted pixel".

On the other hand, it can be seen by referencing the decoding table in FIG. 10 that in a case where the code value is "2", no ink is discharged if the pixel value of the corresponding pixel is "0" or "1", but ink is discharged if "2". That is to say, the code value of "2" corresponds to permitting discharge of ink once (the number of ink discharge permitted is once) as to three pixel values.

Further, in a case where the code value is "1", no ink is discharged if the pixel value of the corresponding pixel is "0", but ink is discharged if "1" or "2". That is to say, the code value of "1" corresponds to permitting discharge of ink twice (the number of ink discharge permitted is twice) as to three pixel values ("0", "1", and "2"). That is to say, the code value "1" is a code value that sets the largest number of times permitted, out of the number of times permitted that is reproduced by the 2-bit information making up the mask pattern according to the present embodiment. In the following description, a pixel in a mask pattern to which a code value "1" or "2" has been allocated is also referred to as a "recording permitted pixel".

Now, a mask pattern having m-bit information that is used in the present embodiment is set based on the following Condition 1 and Condition 2.

Condition 1

Now, two of the four pixels at the same position in each of the four mask patterns illustrated in FIGS. 9C1 through 9C4 are allocated one code value each of "1" and "2" (recording permitted pixels), and the remaining two pixels (i.e., 4−2=2) are allocated the code value "0" (recording non-permitted pixel). For example, the pixel 700 is allocated the code value of "2" in the mask pattern illustrated in FIG. 9C1, and allocated "1" in the mask pattern illustrated in FIG. 9C2. The code value "0" is the allocated in the mask patterns in FIGS. 9C3 and 9C4. The pixel 700 thus is a recording permitted pixel in the mask patterns illustrated in FIGS. 9C1 and 9C2, and is a recording non-permitted pixel in the mask patterns illustrated in FIGS. 9C3 and 9C4.

Also, the pixel 701 is allocated the code value of "2" in the mask pattern illustrated in FIG. 9C4, and allocated "1" in the mask pattern illustrated in FIG. 9C1. The code value "0" is the allocated in the mask patterns in FIGS. 9C2 and 9C3. The pixel 701 thus is a recording permitted pixel in the mask patterns illustrated in FIGS. 9C1 and 9C4, and is a recording non-permitted pixel in the mask patterns illustrated in FIGS. 9C2 and 9C3. According to this configuration, recording data can be generated to discharge ink at a pixel region corresponding to certain pixel, regardless of whether the pixel value of that pixel is "0", "1", or "2", for a number of times of discharge corresponding to that pixel value.

Condition 2

The mask patterns illustrated in FIGS. 9C1 through 9C4 are each arranged so that the number of recording permitted pixels corresponding to the code value "1" is about the same number in each. More specifically, the code value "1" is allocated to the four pixels 701, 706, 711, and 712 in the mask pattern illustrated in FIG. 9C1. The code value "1" is allocated to the four pixels 700, 705, 710, and 715 in the mask pattern illustrated in FIG. 9C2. Further, the code value "1" is allocated to the four pixels 703, 704, 709, and 714 in the mask pattern illustrated in FIG. 9C3. Moreover, the code value "1" is allocated to the four pixels 702, 707, 708, and 713 in the mask pattern illustrated in FIG. 9C4. In other words, there are four recording permitted pixels corresponding to the code value "01" in the four mask patterns illustrated in FIGS. 9C1 through 9C4. In the same way, the mask patterns illustrated in FIGS. 9C1 through 9C4 are each arranged so that the number of recording permitted pixels corresponding to the code value "2" is the same number in each.

Although the same number of recording permitted pixels corresponding to each of the code values "1" and "2" are arranged in the mask patterns in the above description, in practice a number that is about the same will suffice. Accordingly, when generating recording data by distributing the image data over four scans using the mask patterns illustrated in FIGS. 9C1 through 9C4, the recording ratio can be made to be about the same for the four scans.

FIGS. 9D1 through 9D4 are diagrams illustrating recording data generated by applying the mask patterns illustrated in each of FIGS. 9C1 through 9C4 to the image data illustrated in FIG. 9B. For example, looking at the pixel 700 in the recording data corresponding to the first scan illustrated in FIG. 9D1, the pixel value of the image data is "2" and the code value of the mask pattern is "2", so ink discharge ("1") is set for the pixel 700 in accordance with the decoding table in FIG. 10. For the pixel 701, the pixel value of the image data is "1" and the code value of the mask pattern is "1", so discharge ("1") is set. For the pixel 704, the pixel value of the image data is "2" and the code value of the mask pattern is "0", so non-discharge ("0") is set.

Ink is discharged in the first through fourth scans following the recording data illustrated in FIGS. 9D1 through 9D4, that has been generated in this way. For example, ink is discharged to the pixel regions on the recording medium corresponding to pixels 700, 701, and 712 in the first scan, which can be seen from the recording data illustrated in FIG. 9D1.

FIG. 9E is a diagram showing the logical sum of recording data illustrated in each of FIGS. 9D1 through 9D4. By discharging ink according to the recording data illustrated in FIGS. 9D1 through 9D4, the pixel regions corresponding to the pixels receive discharge of ink as many times as shown in FIG. 9E.

For example, discharging of ink is set for the pixel 700 in recording data corresponding to the first and second scans illustrated in FIGS. 9D1 and 9D2. Accordingly, ink is discharged twice to the pixel region corresponding to the pixel 700, as illustrated in FIG. 9E. Also, discharging of ink is set for the pixel 701 in recording data corresponding to the first scan illustrated in FIG. 9D1. Accordingly, ink is discharged once to the pixel region corresponding to the pixel 701, as illustrated in FIG. 9E.

Comparing the recording data illustrated in FIG. 9E with the image data illustrated in FIG. 9B reveals that the recording data has been generated so that ink is discharged to each pixel in accordance with the number of times of discharge corresponding to the pixel value of the image data. For example, the pixel value of the image data in FIG. 9B for the pixels 700, 704, 708, and 712 is "2", and the number of times of discharge of ink indicated by the logical sum of the generated recording data also is twice. According to this configuration, 1-bit recording data used for each of multiple scans can be generated based on image data and mask patterns that have multi-bit information.

Discharge Deviation of Ink in Reciprocal Scanning

Next, deviation of ink discharge positions among forward scanning and backward scanning (between reciprocal scans) will be described in detail. The present embodiment suppresses deviation of ink discharge positions between reciprocal scans by the driving order of driving blocks in time-division driving control, and mask pattern used in multi-pass recording. First, the correlation between the driving order of driving blocks in time-division driving control and ink landing positions in each driving block in the same row extending in the Y direction will be described with reference to FIGS. 11A through 11C.

FIG. 11A is a diagram illustrating an example of driving order in time-division driving control. FIG. 11B is a schematic diagram illustrating the way in which dots are formed in a case of driving recording element No. 1 through No. 16 while scanning from the upstream side toward the downstream side in the X direction (forward direction scan) following the driving order shown in FIG. 11A. FIG. 11C is a schematic diagram illustrating the way in which dots are formed in a case of driving recording element No. 1 through No. 16 while scanning from the downstream side toward the upstream side in the X direction (backward direction scan) following the driving order shown in FIG. 11A. Note that the recording element No. is larger in the upstream direction in the Y direction, as illustrated in FIG. 7A, so in the case of both FIGS. 11B and 11C, the dot situated at the position farthest downstream in the Y direction is a dot formed by the recording element No. 1, the farther upstream in the Y direction from that position the dots are, the larger the recording element No. of the recording element forming that dot, and the dot situated at the end position farthest upstream in the Y direction is a dot formed by the recording element No. 16.

An example will be described here where time-division driving is performed in the driving order of driving block No. 1, driving block No. 2, driving block No. 3, driving block No. 4, driving block No. 5, driving block No. 6, driving block No. 7, driving block No. 8, driving block No. 9, driving block No. 10, driving block No. 11, driving block No. 12, driving block No. 13, driving block No. 14, driving block No. 15, and driving block No. 16, as illustrated in FIG. 11A. When scanning in the forward direction, ink droplets discharged by recording elements that are driven earlier are discharged at the upstream side in the X direction. Accordingly, in a case of performing time-division driving of the recording elements No. 1 through No. 16 in the driving order illustrated in FIG. 11A, the dot formed by the recording element No. 1 is situated farthest upstream in the X direction, the larger the recording element No. is the farther the dots are shifted in the downstream side in the X direction, and the dot formed by the recording element No. 16 is situated farthest downstream in the X direction, as illustrated in FIG. 11B.

On the other hand, when scanning in the backward direction, ink droplets discharged by recording elements that are driven earlier are discharged at the downstream side in the X direction. Accordingly, in a case of performing time-division driving of the recording elements No. 1 through No. 16 in the driving order illustrated in FIG. 11A, the dot formed by the recording element No. 1 is situated farthest downstream in the X direction, the larger the recording element No. is the farther the dots are shifted in the upstream side in the X direction, and the dot formed by the recording element No. 16 is situated farthest upstream in the X direction, as illustrated in FIG. 11C. Thus, the earlier in the order of having driven the driving blocks when scanning in the forward direction, the more upstream in the X direction the position of the dots formed will be. On the other hand, the earlier in the order of having driven the driving blocks when scanning in the backward direction, the more downstream in the X direction the position of the dots formed will be.

It can thus be seen that even if the driving order is the same, the ink landing position from the driving blocks under time-division driving control will be reversed if the scan direction is different. Now, it can be understood that if the driving order of driving blocks when scanning in the backward direction and the driving order of driving blocks when scanning in the forward direction are reversed, the landing positions of ink from the driving blocks under time-division driving control will be the same in forward direction scanning and backward direction scanning. For example, in the case of time-division driving of the recording element No. 1 through No. 16 in the driving order illustrated in FIG. 11A when scanning in the forward direction, the ink landing positions when scanning in the backward direction can be made to be the same as in the forward direction by performing time-division driving in the driving order of driving block No. 16, driving block No. 15, driving block No. 14, driving block No. 13, driving block No. 12, driving block No. 11, driving block No. 10, driving block No. 9, driving block No. 8, driving block No. 7, driving block No. 6, driving block No. 5, driving block No. 4, driving block No. 3, driving block No. 2, and driving block No. 1.

In light of the above, description will be made regarding ink landing position deviation from each driving block among reciprocal scans in time-division driving for multiple combinations set between recording data and driving order. FIGS. 12A1 through 12E are diagrams for describing combinations of recording data and driving order. FIGS. 12A1 and 12A2 illustrate an example of recording data corresponding to forward scanning and backward scanning, and FIGS. 12B1 and 12B2 illustrate another example of recording data corresponding to forward scanning and backward scanning. Note that the solid pixels in FIG. 12A1 through 12B2 indicate ink discharge (the recording data is "1"). FIG. 12C illustrates an example of driving order in time-division driving, and FIG. 12D illustrates another example of driving order in time-division driving. FIG. 12E illustrates the contents of the four sets with different recording data and driving order. It can be seen from FIG. 12E that four sets recording data and driving order are set, from a first set through a fourth set.

For the first set, the recording data illustrated in FIGS. 12B1 and 12B2 are used as recording data for forward scanning and backward scanning, respectively, with the driving order for the forward scan being the driving order illustrated in FIG. 12C, and the driving order for the backward scan being the driving order illustrated in FIG. 12D. The recording data illustrated in FIGS. 12B1 and 12B2 is data where pixels set for recording are consecutive in the X direction (dispersion in the X direction of pixels set for recording is low). The driving order for the forward scan (FIG. 12C) and the driving order for the backward scan (FIG. 12D) are opposite from each other as described above, so the ink landing positions from the driving blocks in time-division driving control is the same among reciprocal scans.

For the second set, the recording data illustrated in FIGS. 12A1 and 12A2 are used as recording data for forward scanning and backward scanning, respectively, with the driving order for the forward scan being the driving order illustrated in FIG. 12C, and the driving order for the backward scan being the driving order illustrated in FIG. 12D. The recording data illustrated in FIGS. 12A1 and 12A2 is data where pixels set for recording are non-consecutive in the X direction (dispersion in the X direction of pixels set for recording is high). The driving order for the forward scan (FIG. 12C) and the driving order for the backward scan (FIG. 12D) are opposite from each other as described above, so the ink landing positions from the driving blocks in time-division driving is the same among reciprocal scans.

For the third set, the recording data illustrated in FIGS. 12B1 and 12B2 are used as recording data for forward scanning and backward scanning, respectively, with the driving order for the forward scan and backward scan being the driving order illustrated in FIG. 12C. The recording data illustrated in FIGS. 12B1 and 12B2 is data where pixels set for recording are consecutive in the X direction (dispersion in the X direction of pixels set for recording is low). The driving order for the forward scan and the backward scan (FIG. 12C) are the same as described above, so the ink landing positions from the driving blocks in time-division driving are opposite among reciprocal scans.

For the fourth set, the recording data illustrated in FIGS. 12A1 and 12A2 are used as recording data for forward scanning and backward scanning, respectively, with the driving order for the forward scan and backward scan being the driving order illustrated in FIG. 12C. The recording data illustrated in FIGS. 12A1 and 12A2 is data where pixels set for recording are non-consecutive in the X direction (dispersion in the X direction of pixels set for recording is high). The driving order for the forward scan and the backward scan (FIG. 12C) are the same as described above, so the ink landing positions from the driving blocks in time-division driving are opposite among reciprocal scans.

Images recorded in a case where deviation occurs between forward scans and backward scans in the four combinations of recording data and driving order will be described with reference to FIGS. 13A through 16D. FIGS. 13A through 13D illustrate the images recorded in the case of the first set, FIGS. 14A through 14D the second set, FIGS. 15A through 15D the third set, and FIGS. 16A through 16D the fourth set. In each of FIGS. 13A through 16D, the "A"s schematically illustrate images recorded in a case where there is no deviation between the forward scan and the backward scan, the "B"s illustrate images recorded in a case where there is deviation of ½ dot in the X direction between the forward scan and the backward scan, the "C"s illustrate images recorded in a case where there is deviation of 1 dot in the X direction between the forward scan and the backward scan, and the "D"s illustrate images recorded in a case where there is deviation of 2 dots in the X direction between the forward scan and the backward scan. In all of the illustrations, the circles with vertical lines inside represent dots formed in the forward scan, and the circles with horizontal lines inside represent dots formed in the backward scan.

Figure 13A:
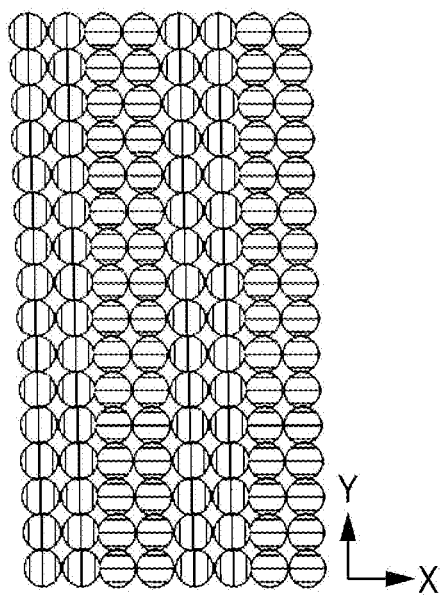
FIGS. 13A through 13D are diagrams for describing the degree of ink discharge position deviation among scans.
Figure 13B:
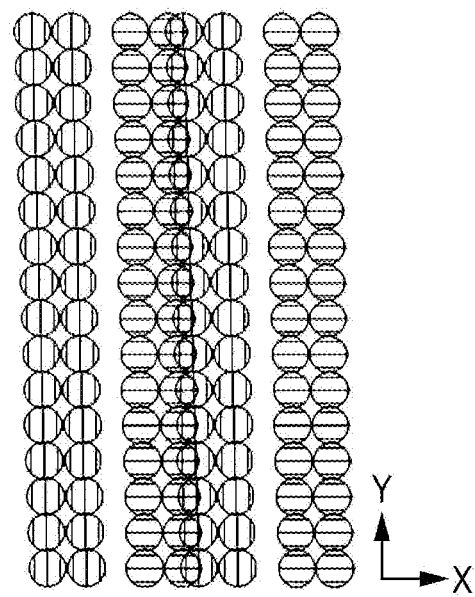
Figure 13C:
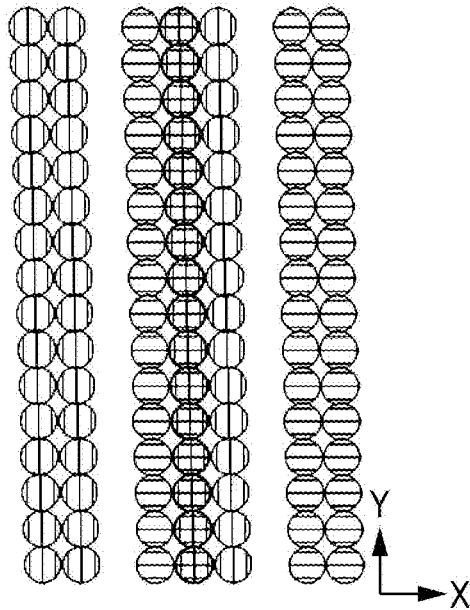
Figure 13D:
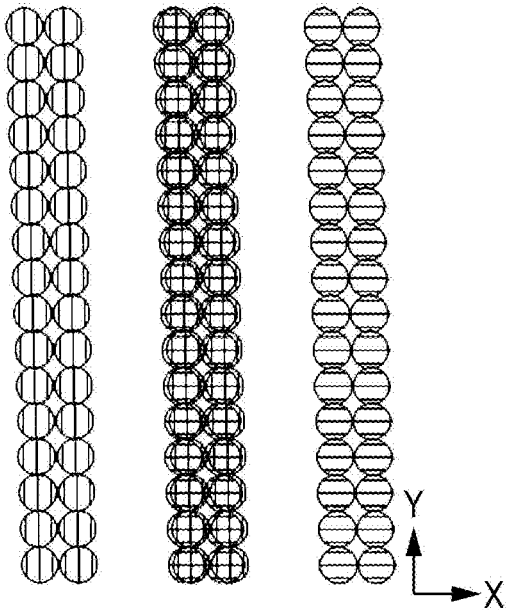

First, the first set will be described. In a case where there is no positional deviation between the forward scan and the backward scan, an ideal image can be recorded with no missing dots or overlapping, as illustrated in FIG. 13A according to the first set. However, as the deviation in the X direction between reciprocal scans increases, as illustrated in FIGS. 13B, 13C, and 13D, the degree of missing dots and overlapping increases. Particularly, in a case where there is two dots worth of deviation in the X direction between reciprocal scans, deviation of approximately two dots worth occurs straightforward in the image being recorded as illustrated in FIG. 13D, so the image quality of the obtained image is markedly low. Thus, the settings of the first set can obtain preferable images in a case where there is no deviation in the X direction between reciprocal scans, the desired image quality may not be able to be obtained in a case where there is deviation in the X direction between reciprocal scans.

Figure 14A:
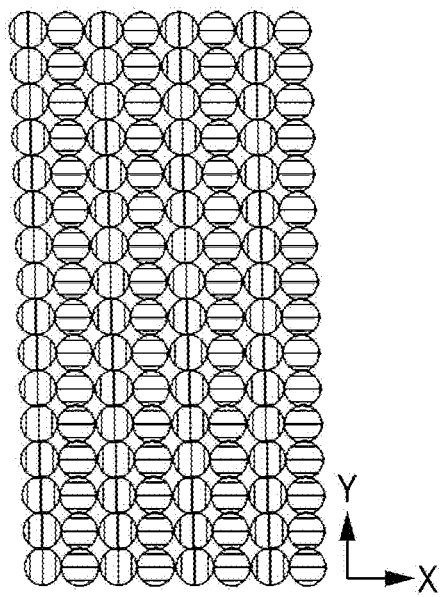
FIGS. 14A through 14D are diagrams for describing the degree of ink discharge position deviation among scans.
Figure 14B:
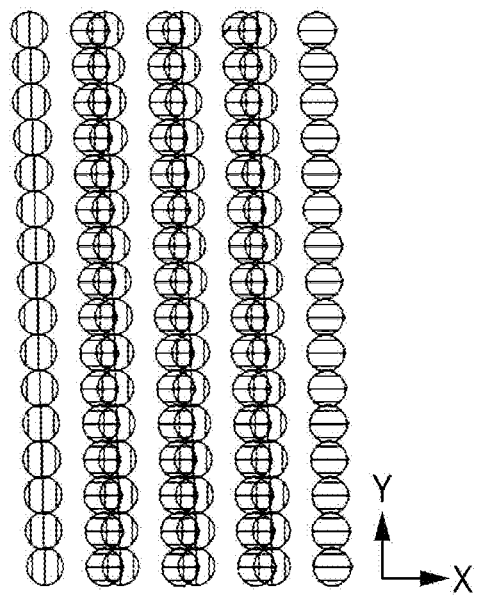
Figure 14C:
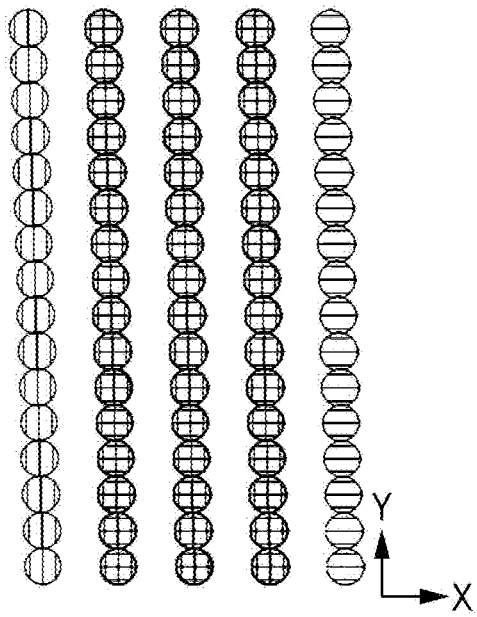
Figure 14D:
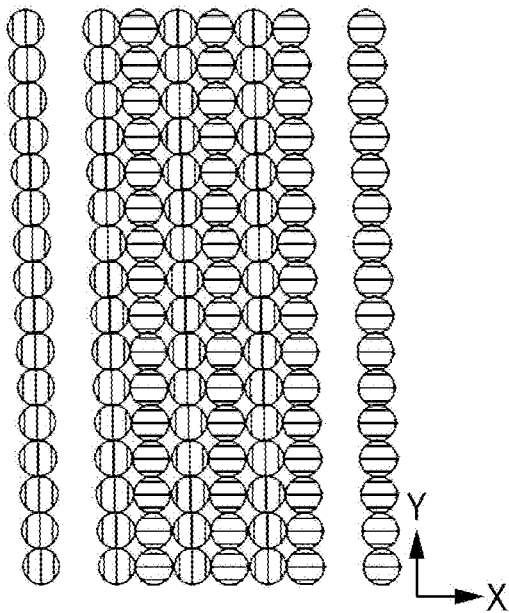

Next, the second set will be described. In a case where there is no positional deviation between the reciprocal scans, an ideal image can be recorded with no missing dots or overlapping, as illustrated in FIG. 14A, according to the second set, in the same way as with the first set in FIG. 13A. Further, in a case where there is large deviation of two dots worth in the X direction between reciprocal scans as illustrated in FIG. 14D, an image with a relatively small degree of missing dots and overlapping can be obtained, unlike the first set in FIG. 13D. This is because the dispersion of recording data in the X direction is high for both the forward scan and backward scan. However, in a case where the deviation in the X direction between reciprocal scans is ½ dot and 1 dot, as illustrated in FIGS. 14B and 14C, images with conspicuous missing dots and overlapping are recorded, in the same way as in the first set in FIGS. 13B and 13C. Thus, the settings of the second set can obtain preferable images in a case where there is no deviation in the X direction between reciprocal scans, and further can suppress deterioration in image quality as compared to the settings of the first set in cases where the deviation in the X direction between reciprocal scans is relatively large. However, the settings of the second set cannot suppress deterioration in image quality in cases where the deviation in the X direction between reciprocal scans is relatively small.

Figure 15A:
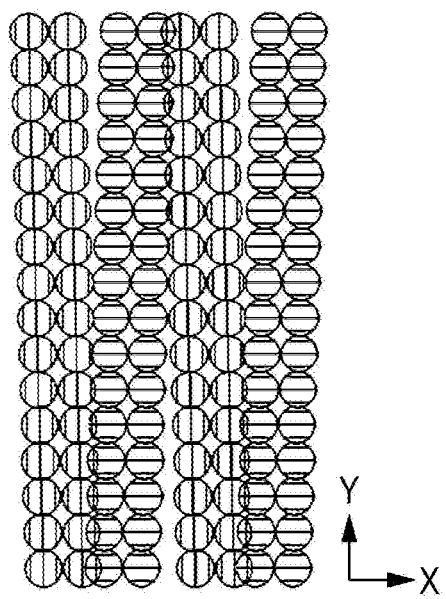
FIGS. 15A through 15D are diagrams for describing the degree of ink discharge position deviation among scans.
Figure 15B:
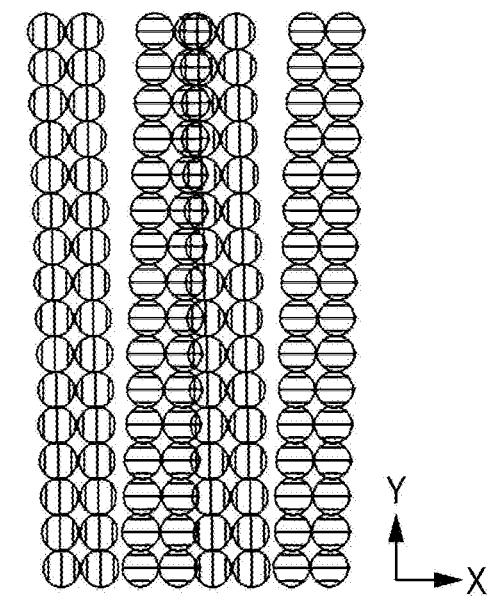
Figure 15C:
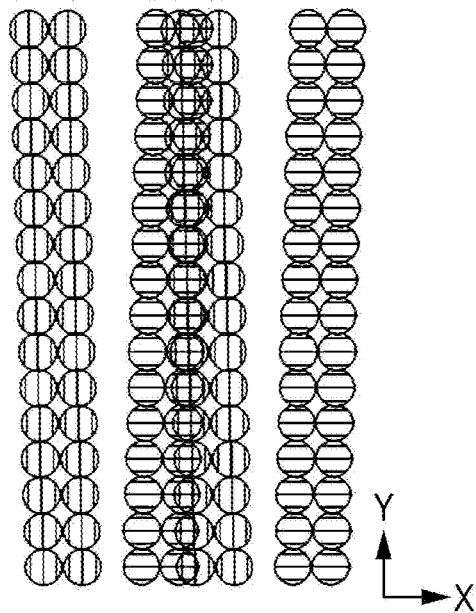
Figure 15D:
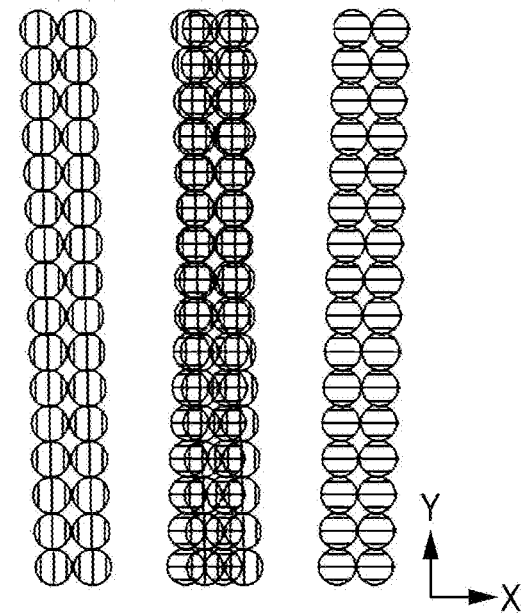

The third set will be described next. In a case where there is no positional deviation between the reciprocal scans, there is slight missing dots and overlapping, as illustrated in FIG. 15A. On the other hand, in a case where the deviation in the X direction between reciprocal scans is relatively small as illustrated in FIGS. 15B and 15C, images can be recorded where the degree of missing dots and overlapping is somewhat suppressed as compared to the cases in FIGS. 13B, 13C, 14B, and 14C, since the inclinations of dots formed in the forward scan and backward scan differ. That is to say, the settings of the third set enable deterioration of image quality due to deviation in the X direction between reciprocal scans to be suppressed. This is because the ink discharge positions are different between the forward scan and backward scan, so the distances between the dots formed in the forward scan and backward scan differ according to the driving block. However, as illustrated in FIG. 15D, in a case where the overlapping in the X direction between reciprocal scans is relatively large, an image will be recorded with pronounced missing and overlapping dots in the same way as with the settings of the first set as illustrated in FIG. 13D.

Figure 16A:
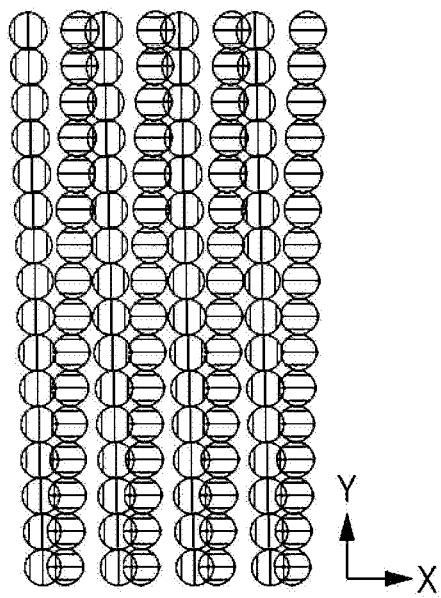
FIGS. 16A through 16D are diagrams for describing the degree of ink discharge position deviation among scans.
Figure 16B:
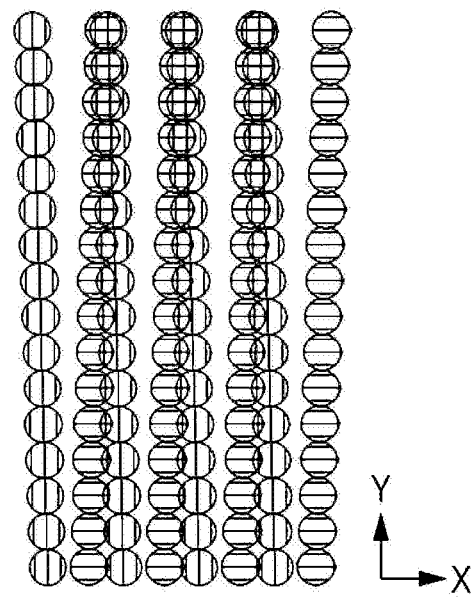
Figure 16C:
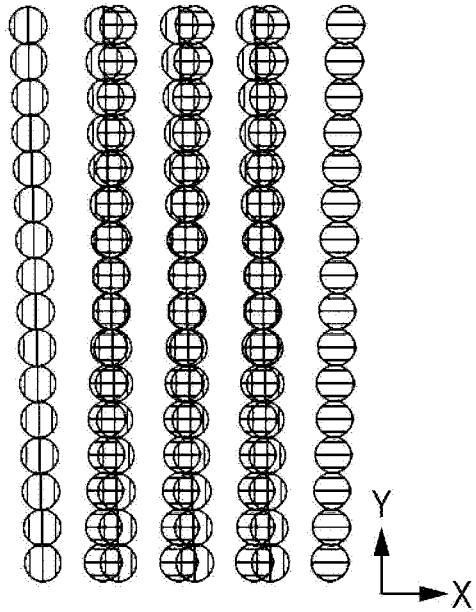
Figure 16D:
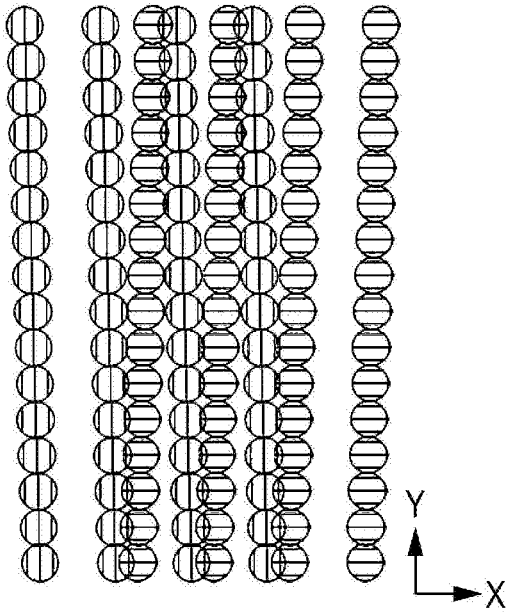

Finally, the fourth set will be described. In a case where there is no positional deviation between the reciprocal scans, there is slight missing dots and overlapping, in the same way as with the third set in FIG. 15A, as illustrated in FIG. 16A. However, in a case where the deviation in the X direction between reciprocal scans is relatively small, in the same way as in the third set, illustrated in FIGS. 16B and 16C, images can be recorded where the degree of missing dots and overlapping is somewhat suppressed, in the same way as in FIGS. 15B and 15C. Further, the settings of the fourth set enable images to be recorded with a small degree of missing dots and overlapping, even in a case where the deviation in the X direction between reciprocal scans is relatively large, as illustrated in FIG. 16D.

It can be thus seen from the images recorded by the settings according to the first, second third, and fourth sets, the settings according to the fourth set is more preferable with regard to suppressing image quality deterioration due to deviation in the X direction between reciprocal scans. Accordingly, recording data is generated in the present embodiment such that dots formed in the forward scans and dots recorded in the backward scans alternate in the X direction, and further, time-division driving is performed so that the dot landing positions from the driving blocks differs between reciprocal scans. Now, the driving order of the driving blocks in scanning in the forward direction and scanning in the backward direction is not opposite to each other in the present embodiment. Thus, the discharge positions of dots recorded in the forward scan and the backward scan can be made to be different, as described with reference to FIGS. 11A through 11C.

Mask Patterns Applied in Present Embodiment

Figure 17A:
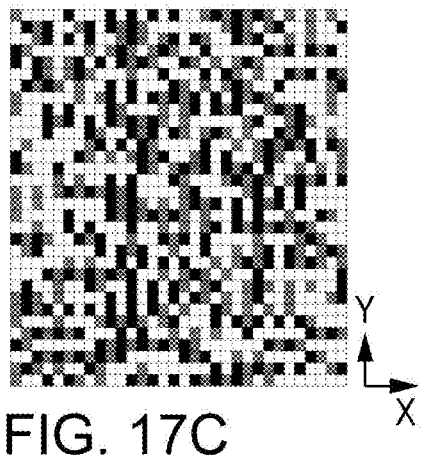
FIGS. 17A through 17F are diagrams illustrating mask patterns applied in an embodiment.
Figure 17B:
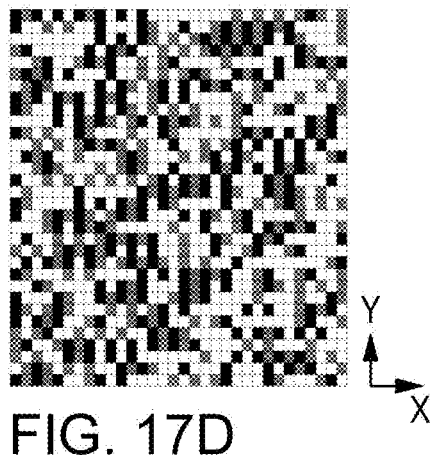
Figure 17C:
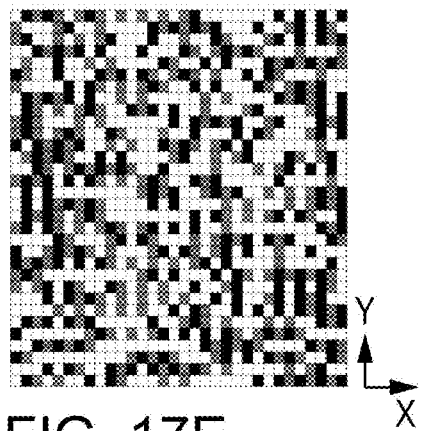
Figure 17D:
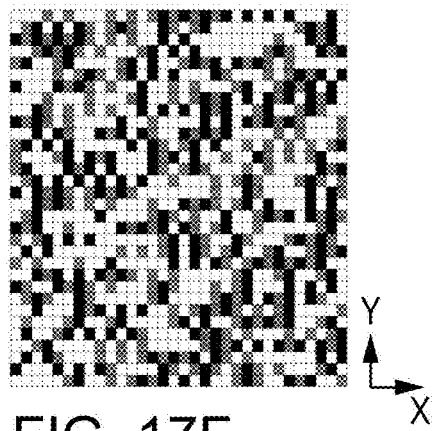
Figure 17E:
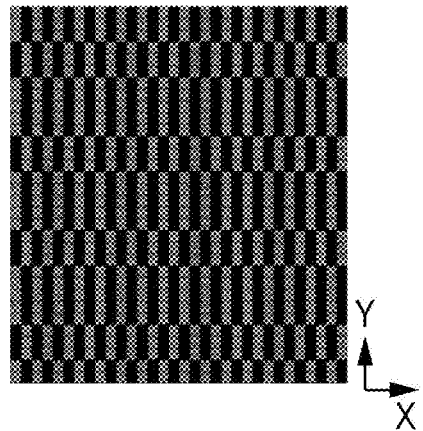
Figure 17F:
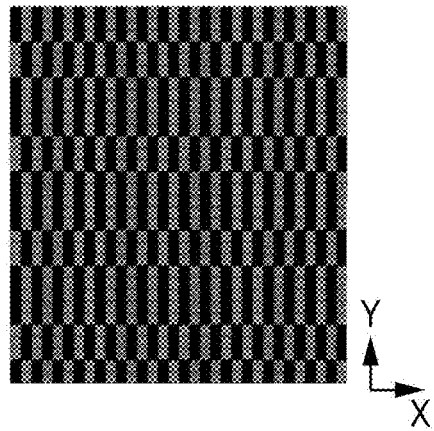

FIGS. 17A through 17F are diagrams illustrating mask patterns used in the present embodiment. Note that FIG. 17A illustrates a mask pattern MP1 corresponding to the first scan, FIG. 17B illustrates a mask pattern MP2 corresponding to the second scan, FIG. 17C illustrates a mask pattern MP3 corresponding to the third scan, and FIG. 17D illustrates a mask pattern MP4 corresponding to the fourth scan. Also, FIG. 17E illustrates a logical sum pattern MP1+MP3 obtained as the logical sum of the number of times of permitted discharge of ink stipulated in the mask pattern MP1 corresponding to the first scan in FIG. 17A and the mask pattern MP3 corresponding to the third scan in FIG. 17C. Further, FIG. 17F illustrates a logical sum pattern MP2+MP4 obtained as the logical sum of the number of times of permitted discharge of ink stipulated in the mask pattern MP2 corresponding to the second scan in FIG. 17B and the mask pattern MP4 corresponding to the fourth scan in FIG. 17D. In FIGS. 17A through 17F, the white pixels indicate pixels to which the code value "0" has been allocated, the gray pixels indicate pixels to which the code value "1" has been allocated, and the black pixels indicate pixels to which the code value "2" has been allocated. It can be seen from these FIGS. 17A through 17F that an arrangement 32 pixels in the X direction and 32 pixels in the Y direction, for a total of 1024 pixels, to which the number of permitted times of ink discharge has been set, is used as a repetitive increment of a mask pattern, and this repetitive increment is repeated in the X direction and the Y direction.

The logical sum of the number of permitted times of ink discharge means the calculated sum of the permitted number of times indicated by the code values of the corresponding multiple mask patterns. For example, the code value is "1" (number of permitted ink discharges is twice) for the pixel at the farthest upper left of the mask pattern MP1 illustrated in FIG. 17A, and the code value is "0" (number of permitted ink discharges is zero) for the pixel at the farthest upper left of the mask pattern MP3 illustrated in FIG. 17C, so the code value is "1" (number of permitted ink discharges is twice) for the pixel at the farthest upper left of the logical sum pattern MP1+MP3 illustrated in FIG. 17E. Also, for example, the code value is "2" (number of permitted ink discharges is once) for the pixel at the farthest upper left of the mask pattern MP2 illustrated in FIG. 17B, and the code value is "0" (number of permitted ink discharges is zero) for the pixel at the farthest upper left of the mask pattern MP4 illustrated in FIG. 17D, so the code value is "2" (number of permitted ink discharges is once) for the pixel at the farthest upper left of the logical sum pattern MP2+MP4 illustrated in FIG. 17F.

The mask patterns MP1 through MP4 illustrated in FIGS. 17A through 17D are set so as to satisfy the above-described Condition 1 and Condition 2. That is to say, code values are allocated to the pixels such that, of four pixels at the same position in the mask patterns MP1 through MP4 illustrated in FIGS. 17A through 17D, one each of code values "1" and "2" is allocated to two pixels, and code value "0" is allocated to the remaining two (i.e., 4−2=2) pixels (Condition 1). Further, code values are allocated to the pixels such that, among the mask patterns MP1 through MP4 illustrated in FIGS. 17A through 17D, the number of pixels to which the code value "1" has been allocated is about the same, and the number of pixels to which the code value "2" has been allocated is about the same (Condition 2).

The first and third scans are in the forward direction in the present embodiment, and the second and fourth scans are in the backward direction, which is illustrated in FIG. 8. Accordingly, discharge position deviation of ink between the forward scans and backward scan can be suppressed by generating recording data such that the dots formed by the first and third scans and the dots formed by the second and fourth scans alternate in the X direction.

The present embodiment suppresses discharge position deviation of ink between reciprocal scans, in a case where ink is discharged just once to a single pixel region, for example, due to the image being low-concentration. The present embodiment also is more capable than the technology described in Japanese Patent Laid-Open No. 2013-159017 with regard to suppressing discharge position deviation of ink between reciprocal scans in a case where ink is discharged multiple times to a single pixel region to record a high-concentration image. That is to say, it is sufficient to generate recording data to discharge ink to the same pixel regions in forward direction scans and backward direction scans, in order to suppress discharge position deviation of ink between reciprocal scans when recording images in high concentration. In light of this, code values are allocated to the pixels so that, of four pixels at the same position in the mask patterns MP1 through MP4 used in the present embodiment, a pixel to which code value "1" is allocated in mask patterns MP1 and MP3 in forward scans is allocated code value "2" in corresponding mask patterns MP2 and MP4 in backward scans, and a pixel to which code value "2" is allocated in mask patterns MP1 and MP3 in forward scans is allocated code value "1" in corresponding mask patterns MP2 and MP4 in backward scans. Accordingly, recording data can be generated where one pixel region receives discharge of ink one time each in a forward scan and a backward scan, in a case of receiving input of image data that is high in concentration, such as where the pixel value is "2", for example.

On the other hand, in order to achieve suppression of discharge position deviation of ink between reciprocal scans when recording low-concentration images, which is an advantage of the present embodiment, attention is directed toward pixel regions (predetermined pixel regions) which have been allocated code value "1" (see FIG. 10) that is the only code value where ink discharge is permitted for pixel value "1" out of the pixel values "0", "1", and "2" in the mask patterns MP1 through MP4. In other words, the code value "1" is the code value that has the most number of times of ink discharge permitted, out of the code values "0", "1", and "2".

Code values are set for each pixel in the mask patterns MP1 through MP4 according to the present embodiment, such that pixels allocated code value "1" in the mask patterns MP1 and MP3 corresponding to the first and third scans (forward scans), and pixels allocated code value "1" in the mask patterns MP2 and MP4 corresponding to the second and fourth scans (backward scans), are generated alternately in the X directions, in rows extending in the X direction. In other words, code values for each pixel are allocated in the mask patterns MP1 through MP4 used in the present embodiment such that pixels to which the code value "1" is allocated in the logical sum pattern MP1+MP3 and pixels to which the code value "1" is allocated in the logical sum pattern MP2+MP4 are generated so as to occur alternately in the X direction in rows extending in the X direction.

More specifically, the logical sum pattern MP1+MP3 according to the present embodiment has code value "1" allocated to 512 of the 1024 pixels therein, and all of these, i.e., 512 pixels to which the code "1" has been allocated are adjacent at both sides in the X direction to a pixel that has been allocated code value "1" in the logical sum pattern MP2+MP4. On the other hand, of the 512 pixels to which the code value "1" has been allocated in the logical sum pattern MP1+MP3, there are no pixels to which the code "1" has been allocated that are adjacent in the X direction to a pixel that has been allocated code value "1" in the logical sum pattern MP2+MP4.

For example, in the row at the edge portion of the logical sum pattern MP1'+MP3' farthest downstream in the Y direction (the top in FIG. 17E), the code value "1" is allocated to the 1st, 3rd, 5th, 7th, 9th, 11th, 13th, 15th, 17th, 19th, 21st, 23rd, 25th, 27th, 29th, and 31st pixels from the upstream side in the X direction (left side in FIG. 17E). On the other hand, in the row at the edge portion of the logical sum pattern MP2'+MP4' farthest downstream in the Y direction (the top in FIG. 17F), the code value "1" is allocated to the 2nd, 4th, 6th, 8th, 10th, 12th, 14th, 16th, 18th, 20th, 22nd, 24th, 26th, 28th, 30th, and 32nd pixels from the upstream side in the X direction (left side in FIG. 17F).

Now, of the row at the edge portion of the logical sum pattern MP1+MP3, farthest downstream in the Y direction (the top in FIG. 17E), the 3rd pixel from the upstream side in the X direction (left side in FIG. 17E) is allocated code value "1", and code value "1" has been allocated in the logical sum pattern MP2+MP4 to the 2nd and 4th pixels from the upstream side in the X direction (left side in FIG. 17F) adjacent thereto at both sides in the X direction, in the row at the edge at the downstream side in the Y direction (the top in FIG. 17F). That is to say, of the row at the edge portion of the logical sum pattern MP1+MP3, farthest downstream in the Y direction (the top in FIG. 17E), the 3rd pixel from the upstream side in the X direction (left side in FIG. 17E) is allocated code value "1", and also the pixels adjacent at both sides in the X direction in the logical sum pattern MP2+MP4 are allocated code value "1".

Here, a pixel at the edge portion upstream in the X direction (left side in the FIGS. 17A through 17F) and a pixel at the edge portion downstream in the X direction (right side in FIGS. 17A through 17F) that are in the same row, are considered to be adjacent. The reason for this is that the mask patterns MP1 through MP4 illustrated in FIGS. 17A through 17D indicate units of repetition of the mask pattern, and these mask patterns actually are used in repetition sequentially in the X direction. Accordingly, when actually applying to quantization data, situated to the right side of a region within binary data equivalent to the pixel at the edge portion downstream in the X direction (right side in FIGS. 17A through 17F) of a certain mask pattern is binary data equivalent to the pixel at the edge portion upstream in the X direction (left side in FIGS. 17A through 17F) of the next mask pattern.

Thus, regarding a pixel allocated code value "1" that is the 1st pixel upstream in the X direction (left side in FIG. 17E) in a row at the edge downstream in the Y direction (top in FIG. 17E) within the logical sum pattern MP1+MP3 for example, code value "1" is allocated to the 32nd and 2nd pixels adjacent at both sides in the X direction, upstream in the X direction (left side in FIG. 17F) in a row at the edge downstream in the Y direction (top in FIG. 17F) within the logical sum pattern MP2+MP4.

Also, the logical sum pattern MP2+MP4 according to the present embodiment illustrated in FIG. 17F has the code value "1" allocated to 512 of the 1024 pixels therein, and all of these, i.e., 512 pixels to which the code "1" has been allocated are adjacent at both sides in the X direction to a pixel that has been allocated code value "1" in the logical sum pattern MP1+MP3. On the other hand, of the 512 pixels to which the code value "1" has been allocated in the logical sum pattern MP2+MP4, there are no pixels to which the code "1" has been allocated that are adjacent in the X direction to a pixel that has been allocated code value "1" in the logical sum pattern MP1+MP3. The mask patterns MP1 through MP4 used in the present embodiment are set based on conditions such as described above.

Driving Order of Driving Blocks in Present Embodiment

FIG. 18A is a diagram illustrating the driving order in time-division driving in the present embodiment. FIG. 18B is a schematic diagram illustrating the way in which dots are formed in a case of driving recording element No. 1 through No. 16 while scanning in the forward direction following the driving order shown in FIG. 18A. FIG. 18C is a schematic diagram illustrating the way in which dots are formed in a case of driving recording element No. 1 through No. 16 while scanning in the backward direction following the driving order shown in FIG. 18A.

An example will be described here where time-division driving is performed for both forward scanning and backward scanning in the driving order of driving block No. 1, driving block No. 9, driving block No. 6, driving block No. 14, driving block No. 3, driving block No. 11, driving block No. 8, driving block No. 16, driving block No. 5, driving block No. 13, driving block No. 2, driving block No. 10, driving block No. 7, driving block No. 15, driving block No. 4, and driving block No. 12, as illustrated in FIG. 18A.

As described above, time-division driving is performed such that the landing positions of ink from the driving blocks differ between forward scanning and backward scanning. More specifically, the driving order of driving blocks in forward scanning and the driving order of driving blocks in backward scanning are the same order to perform reciprocal scanning in the present embodiment. Note that this is not necessarily restricted to the driving order of driving blocks being the same in reciprocal scanning; it is sufficient for the driving order of driving blocks in the backward scan to be opposite to the driving order of driving blocks in the forward scan in order to differ the discharge position of ink when performing reciprocal scanning such as described above.

In a case of performing time-division driving of the recording elements No. 1 through No. 16 following the driving order illustrated in FIG. 18A, in forward scanning, the dot formed from recording element No. 1 driven the first is situated farthest upstream in the X direction as illustrated in FIG. 18B, the dots formed in the order of recording element Nos. 9, 6, 14, 3, 11, 8, 16, 5, 13, 2, 10, 7, 15, and 4, are situated deviated from the upstream side in the X direction toward the downstream side, and the dot formed by the recording element No. 12 driven last is situated farthest downstream in the X direction.

On the other hand, in the backward scan, the dot formed from recording element No. 1 driven the first is situated farthest downstream in the X direction as illustrated in FIG. 18C, the dots formed in the order of recording element Nos. 9, 6, 14, 3, 11, 8, 16, 5, 13, 2, 10, 7, 15, and 4, are situated deviated from the downstream side in the X direction toward the upstream side, and the dot formed by the recording element No. 12 driven last is situated farthest upstream in the X direction.

Thus, by driving the recording elements belonging to the driving blocks according to the driving order illustrated in FIG. 18A, the landing positions of ink in the same rows extending in the Y direction can be made to differ between reciprocal scans.

Recorded Image According to Present Embodiment

As described above, recording with suppressed discharge position deviation between reciprocal scans is performed in the present embodiment, by using the mask patterns MP1 through MP4 illustrated in FIGS. 17A through 17D, and also performing time-division driving following the driving order illustrated in FIG. 18A for both forward scanning and backward scanning. The following is a detailed description of discharge positions of ink in a case where image data having pixel values of "1" or "2" for all of 32 pixels×32 pixels. FIGS. 19A through 19E are diagrams illustrating images recorded in a case where image data is input having pixel values of "1" (to discharge once in one pixel region) for all of 32 pixels×32 pixels.

In a case where the pixel value of the image data is "1" for all pixels corresponding to pixel regions in the unit region 211 in FIG. 8, ink is discharged to pixel regions corresponding to pixels allocated code value "1" in the mask patterns MP1 through MP4 in FIGS. 17A through 17D. That is to say, ink is discharged to pixel region corresponding to the gray pixels in FIG. 17A in the first scan, in FIG. 17B in the second scan, in FIG. 17C in the third scan, and in FIG. 17D in the fourth scan. Of these the first and third scans are forward scans, and the second and fourth scans are backward scans, so the pixels to which ink is discharged in the forward scans are the gray pixels and black pixels in FIG. 17E, and the pixels to which ink is discharged in the backward scans are the gray pixels and black pixels in FIG. 17F.

Figure 19A:
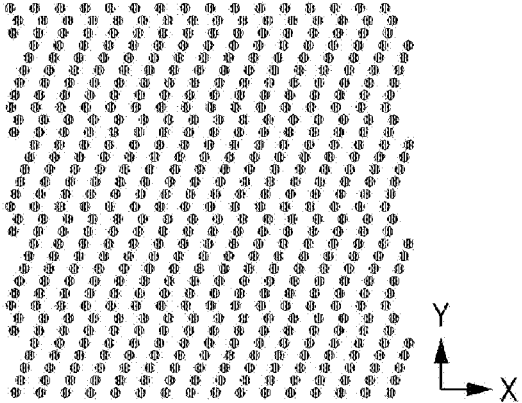
FIGS. 19A through 19E are schematic diagrams illustrating images to be recorded in an embodiment.
Figure 19B:
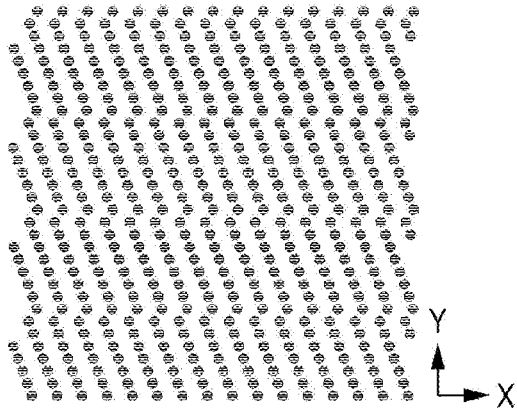
Figure 19C:
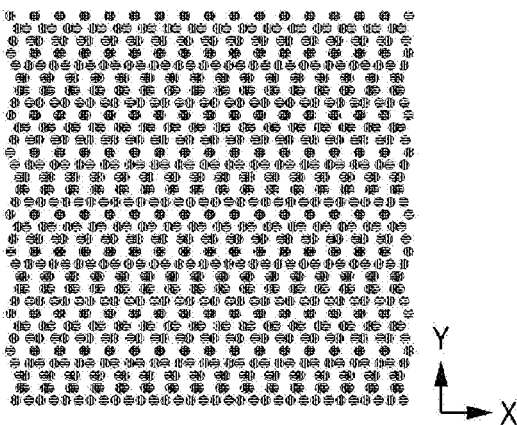
Figure 19D:
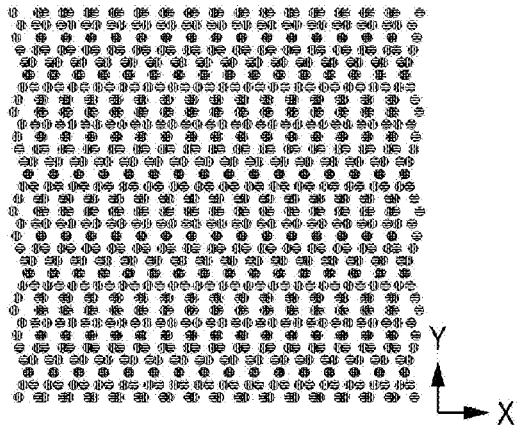

By performing time-division driving in the driving order illustrated in FIG. 18A for both forward scanning and backward scanning, ink will be discharged and dots formed at the positions illustrated in FIG. 19A for the forward scans and in FIG. 19B for the backward scans, if there is no deviation between reciprocal scans. FIG. 19C illustrates a dot arrangement where the dot arrangements in FIGS. 19A and 19B have been overlaid with no positional deviation. FIG. 19D illustrates a case where the dot arrangements have been overlaid with positional deviation of 21.2 μm (equivalent to 1200 dpi) toward the downstream side in the X direction in the backward scan, and FIG. 19E illustrates a case where the dot arrangements have been overlaid with positional deviation of 42.3 μm (equivalent to 600 dpi) toward the downstream side in the X direction in the backward scan.

It can be seen in FIG. 19C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 19D, dots in rows overlapped to begin with newly emerge, while dots in rows that were deviated without overlapping to begin with newly overlap, thereby canceling out variation in concentration. This is also true in FIG. 19E, in that dots in rows overlapped to begin with newly emerge, while dots in rows that were deviated without overlapping to begin with newly overlap, thereby canceling out variation in concentration.

Figure 19E:
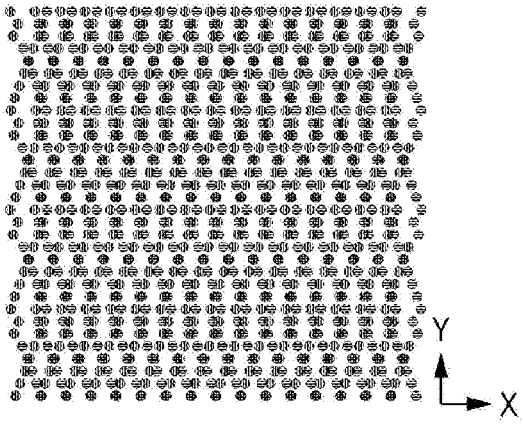

Thus, when viewed as an overall image, there is hardly any variation in concentration occurring in comparison with the case in FIG. 19C where there is no deviation between reciprocal scans, regardless of whether the amount deviation between reciprocal scans is 21.2 μm upstream in the X direction, illustrated in FIG. 19D, or the amount deviation between reciprocal scans is 42.3 μm upstream in the X direction, illustrated in FIG. 19E. Accordingly, it can be seen from FIGS. 19A through 19E that deterioration in image uniformity can be suppressed in the present embodiment, since multiple dots are not formed in the same pixel region. Further, according to the mask patterns and driving order of the present embodiment, recording can be performed with suppressed discharge position deviation between reciprocal scans when recording images with relatively low concentration where one dot is recorded in one pixel region.

FIGS. 20A through 20E are diagrams illustrating images recorded in a case where image data is input having pixel values of "2" for all of 32 pixels×32 pixels (ink is discharge twice in each pixel region). In a case where the pixel value of the image data is "2" for all pixels corresponding to pixel regions in the unit region 211 in FIG. 8, ink is discharged to pixel regions corresponding to pixels allocated code value "1" and pixels allocated code value "2" in the mask patterns MP1 through MP4 in FIGS. 17A through 17D. That is to say, ink is discharged to pixel region corresponding to the gray pixels and the black pixels in FIG. 17A in the first scan, in FIG. 17B in the second scan, in FIG. 17C in the third scan, and in FIG. 17D in the fourth scan.

Of these, the first and third scans are forward scans, and the second and fourth scans are backward scans, so the pixels to which ink is discharged in the forward scans are the gray pixels and black pixels in FIG. 17E, and the pixels to which ink is discharged in the backward scans are the gray pixels and black pixels in FIG. 17F. That is to say, ink is discharged to all pixels, once in the forward scan and once in the backward scan.

Figure 20A:
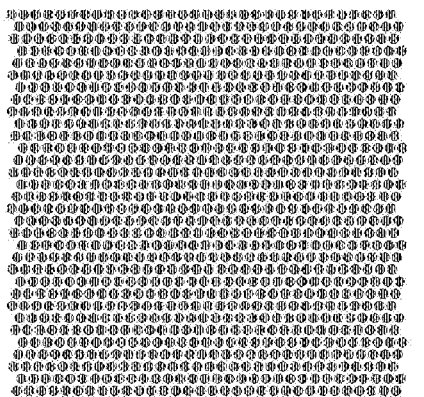
FIGS. 20A through 20E are schematic diagrams illustrating images to be recorded in an embodiment.
Figure 20B:
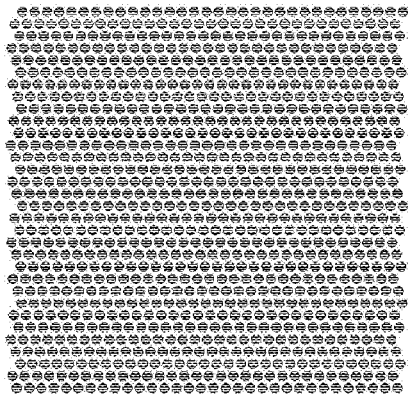
Figure 20C:
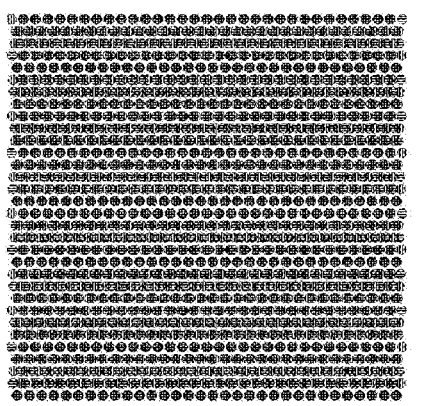

By performing time-division driving in the driving order illustrated in FIG. 18A for both forward scanning and backward scanning, ink will be discharged and dots formed at the positions illustrated in FIG. 20A for the forward scans and in FIG. 20B for the backward scans, if there is no deviation between reciprocal scans. FIG. 20C illustrates a dot arrangement where the dot arrangements in FIGS. 20A and 20B have been overlaid with no positional deviation.

Figure 20D:
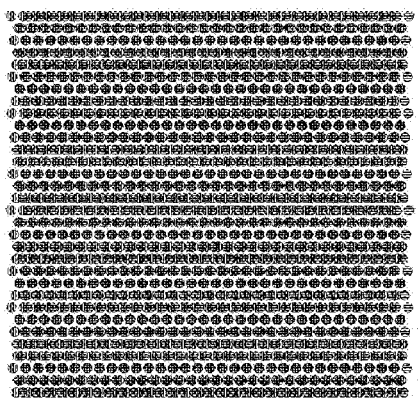
Figure 20E:
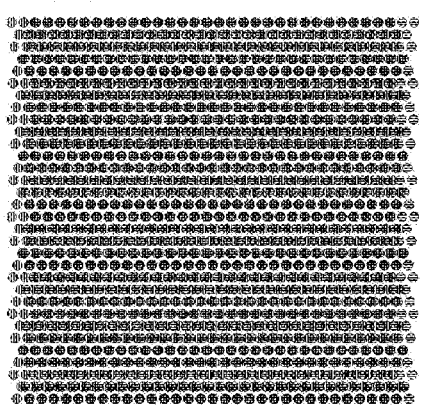

FIG. 20D illustrates a case where the dot arrangements have been overlaid with positional deviation of 21.2 µm (equivalent to 1200 dpi) toward the downstream side in the X direction in the backward scan, and FIG. 20E illustrates a case where the dot arrangements have been overlaid with positional deviation of 42.3 µm (equivalent to 600 dpi) toward the downstream side in the X direction in the backward scan.

It can be seen in FIG. 20C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 20D, dots in rows overlapped to begin with newly emerge, while dots in rows that were deviated without overlapping to begin with newly overlap, thereby canceling out variation in concentration. This is also true in FIG. 20E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 20C where there is no deviation between reciprocal scans, regardless of whether the amount deviation between reciprocal scans is 21.2 µm upstream in the X direction, illustrated in FIG. 20D, or the amount deviation between reciprocal scans is 42.3 µm upstream in the X direction, illustrated in FIG. 20E. Accordingly, recording can be performed with suppressed discharge position deviation between reciprocal scans even when recording two dots per pixel region according to the mask patterns and driving order according to the present embodiment. Thus, according to the mask patterns and driving order of the present embodiment, recording can be performed with suppressed discharge position deviation between reciprocal scans without sacrificing image uniformity, even when recording images with relatively low concentration where one dot is recorded in one pixel region.

First Comparative Example

Next, a first comparative example for the present embodiment will be described in detail. In the first comparative example, recording data is generated so that dots formed in forward scans and dots formed in backward scans are generated in an uncorrelated manner in the X direction, and further, time-division driving is performed so that the landing positions of dots recorded between reciprocal scans are the same.

Figure 21A:
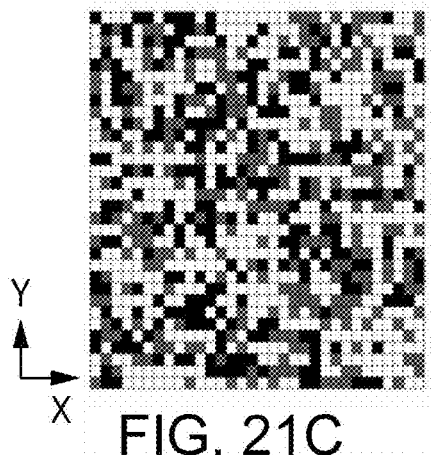
FIGS. 21A through 21F are diagrams illustrating mask patterns applied in a comparative example.
Figure 21B:
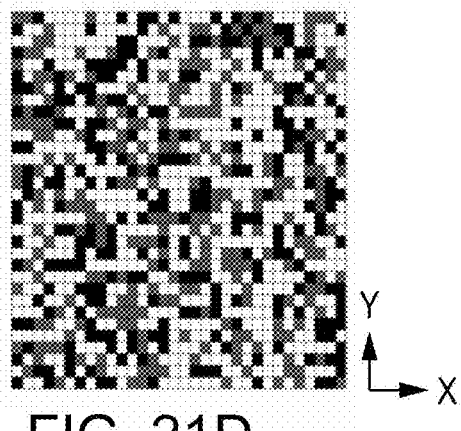
Figure 21C:
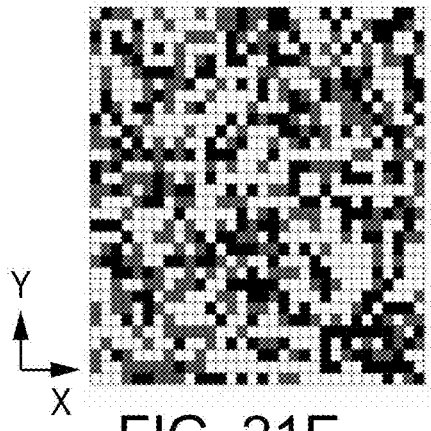
Figure 21D:
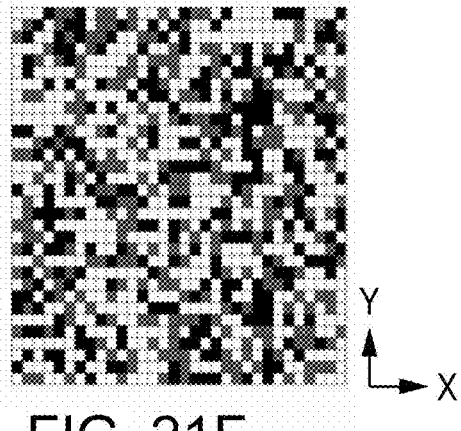
Figure 21E:
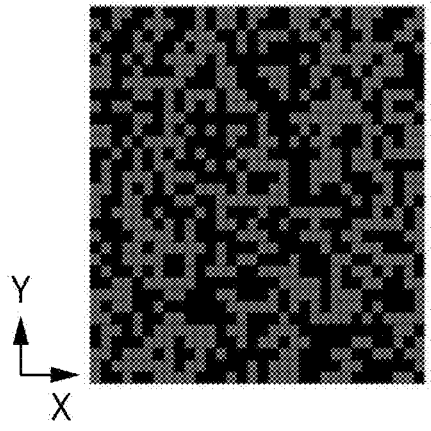
Figure 21F:
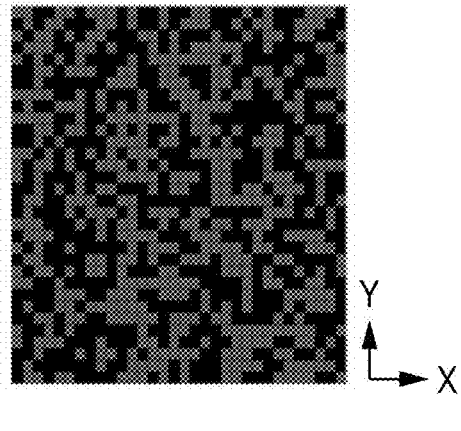

FIGS. 21A through 21F are diagrams illustrating mask patterns used in the comparative example. Note that FIG. 21A illustrates a mask pattern MP1_C corresponding to the first scan, FIG. 21B illustrates a mask pattern MP2_C corresponding to the second scan, FIG. 21C illustrates a mask pattern MP3_C corresponding to the third scan, and FIG. 21D illustrates a mask pattern MP4_C corresponding to the fourth scan. Also, FIG. 21E illustrates a logical sum pattern MP1_C+MP3_C obtained as the logical sum of the number of times of permitted discharge of ink stipulated in the mask pattern MP1_C corresponding to the first scan in FIG. 21A and the mask pattern MP3_C corresponding to the third scan in FIG. 21C. Further, FIG. 21F illustrates a logical sum pattern MP2_C+MP4_C obtained as the logical sum of the number of times of permitted discharge of ink stipulated in the mask pattern MP2_C corresponding to the second scan in FIG. 21B and the mask pattern MP4_C corresponding to the fourth scan in FIG. 21D. In FIGS. 21A through 21F, the white pixels indicate pixels to which the code value "0" has been allocated, the gray pixels indicate pixels to which the code value "1" has been allocated, and the black pixels indicate pixels to which the code value "2" has been allocated.

Unlike the mask patterns MP1 through MP4 illustrated in FIGS. 17A through 17D, the mask patterns MP1_C through MP4_C illustrated in FIGS. 21A through 21D are set such that pixels allocated code value "1" in the logical sum pattern MP1_C+MP3_C do not occur alternately in the X direction with pixels allocated code value "1" in the logical sum pattern MP2_C+MP4_C. More specifically, the pixels in the mask patterns MP1_C through MP4_C have code values allocated such that the pixels allocated code value "1" in the logical sum pattern MP1_C+MP3_C have an array with random white noise properties, and the pixels allocated code value "1" in the logical sum pattern MP2_C+MP4_C have an array with random white noise properties. Other than this settings condition, the mask patterns MP1_C through MP4_C illustrated in FIGS. 21A through 21D are the same as the mask patterns MP1 through MP4 illustrated in FIGS. 17A through 17D.

To describe this in detail, the logical sum pattern MP1_C+MP3_C according to the comparative example has the code value "1" allocated to 513 of the 1024 pixels therein, and of these, 119 pixels to which the code "1" has been allocated are adjacent at both sides in the X direction to a pixel that has been allocated code value "1" in the logical sum pattern MP2_C+MP4_C. On the other hand, of the 513 pixels to which the code value "1" has been allocated in the logical sum pattern MP1_C+MP3_C, 119 pixels to which the code "1" has been allocated are not adjacent in the X direction to a pixel that has been allocated code value "1" in the logical sum pattern MP2_C+MP4_C. That is to say, of the 513 pixels to which the code value "1" has been allocated in the logical sum pattern MP1_C+MP3_C, the number of pixels adjacent at both sides in the X direction to a pixel that has been allocated code value "1" in the logical sum pattern MP2_C+MP4_C, and the number of pixels not adjacent in the X direction, is the same number.

For example, in the row at the edge portion of the logical sum pattern MP1_C+MP3_C farthest downstream in the Y direction (the top in FIG. 21E), the code value "1" is allocated to the 3rd, 4th, 7th, 11th, 13th, 14th, 16th, 17th, 20th, 21st, 22nd, 24th, 26th, 27th, 28th, and 32nd pixels from the upstream side in the X direction (left side in FIG. 21E). On the other hand, the row at the edge portion of the logical sum pattern MP2_C+MP4_C farthest downstream in the Y direction (the top in FIG. 21F), the code value "1" is allocated to the 1st, 2nd, 5th, 6th, 8th, 9th, 10th, 12th, 15th, 18th, 19th, 23rd, 25th, 29th, 30th, and 31st pixels from the upstream side in the X direction (left side in FIG. 21F).

Now, of the row at the edge portion of the logical sum pattern MP1_C+MP3_C farthest downstream in the Y direction (the top in FIG. 21E), the 7th, 11th, 24th, and 32nd pixels allocated code value "1" from the upstream side in the X direction (left side in FIG. 21E) are adjacent in the X direction at both sides to pixels in the logical sum pattern MP2_C+MP4_C to which the code value "1" has been allocated. That is to say, of the pixels allocated code value "1" in the row at the edge portion of the logical sum pattern MP1_C+MP3_C farthest downstream in the Y direction (the top in FIG. 21E), the number of pixels adjacent in the X direction at both sides to pixels in the logical sum pattern MP2_C+MP4_C in the row farthest downstream in the Y direction (the top in FIG. 21F) to which the code value "1" has been allocated, is four.

On the other hand, of the row at the edge portion of the logical sum pattern MP1_C+MP3_C farthest downstream in the Y direction (the top in FIG. 21E), the 21st and 27th pixels allocated code value "1" from the upstream side in the X direction (left side in FIG. 21E) are not adjacent at both sides in the X direction to pixels in the logical sum pattern MP2_C+MP4_C to which the code value "1" has been allocated. That is to say, of the pixels allocated code value "1" in the row at the edge portion of the logical sum pattern MP1_C+MP3_C farthest downstream in the Y direction (the top in FIG. 21E), the number of pixels not adjacent at both sides in the X direction to pixels in the logical sum pattern MP2_C+MP4_C in the row farthest downstream in the Y direction (the top in FIG. 21F) to which the code value "1" has been allocated, is two.

Performing the same calculation for each row within the logical sum pattern MP1_C+MP3_C shows that, of the pixels to which the code value "1" has been allocated in the logical sum pattern MP1_C+MP3_C, the number of pixels adjacent at both sides in the X direction to a pixel in the logical sum pattern MP2_C+MP4_C to which the code value "1" has been allocated is 119, and the number of pixels not adjacent in the X direction also is 119.

In the same way, the logical sum pattern MP2_C+MP4_C according to the comparative example has the code value "1" allocated to 511 of the 1024 pixels therein, and of these, 120 pixels to which the code "1" has been allocated are adjacent at both sides in the X direction to a pixel that has been allocated code value "1" in the logical sum pattern MP1_C+MP3_C. On the other hand, of the 511 pixels to which the code value "1" has been allocated in the logical sum pattern MP2_C+MP4_C, 120 pixels to which the code "1" has been allocated are not adjacent in the X direction to a pixel that has been allocated code value "1" in the logical sum pattern MP2_C+MP4_C. That is to say, of the pixels to which the code value "1" has been allocated in the logical sum pattern MP2_C+MP4_C, the number of pixels adjacent at both sides in the X direction to a pixel that has been allocated code value "1" in the logical sum pattern MP1_C+MP3_C, and the number of pixels not adjacent in the X direction, is the same number.

FIG. 22A is a diagram illustrating the driving order in a forward scan under time-division driving control executed in the first comparative example. FIG. 22B is a diagram illustrating the driving order in a backward scan under time-division driving control executed in the first comparative example. FIG. 22C is a schematic diagram illustrating the way in which dots are formed in a case of driving the recording elements No. 1 through No. 16 while scanning in the forward direction following the driving order illustrated in FIG. 22A. FIG. 22D is a schematic diagram illustrating the way in which dots are formed in a case of driving the recording elements No. 1 through No. 16 while scanning in the backward direction following the driving order illustrated in FIG. 22B.

The driving order in forward scanning according to the first comparative example is time-division driving in the driving order of driving block No. 1, driving block No. 9, driving block No. 6, driving block No. 14, driving block No. 3, driving block No. 11, driving block No. 8, driving block No. 16, driving block No. 5, driving block No. 13, driving block No. 2, driving block No. 10, driving block No. 7, driving block No. 15, driving block No. 4, and driving block No. 12, as illustrated in FIG. 22A. Also, the driving order in backward scanning is time-division driving in the driving order of driving block No. 12, driving block No. 4, driving block No. 15, driving block No. 7, driving block No. 10, driving block No. 2, driving block No. 13, driving block No. 5, driving block No. 16, driving block No. 8, driving block No. 11, driving block No. 3, driving block No. 14, driving block No. 6, driving block No. 9, and driving block No. 1, as illustrated in FIG. 22B. That is to say, the driving order of the driving blocks in backward scans is the reverse order from the driving order of the driving blocks in forward scans in the first comparative example.

In a case of performing time-division driving of the recording elements No. 1 through No. 16 following the driving order illustrated in FIG. 22A, the dot formed from recording element No. 1 driven the first is situated farthest upstream in the X direction as illustrated in FIG. 22C, the dots formed in the order of recording element Nos. 9, 6, 14, 3, 11, 8, 16, 5, 13, 2, 10, 7, 15, 4, are situated deviated from the upstream side in the X direction toward the downstream side, and the dot formed by the recording element No. 12 driven last is situated farthest downstream in the X direction.

On the other hand, in a case of performing time-division driving of the recording elements No. 1 through No. 16 following the driving order illustrated in FIG. 22B, in the backward direction scan, the dot formed from recording element No. 1 driven the last is situated farthest upstream in the X direction as illustrated in FIG. 22D, the dots formed in the order of recording element Nos. 9, 6, 14, 3, 11, 8, 16, 5, 13, 2, 10, 7, 15, 4, are situated deviated from the downstream side in the X direction toward the upstream side, and the dot formed by the recording element No. 12 driven first is situated farthest downstream in the X direction. Accordingly, when driving the recording elements belonging to the respective driving blocks in the driving order illustrated in FIGS. 22A and 22B for forward scanning and backward scanning, the landing position of ink from the driving blocks in forward scanning and backward scanning is the same.

An image recorded using the mask patterns MP1_C through MP4_C illustrated in FIGS. 21A through 21D and by performing time-division driving following the driving order illustrated in FIG. 22A for forward scanning and in FIG. 22B for backward scanning will be described below. FIGS. 23A through 23E are diagrams illustrating images recorded in a case where image data is input having pixel values of "1" for all of 32 pixels×32 pixels (ink is discharged one in each pixel region).

In a case where the pixel value of the image data is "1" for all pixels corresponding to pixel regions in the unit region 211 in FIG. 8, ink is discharged to pixel regions corresponding to pixels allocated code value "1" in the mask patterns MP1_C through MP4_C in FIGS. 21A through 21D. That is to say, ink is discharged to pixel region corresponding to the gray pixels in FIG. 21A in the first scan, in FIG. 21B in the second scan, in FIG. 21C in the third scan, and in FIG. 21D in the fourth scan. Of these, the first and third scans are forward scans, and the second and fourth scans are backward scans, so the pixels to which ink is discharged in the forward scans are the gray pixels in FIG. 21E, and the pixels to which ink is discharged in the backward scans are the gray pixels in FIG. 21F.

Figure 23A:
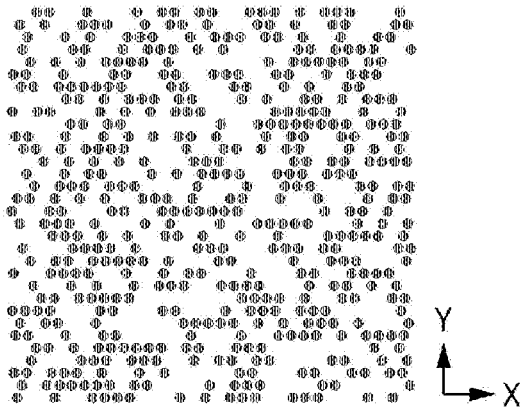
FIGS. 23A through 23E are schematic diagrams illustrating images to be recorded in a comparative example.
Figure 23B:
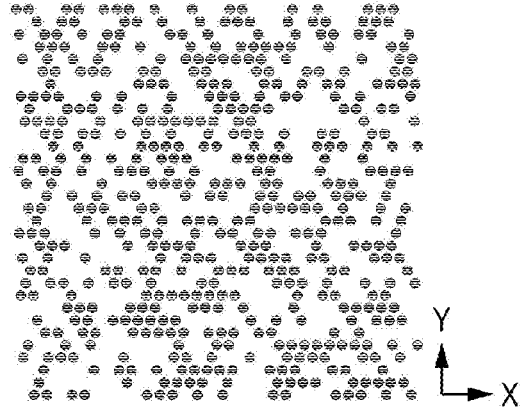
Figure 23C:
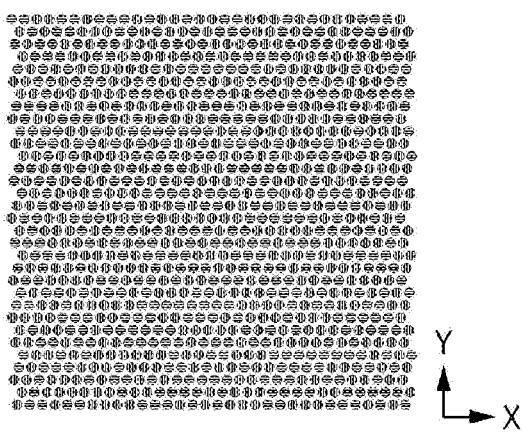
Figure 23D:
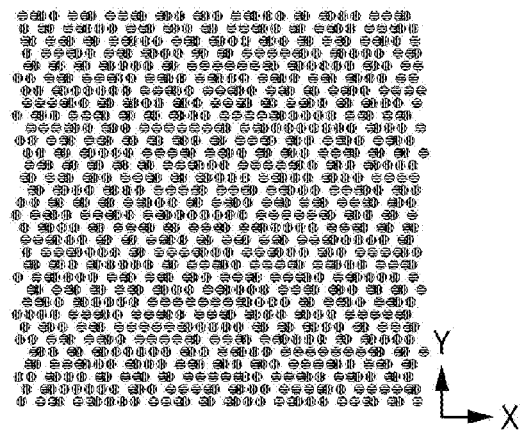
Figure 23E:
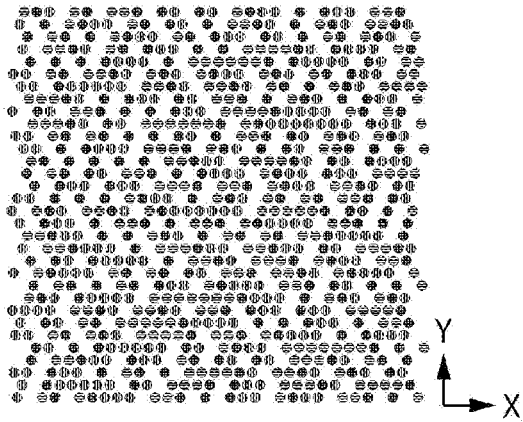

By performing time-division driving in the driving order illustrated in FIG. 22A for forward scanning, and time-division driving in the driving order illustrated in FIG. 22B for backward scanning, ink will be discharged and dots formed at the positions illustrated in FIG. 23A for the forward scans and in FIG. 23B for the backward scans, if there is no deviation between reciprocal scans. FIG. 23C illustrates a dot arrangement where the dot arrangements in FIGS. 23A and 23B have been overlaid with no positional deviation. FIG. 23D illustrates a case where the dot arrangements have been overlaid with positional deviation of 21.2 µm (equivalent to 1200 dpi) toward the downstream side in the X direction in the backward scan, and FIG. 23E illustrates a case where the dot arrangements have been overlaid with positional deviation of 42.3 µm (equivalent to 600 dpi) toward the downstream side in the X direction in the backward scan.

It can be seen in FIG. 23C that the first comparative example is capable of recording dots with no overlapping or missing, in a case where there is no deviation between reciprocal scans. However, if deviation between reciprocal scans does occur, overlapping and missing dots begin to be conspicuous as illustrated in FIG. 23D. If the deviation between reciprocal scans increases, overlapping and missing dots becomes even more conspicuous as illustrated in FIG. 23E, resulting in an image with visibly poor image quality being recorded. Thus, the first comparative example records images where discharge position deviation between reciprocal scans is conspicuous, when recording low-concentration images.

Second Comparative Example

A second comparative example will be described. In the same way as with the first comparative example, recording data is generated so that dots formed in forward scans and dots formed in backward scans are generated in an uncorrelated manner in the X direction. On the other hand, time-division driving is performed in the same way as in the first embodiment, so that the landing positions of dots recorded by the driving blocks are the same in forward scanning and backward scanning.

That is to say, the second comparative example uses the mask patterns MP1_C through MP4_C illustrated in FIGS. 21A through 21D, and the time-division driving illustrated in FIG. 18A for both forward scanning and backward scanning. An image recorded using the mask patterns MP1_C through MP4_C illustrated in FIGS. 21A through 21D and by performing time-division driving following the driving order illustrated in FIG. 18A for both forward scanning and backward scanning will be described below. FIGS. 24A through 24E are diagrams illustrating images recorded by the second comparative example in a case where image data is input having pixel values of "1" for all of 32 pixels×32 pixels (ink is discharged one in each pixel region).

In a case where the pixel value of the image data is "1" for all pixels corresponding to pixel regions in the unit region 211 in FIG. 8, ink is discharged to pixel regions corresponding to pixels allocated code value "1" in the mask patterns MP1_C through MP4_C in FIGS. 21A through 21D. That is to say, ink is discharged to pixel region corresponding to the gray pixels in FIG. 21A in the first scan, in FIG. 21B in the second scan, in FIG. 21C in the third scan, and in FIG. 21D in the fourth scan. Of these, the first and third scans are forward scans, and the second and fourth scans are backward scans, so the pixels to which ink is discharged in the forward scans are the gray pixels and black pixels in FIG. 21E, and the pixels to which ink is discharged in the backward scans are the gray pixels in FIG. 21F.

Figure 24A:
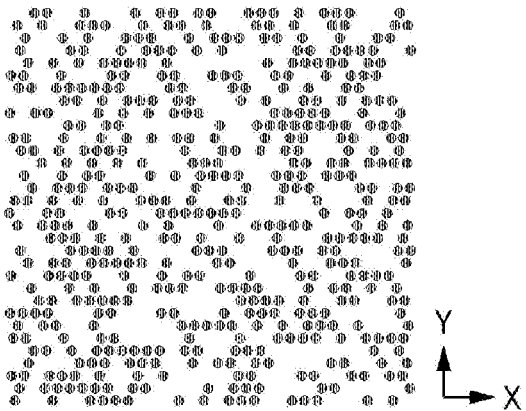
FIGS. 24A through 24E are schematic diagrams illustrating images to be recorded in a comparative example.
Figure 24B:
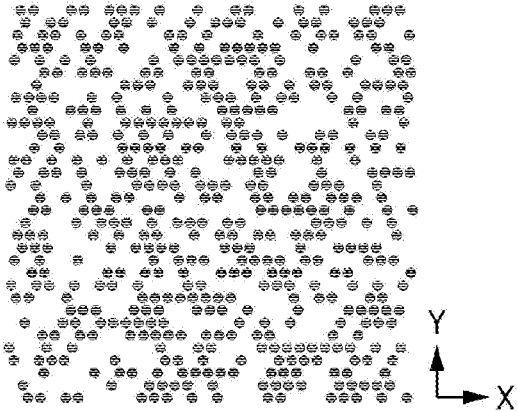
Figure 24C:
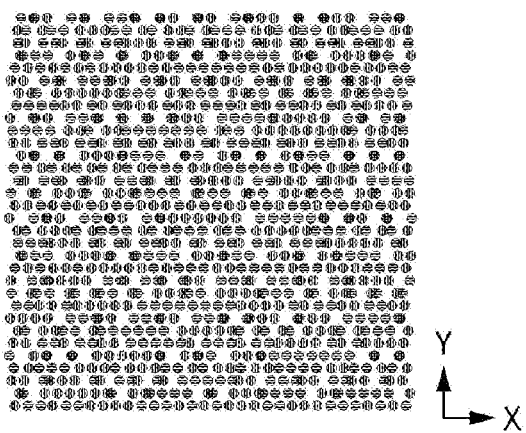
Figure 24D:
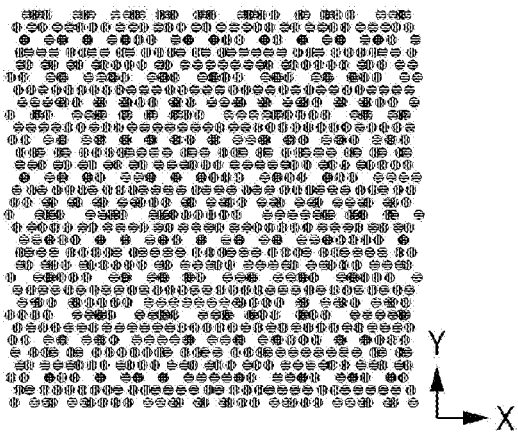
Figure 24E:
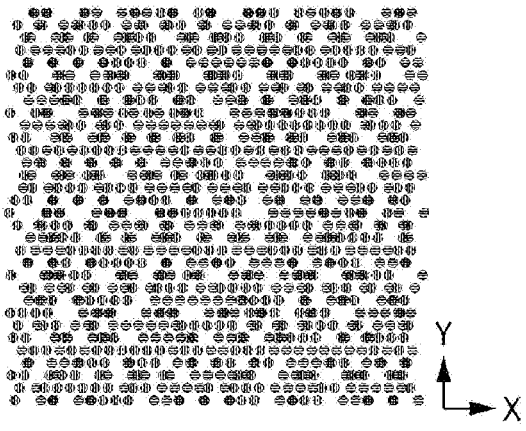

By performing time-division driving in the driving order illustrated in FIG. 18A for both forward scanning and backward scanning, ink will be discharged and dots formed at the positions illustrated in FIG. 24A for the forward scans and in FIG. 24B for the backward scans, if there is no deviation between reciprocal scans. FIG. 24C illustrates a dot arrangement where the dot arrangements in FIGS. 24A and 24B have been overlaid with no positional deviation. FIG. 24D illustrates a case where the dot arrangements have been overlaid with positional deviation of 21.2 µm (equivalent to 1200 dpi) toward the downstream side in the X direction in the backward scan, and FIG. 24E illustrates a case where the dot arrangements have been overlaid with positional deviation of 42.3 µm (equivalent to 600 dpi) toward the downstream side in the X direction in the backward scan.

It can be seen in FIG. 24C that the second comparative example performs recording in which there are rows where dots from the forward scans and dots from the backward scans are recorded almost completely overlapped, rows partly overlapped, and rows recorded without hardly any overlapping, these various states being intermingled. Accordingly, in a case where there is relatively little deviation between reciprocal scans, such as illustrated in FIG. 24D, there are more overlapping and missing dots as compared to the case illustrated in FIG. 24C, but an image can be recorded that does not differ very much. However, the deviation between reciprocal scans is relatively great, overlapping and missing dots becomes conspicuous as illustrated in FIG. 24E, and the deterioration in image quality is visibly poorer. Dispersion in the X direction of pixels set for recording is low, as described earlier with reference to FIGS. 15A through 15D, so deterioration of image quality becomes insuppressible in cases where the deviation between reciprocal scans is great.

It can thus be seen from the above description that the second comparative example also records images where discharge position deviation between reciprocal scans is conspicuous, when recording low-concentration images. Accordingly, confirmation by experimentation can be made that the first embodiment can suppress discharge position deviation between reciprocal scans when recording a low-concentration image, by comparing images recorded according to the first embodiment (FIGS. 19A through 19E) with images recorded according to the first and second comparative examples (FIGS. 23A through 24E).

Modifications of First Embodiment

Although a case has been described in the first embodiment where the mask patterns MP1 through MP4 such as illustrated in FIGS. 17A through 17D are used, other arrangements may be made. That is to say, mask patterns that generate recording data may be used where, of the dots recorded in backward scanning, the number of dots adjacent in the X direction with dots recorded in forward scanning is larger than the number of dots not adjacent in the X direction with dots recorded in forward scanning. Further, mask patterns that generate recording data where dots formed in forward scanning and dots formed in backward scanning are generated alternating in the X direction are even more preferable.

Figure 25A:
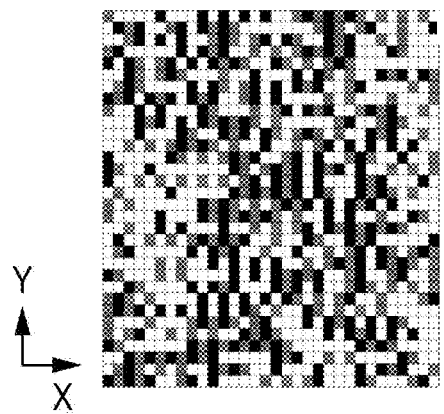
FIGS. 25A through 25F are diagrams illustrating mask patterns applied in an embodiment.
Figure 25B:
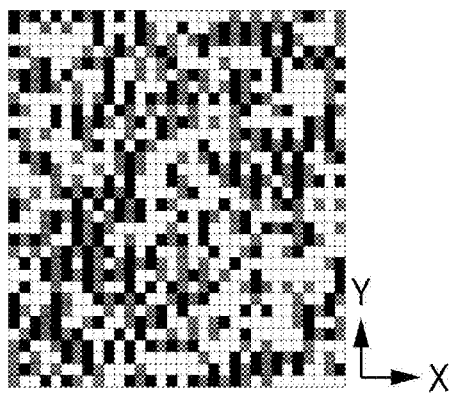
Figure 25C:
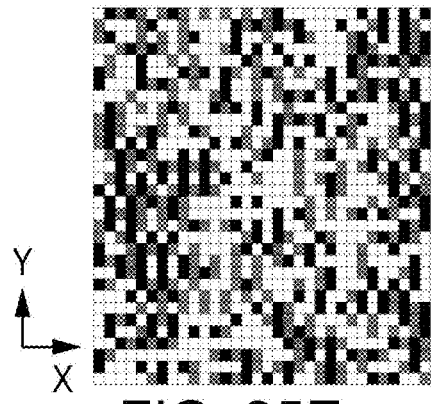
Figure 25D:
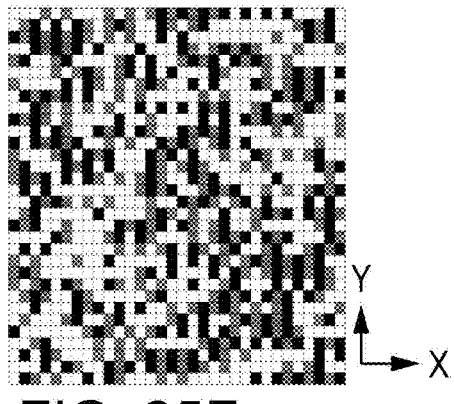
Figure 25E:
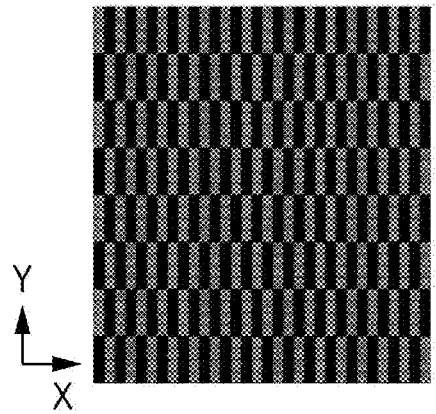
Figure 25F:
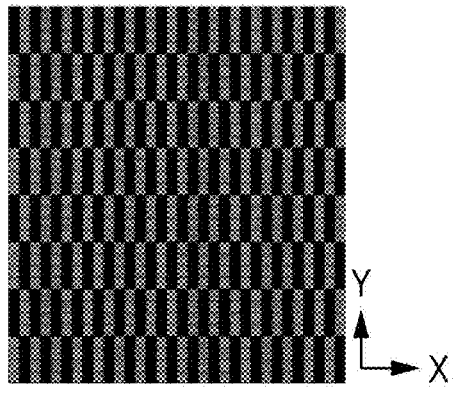

FIGS. 25A through 25F are diagrams illustrating other mask patterns that can be used in the present embodiment. Note that FIG. 25A illustrates a mask pattern MP1_X corresponding to the first scan, FIG. 25B illustrates a mask pattern MP2_X corresponding to the second scan, FIG. 25C illustrates a mask pattern MP3_X corresponding to the third scan, and FIG. 25D illustrates a mask pattern MP4_X corresponding to the fourth scan. Also, FIG. 25E illustrates a logical sum pattern MP1_X+MP3_X obtained as the logical sum of the number of times of permitted discharge of ink stipulated in the mask pattern MP1_X corresponding to the first scan in FIG. 25A and the mask pattern MP3_X corresponding to the third scan in FIG. 25C. Further, FIG. 25F illustrates a logical sum pattern MP2_X+MP4_X obtained as the logical sum of the number of times of permitted discharge of ink stipulated in the mask pattern MP2_X corresponding to the second scan in FIG. 25B and the mask pattern MP4_X corresponding to the fourth scan in FIG. 25D. In FIGS. 25A through 25F, the white pixels indicate pixels to which the code value "0" has been allocated, the gray pixels indicate pixels to which the code value "1" has been allocated, and the black pixels indicate pixels to which the code value "2" has been allocated.

Now, pixels to which the code value "1" has been allocated in the logical sum pattern MP1_X+MP3_X illustrated in FIG. 25E, and pixels to which the code value "1" has been allocated in the logical sum pattern MP2_X+MP4_X illustrated in FIG. 25F, occur alternately in the X direction in the rows extending in the X direction. Accordingly, the advantages of the present embodiment can be obtained in a case of using the mask patterns MP1_X through MP4_X illustrated in FIGS. 25A through 25D as well.

Figure 26A:
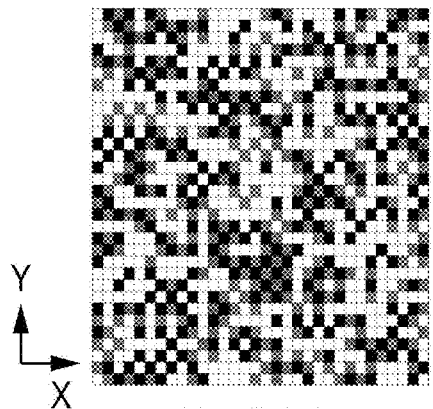
FIGS. 26A through 26F are diagrams illustrating mask patterns applied in an embodiment.
Figure 26B:
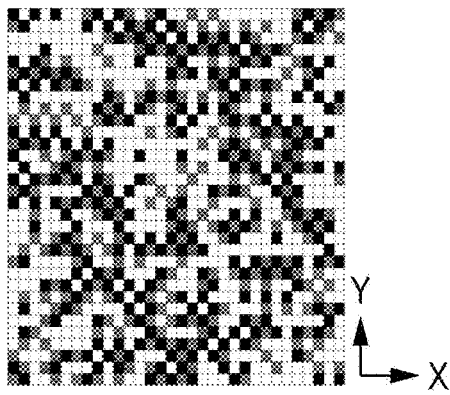
Figure 26C:
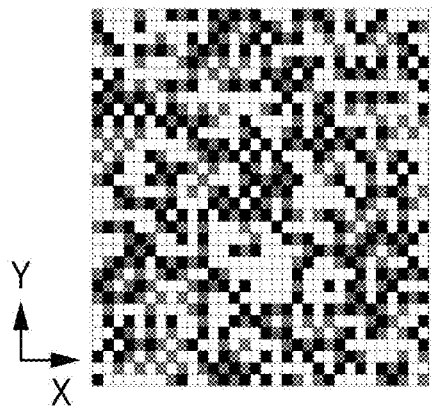
Figure 26D:
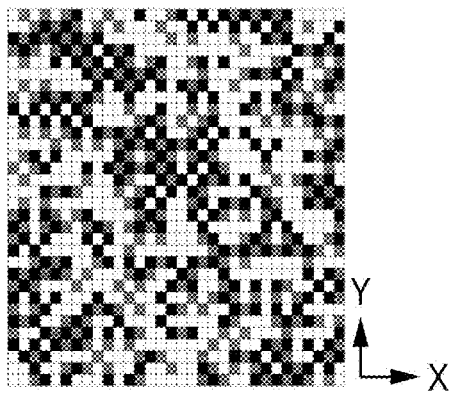
Figure 26E:
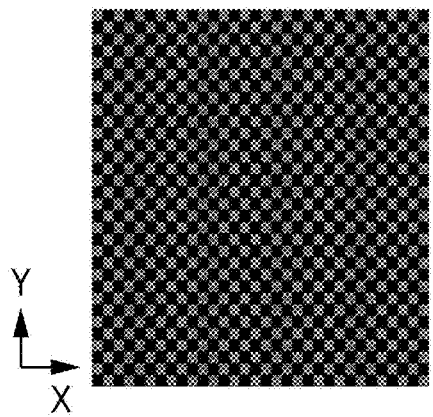
Figure 26F:
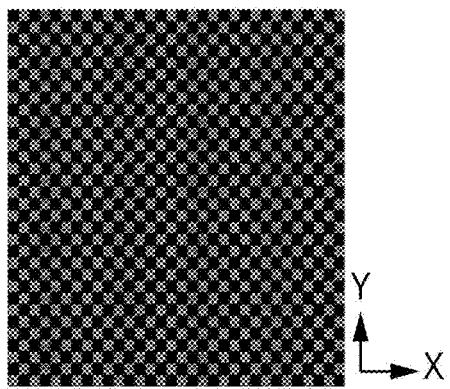

FIGS. 26A through 26F are diagrams illustrating other mask patterns that can be used in the present embodiment. Note that FIG. 26A illustrates a mask pattern MP1_Y corresponding to the first scan, FIG. 26B illustrates a mask pattern MP2_Y corresponding to the second scan, FIG. 26C illustrates a mask pattern MP3_Y corresponding to the third scan, and FIG. 26D illustrates a mask pattern MP4_Y corresponding to the fourth scan. Also, FIG. 26E illustrates a logical sum pattern MP1_Y+MP3_Y obtained as the logical sum of the number of times of permitted discharge of ink stipulated in the mask pattern MP1_Y corresponding to the first scan in FIG. 26A and the mask pattern MP3_Y corresponding to the third scan in FIG. 26C. Further, FIG. 26F illustrates a logical sum pattern MP2_Y+MP4_Y obtained as the logical sum of the number of times of permitted discharge of ink stipulated in the mask pattern MP2_Y corresponding to the second scan in FIG. 26B and the mask pattern MP4_Y corresponding to the fourth scan in FIG. 26D. In FIGS. 26A through 26F, the white pixels indicate pixels to which the code value "0" has been allocated, the gray pixels indicate pixels to which the code value "1" has been allocated, and the black pixels indicate pixels to which the code value "2" has been allocated.

Now, pixels to which the code value "1" has been allocated in the logical sum pattern MP1_Y+MP3_Y illustrated in FIG. 26E, and pixels to which the code value "1" has been allocated in the logical sum pattern MP2_Y+MP4_Y illustrated in FIG. 26F, occur alternately in the X direction in the rows extending in the X direction. Accordingly, the advantages of the present embodiment can be obtained in a case of using the mask patterns MP1_Y through MP4_Y illustrated in FIGS. 26A through 26D as well.

Figure 27A:
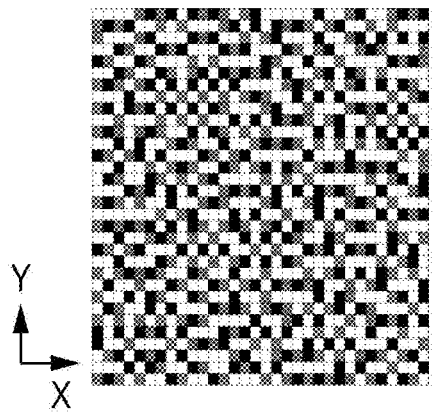
FIGS. 27A through 27F are diagrams illustrating mask patterns applied in an embodiment.
Figure 27B:
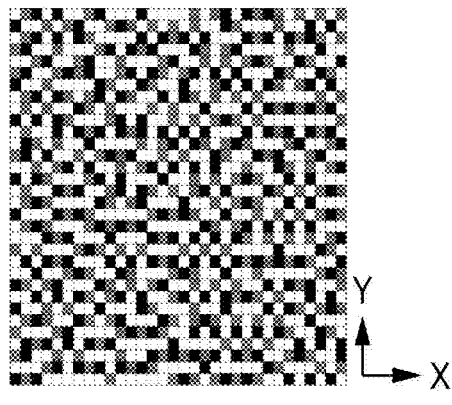
Figure 27C:
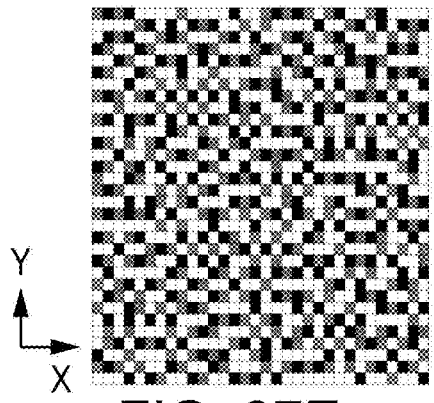
Figure 27D:
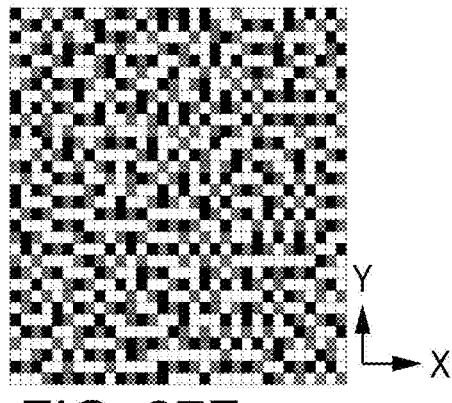
Figure 27E:
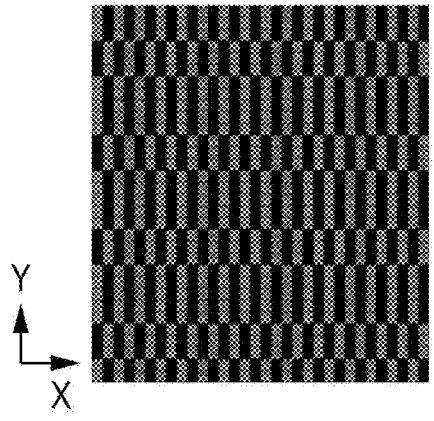
Figure 27F:
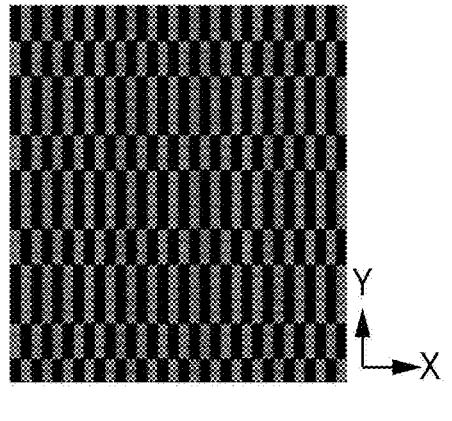

FIGS. 27A through 27F are diagrams illustrating other mask patterns that can be used in the present embodiment. Note that FIG. 27A illustrates a mask pattern MP1_Z corresponding to the first scan, FIG. 27B illustrates a mask pattern MP2_Z corresponding to the second scan, FIG. 27C illustrates a mask pattern MP3_Z corresponding to the third scan, and FIG. 27D illustrates a mask pattern MP4_Z corresponding to the fourth scan. Also, FIG. 27E illustrates a logical sum pattern MP1_Z+MP3_Z obtained as the logical sum of the number of times of permitted discharge of ink stipulated in the mask pattern MP1_Z corresponding to the first scan in FIG. 27A and the mask pattern MP3_Z corresponding to the third scan in FIG. 27C. Further, FIG. 27F illustrates a logical sum pattern MP2_Z+MP4_Z obtained as the logical sum of the number of times of permitted discharge of ink stipulated in the mask pattern MP2_Z corresponding to the second scan in FIG. 27B and the mask pattern MP4_Z corresponding to the fourth scan in FIG. 27D. In FIGS. 27A through 27F, the white pixels indicate pixels to which the code value "0" has been allocated, the gray pixels indicate pixels to which the code value "1" has been allocated, and the black pixels indicate pixels to which the code value "2" has been allocated.

Now, pixels to which the code value "1" has been allocated in the logical sum pattern MP1_Z+MP3_Z illustrated in FIG. 27E, and pixels to which the code value "1" has been allocated in the logical sum pattern MP2_Z+MP4_Z illustrated in FIG. 27F, occur alternately in the X direction in the rows extending in the X direction. Accordingly, the advantages of the present embodiment can be obtained in a case of using the mask patterns MP1_Z through MP4_Z illustrated in FIGS. 27A through 27D as well.

Further, the mask patterns MP1_Z through MP4_Z illustrated in FIGS. 27A through 27D are each set so that the arrangement of pixels to which code value "1" is allocated does not assume white noise properties. In the same way, settings are made so that the arrangement of pixels to which code value "2" is allocated does not assume white noise properties either. Accordingly, recording can be performed where dispersion is high among dots in each individual scan. It should be noted that while mask patterns have been described that have a certain level of cyclicity in the X direction and the Y direction regarding the pixels to which code value "1" has been allocated, in FIGS. 25A through 27F, cyclicity is not indispensable.

Figure 45A:
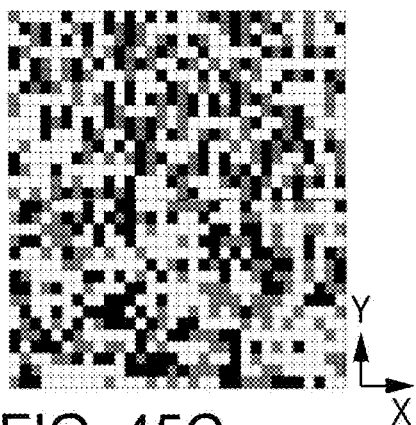
FIGS. 45A through 45F are diagrams illustrating mask patterns applied in an embodiment.
Figure 45B:
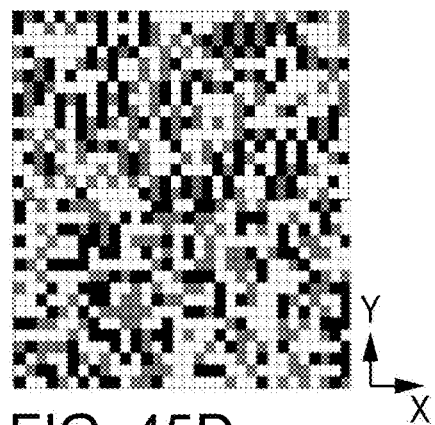
Figure 45C:
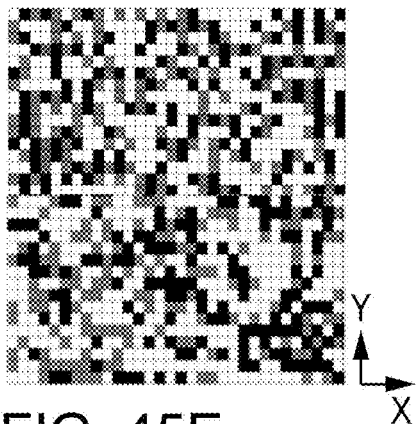
Figure 45D:
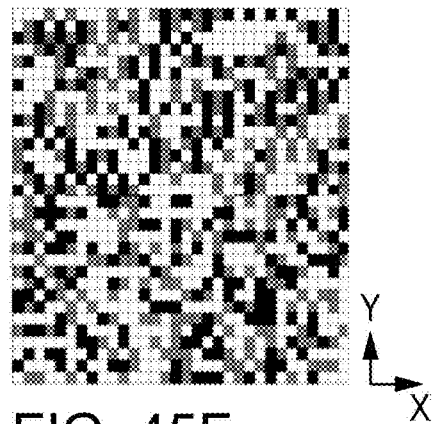
Figure 45E:
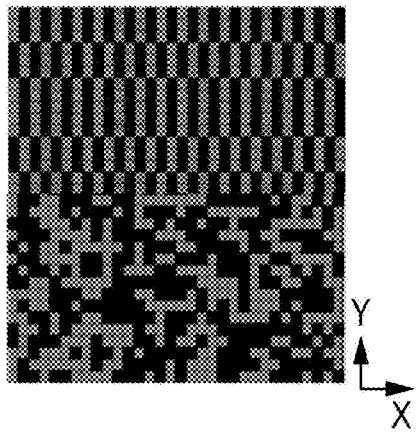
Figure 45F:
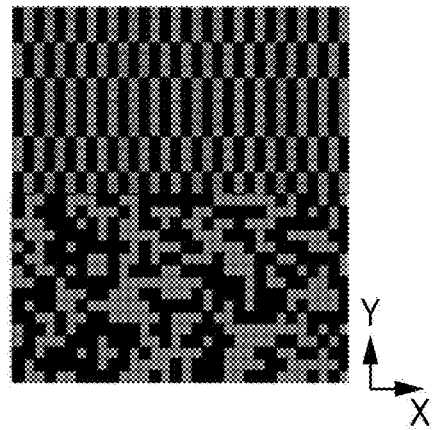

FIGS. 45A through 45F are diagrams illustrating other mask patterns that can be used in the present embodiment. Note that FIG. 45A illustrates a mask pattern MP1_W corresponding to the first scan, FIG. 45B illustrates a mask pattern MP2_W corresponding to the second scan, FIG. 45C illustrates a mask pattern MP3_W corresponding to the third scan, and FIG. 45D illustrates a mask pattern MP4_W corresponding to the fourth scan. Also, FIG. 45E illustrates a logical sum pattern MP1_W+MP3_W obtained as the logical sum of the number of times of permitted discharge of ink stipulated in the mask pattern MP1_W corresponding to the first scan in FIG. 45A and the mask pattern MP3_W corresponding to the third scan in FIG. 45C. Further, FIG. 45F illustrates a logical sum pattern MP2_W+MP4_W obtained as the logical sum of the number of times of permitted discharge of ink stipulated in the mask pattern MP2_W corresponding to the second scan in FIG. 45B and the mask pattern MP4_W corresponding to the fourth scan in FIG. 45D. In FIGS. 45A through 45F, the white pixels indicate pixels to which the code value "0" has been allocated, the gray pixels indicate pixels to which the code value "1" has been allocated, and the black pixels indicate pixels to which the code value "2" has been allocated.

Now, pixels to which the code value "1" has been allocated in a region at the lower half in the Y-direction downstream side in the logical sum pattern MP1_W+MP3_W illustrated in FIG. 45E, and pixels to which the code value "1" has been allocated in a region at the lower half in the Y-direction downstream side in the logical sum pattern MP2_W+MP4_W illustrated in FIG. 45F, occur alternately in the X direction in the rows extending in the X direction.

In detail, all pixels to which code value "1" has been allocated in a region that is the lower half in the Y-direction downstream side of the logical sum pattern MP1_W+MP3_W are adjacent at both sides in the X direction to pixels to which code value "1" has been allocated in a region that is the lower half in the Y-direction downstream side of the logical sum pattern MP2_W+MP4_W. Also, all pixels to which code value "1" has been allocated in a region that is the lower half in the Y-direction downstream side of the logical sum pattern MP2_W+MP4_W are adjacent at both sides in the X direction to pixels to which code value "1" has been allocated in a region that is the lower half in the Y-direction downstream side of the logical sum pattern MP1_W+MP3_W.

On the other hand, settings have been made such that pixels to which code value "1" has been allocated in a region that is the upper half in the Y-direction upstream side of the logical sum pattern MP1_W+MP3_W illustrated in FIG. 45E, and pixels to which code value "1" has been allocated in a region that is the upper half in the Y-direction upstream side of the logical sum pattern MP2_W+MP4_W illustrated in FIG. 45F, do not alternate in the X direction. Specifically, pixels to which code value "1" has been allocated in the region that is the upper half in the Y-direction upstream side of the logical sum pattern MP1_W+MP3_W are arranged so as to have random white noise properties, and pixels to which code value "1" has been allocated in the region that is the upper half in the Y-direction upstream side of the logical sum pattern MP2_W+MP4_W are arranged so as to have random white noise properties.

In further detail, of the pixels to which code value "1" has been allocated in the region that is the upper half in the Y-direction upstream side of the logical sum pattern MP1_W+MP3_W, the number of pixels that are adjacent at both sides in the X direction to pixels to which code value "1" has been allocated in the region that is the upper half in the Y-direction upstream side of the logical sum pattern MP2_W+MP4_W, and the number of pixels that are not adjacent at both sides in the X direction to pixels to which code value "1" has been allocated in the region that is the upper half in the Y-direction upstream side of the logical sum pattern MP2_W+MP4_W, are approximately the same. Also, of the pixels to which code value "1" has been allocated in the region that is the upper half in the Y-direction upstream side of the logical sum pattern MP2_W+MP4_W, the number of pixels that are adjacent at both sides in the X direction to pixels to which code value "1" has been allocated in the region that is the upper half in the Y-direction upstream side of the logical sum pattern MP1_W+MP3_W, and the number of pixels that are not adjacent at both sides in the X direction to pixels to which code value "1" has been allocated in the region that is the upper half in the Y-direction upstream side of the logical sum pattern MP1_W+MP3_W, are approximately the same.

Accordingly, when looking at the entire region of the logical sum pattern MP1_W+MP3_W, of the pixels in the logical sum pattern MP1_W+MP3_W to which code value "1" has been allocated, the number of pixels that are adjacent at both sides in the X direction to pixels in the logical sum pattern MP2_W+MP4_W to which code value "1" has been allocated is larger than the number of pixels in the logical sum pattern MP2_W+MP4_W that are not adjacent at both sides in the X direction to pixels to which code value "1" has been allocated. Also, when looking at the entire region of the logical sum pattern MP2_W+MP4_W, of the pixels in the logical sum pattern MP2_W+MP4_W to which code value "1" has been allocated, the number of pixels that are adjacent at both sides in the X direction to pixels in the logical sum pattern MP1_W+MP3_W to which code value "1" has been allocated is larger than the number of pixels in the logical sum pattern MP1_W+MP3_W that are not adjacent at both sides in the X direction to pixels to which code value "1" has been allocated.

Thus, the advantages of the present embodiment can be obtained as long as mask patterns are used where, of the pixels allocated code value "1" in one logical sum pattern, the number of pixels that are adjacent at both sides in the X direction to pixels in the other logical sum pattern to which code value "1" has been allocated is larger than the number of pixels that are not adjacent at both sides in the X direction to pixels in the other logical sum pattern to which code value "1" has been allocated.

Although an arrangement has been described in the first embodiment where the driving order illustrated in FIG. 18A is performed for both forward scanning and backward scanning, i.e., where time-division driving is performed in the same driving order, other arrangements may be made. It is sufficient that the driving order in the first embodiment be such that the driving order of driving blocks in the backward scan be the opposite order from the driving order of driving blocks in the forward scan when scanning reciprocally, as mentioned above.

The driving order in the first embodiment preferably is such that the driving order of driving blocks in the backward scan is the opposite order from an offset order of the driving order of the driving blocks in the forward scan when scanning reciprocally. This point will be described below in detail. In a case where the driving order for forward scanning is the order illustrated in FIG. 28A, and the driving order for backward scanning is the order illustrated in FIG. 28B, the driving order in FIG. 28B is the opposite order from an offset order of the driving order in FIG. 28A.

The driving order illustrated in FIG. 28A is the driving order of driving block No. 1, driving block No. 2, driving block No. 3, driving block No. 4, driving block No. 5, driving block No. 6, driving block No. 7, driving block No. 8, driving block No. 9, driving block No. 10, driving block No. 11, driving block No. 12, driving block No. 13, driving block No. 14, driving block No. 15, and driving block No. 16.

An example of an offset order of the driving order illustrated in FIG. 28A is the driving order of driving block No. 2, driving block No. 3, driving block No. 4, driving block No. 5, driving block No. 6, driving block No. 7, driving block No. 8, driving block No. 9, driving block No. 10, driving block No. 11, driving block No. 12, driving block No. 13, driving block No. 14, driving block No. 15, driving block No. 16, and driving block No. 1. In this order, the driving block No. 2 through driving block No. 16 have been shifted up one each, and the driving block No. 1 brought to the last.

Another example of an offset order of the driving order illustrated in FIG. 28A is the driving order of driving block No. 3, driving block No. 4, driving block No. 5, driving block No. 6, driving block No. 7, driving block No. 8, driving block No. 9, driving block No. 10, driving block No. 11, driving block No. 12, driving block No. 13, driving block No. 14, driving block No. 15, driving block No. 16, driving block No. 1, and driving block No. 2. In this order, the driving block No. 3 through driving block No. 16 have been shifted up two each, and the driving block No. 1 and driving block No. 2 have been brought to the last. In other words, this order is an order where the driving order in FIG. 28A has been offset forward by two, and the driving block No. 1 and driving block No. 2 go to the back with their order maintained.

Along the same line of thought, the driving order of driving block No. 9, driving block No. 10, driving block No. 11, driving block No. 12, driving block No. 13, driving block No. 14, driving block No. 15, driving block No. 16, driving block No. 1, driving block No. 2, driving block No. 3, driving block No. 4, driving block No. 5, driving block No. 6, driving block No. 7, and driving block No. 8, also is an offset order of the driving order illustrated in FIG. 28A, offset by eight. Note that the driving order illustrated in FIG. 28B is the opposite order of this order. Thus, it can be seen that the driving order illustrated in FIG. 28B is the opposite order of an offset order of the driving order illustrated in FIG. 28A.

FIG. 28C is a schematic diagram illustrating the way in which dots are formed in a case of driving recording element No. 1 through No. 16 while scanning in the forward direction following the driving order shown in FIG. 28A. FIG. 28D is a schematic diagram illustrating the way in which dots are formed in a case of driving recording element No. 1 through No. 16 while scanning in the backward direction following the driving order shown in FIG. 28B. In such an arrangement where the driving order for backward scanning is the opposite order of an offset order of the driving order for forward scanning, the ink landing positions from the driving blocks differ in the forward scan and backward scan, but are discharged in a parallel positional relationship.

Figure 29A:
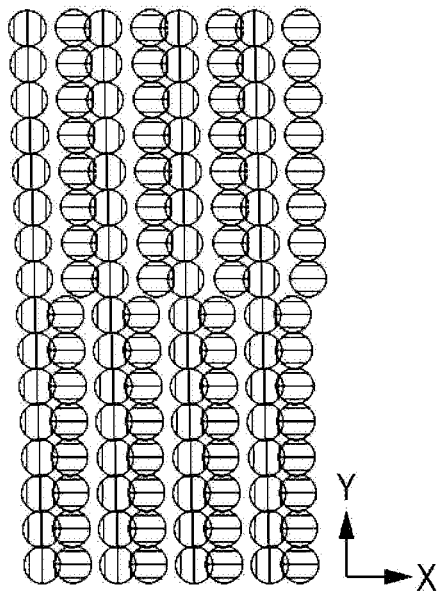
FIGS. 29A through 29D are diagrams for describing the degree of ink discharge position deviation among scans.
Figure 29B:
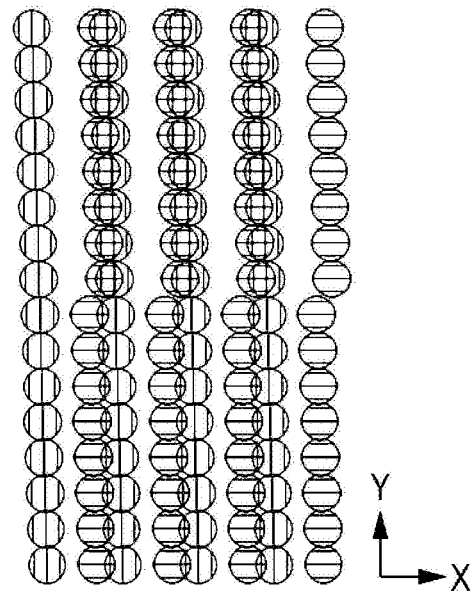
Figure 29C:
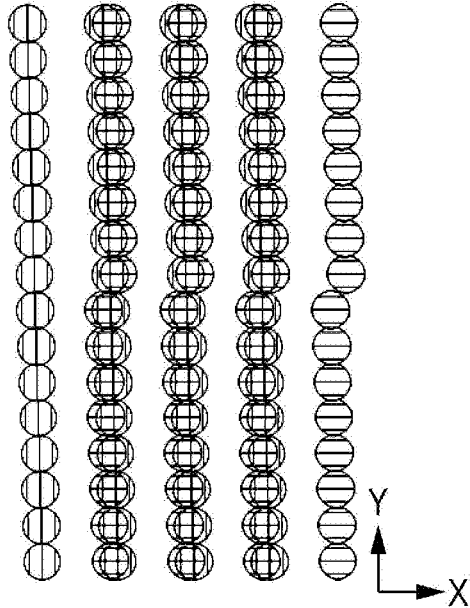
Figure 29D:
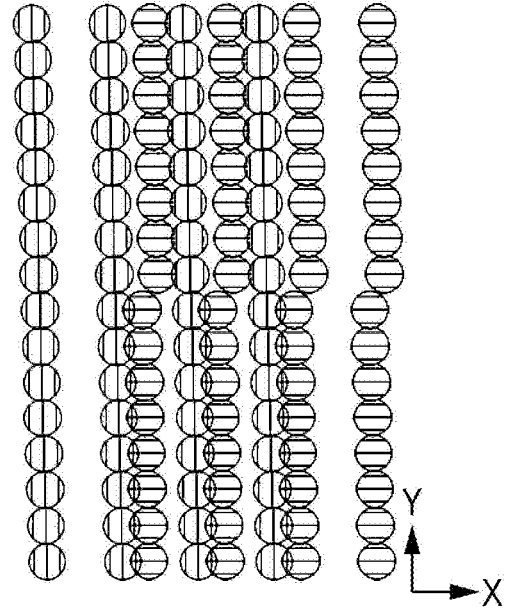

FIGS. 29A through 29D are diagrams schematically illustrating images recorded when setting using the recording data illustrated in FIGS. 12A1 and 12A2 for recording data in both forward scanning and backward scanning, at the driving order illustrated in FIG. 28A for forward scanning and the driving order illustrated in FIG. 28B for backward scanning. FIG. 29A schematically illustrate an image recorded in a case where there is no deviation between the forward scan and the backward scan, FIG. 29B illustrates an image recorded in a case where there is deviation of approximately ½ dot in the X direction between the forward scan and the backward scan, FIG. 29C illustrates an image recorded in a case where there is deviation of approximately 1 dot in the X direction between the forward scan and the backward scan, and FIG. 29D illustrates an image recorded in a case where there is deviation of approximately 2 dots in the X direction between the forward scan and the backward scan. In all of the illustrations, the circles with vertical lines inside represent dots formed in the forward scan, and the circles with horizontal lines inside represent dots formed in the backward scan.

Comparing FIGS. 29A through 29D with FIGS. 14A through 14D and FIGS. 16A through 16D, the images in FIGS. 29A through 29D have been improved over the images in FIGS. 14A through 14D in that the overlapping and missing dots are not as conspicuous, although the improvement is not as marked as in FIGS. 16A through 16D. As described above, FIGS. 14A through 14D are images where the driving order of the backward scan is the opposite order to the driving order in the forward scan, while FIGS. 16A through 16D are images where the driving order of the backward scan is the same order as the driving order of the forward scan. Accordingly, discharge position deviation between reciprocal scans can be suppressed more in a case where the driving order of the backward scan is the opposite order as to the driving order of the forward scan when the order is offset, as compared to a case where the driving order of the backward scan is the opposite order from the driving order of the forward scan. On the other hand, it can be seen from FIGS. 16A through 16D that a case where the driving order of the backward scan is the same order as the driving order of the forward scan is more preferable.

In light of the above points, the driving order at the time of backward scanning first needs to be different from the opposite order to the driving order at the time of forward scanning in the present embodiment. In doing so, the driving order at the time of backward scanning preferably is different from the opposite order to an offset order of the driving order at the time of forward scanning. More preferably, the order is the same as the driving order at the time of forward scanning.

Second Embodiment

A second embodiment will be described. In the present embodiment, an arrangement where processing is performed in the discharge orifice row rasterizing in step S406 so that the resolution of data after rasterizing is higher than the resolution before rasterizing. Portions which are the same as in the above-described first embodiment will be omitted from description.

Figure 30A:
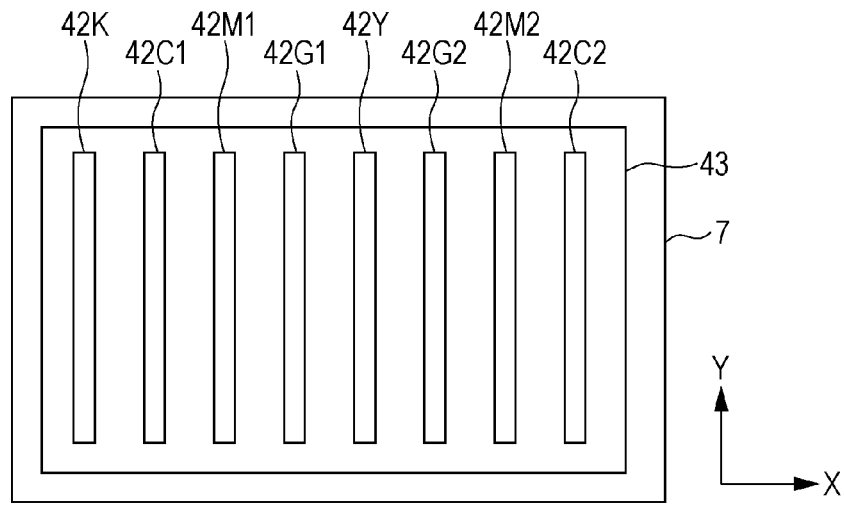
FIGS. 30A through 30C are schematic diagrams of a recording head according to an embodiment.
Figure 30B:
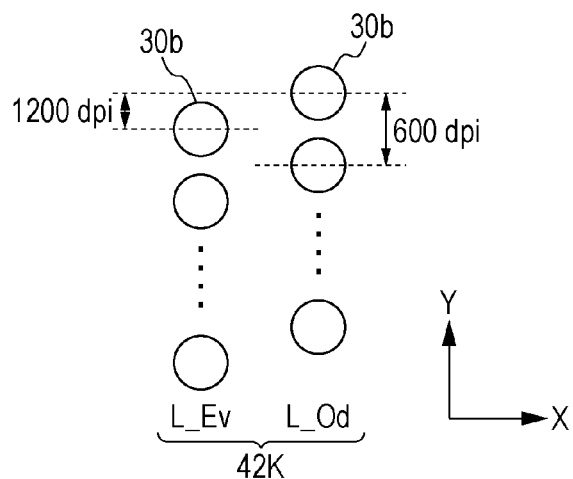
Figure 30C:
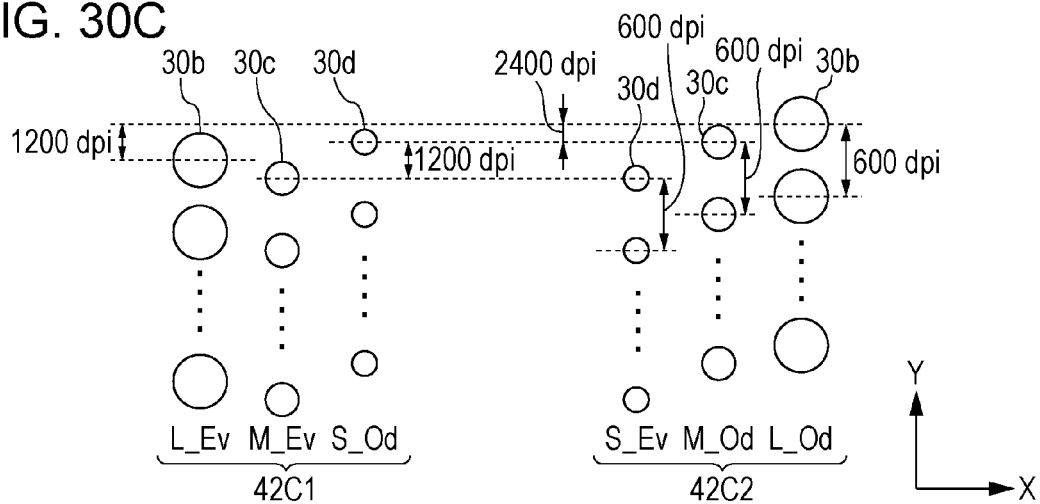

FIG. 30A is a perspective view illustrating the recording head 7 according to the present embodiment. FIG. 30B is an enlarged view of a discharge orifice row 42K for black ink inside the recording head 7. FIG. 30C is an enlarged view of discharge orifice rows 42C1 and 42C2 for cyan ink in the recording head.

It can be seen from FIG. 30A that a single recording chip 43 is provided within the recording head 7 in the present embodiment. Formed on the chip 43 are the discharge orifice row 42K for discharging black ink, discharge orifice rows 42C1 and 42C2 for discharging cyan ink, discharge orifice rows 42M1 and 42M2 for discharging magenta ink, a discharge orifice row 42Y for discharging yellow ink, and discharge orifice rows 42G1 and 42G2 for discharging gray ink, for a total of eight discharge orifice rows 42.

The discharge orifice row 42K for black ink is formed with rows where discharge orifices 30b arrayed in the Y direction at a recording resolution of 600 per inch (600 dpi), are arrayed shifted in the Y direction by a recording resolution of 1200 per inch (1200 dpi), which is illustrated in FIG. 30B. The discharge orifices 30b are capable of discharging approximately 5 pl of ink, in the same way as the first embodiment. The diameter of a dot formed by a discharge orifice 30b discharging ink onto the recording medium is approximately 50 µm. Although only six discharge orifices 30b are illustrated in FIG. 30B for the sake of brevity, in reality 256 discharge orifices 30b are arrayed to make up the discharge orifice row 42K. The discharge orifice row 42Y for yellow ink is also in a configuration such as illustrated in FIG. 30B.

As illustrated in FIG. 30C, the discharge orifice row 42C1 for cyan ink is formed having three rows, which are a row L_Ev where discharge orifices 30b are arrayed at a recording resolution of 600 dpi, a row M_Ev where discharge orifices 30c are arrayed at a recording resolution of 600 dpi, and a row S_Od where discharge orifices 30d are arrayed at a recording resolution of 600 dpi. The discharge orifices 30c are capable of discharging approximately 2 pl of ink in the same way as in the first embodiment. The diameter of a dot formed by a discharge orifice 30c discharging ink is approximately 35 µm. Further, the discharge orifices 30d are capable of discharging approximately 1 pl of ink. The diameter of a dot formed by a discharge orifice 30d discharging ink is approximately 28 μm.

The discharge orifice row 42C2 for cyan ink is formed having three rows, which are a row L_Od where discharge orifices 30b are arrayed at a recording resolution of 600 dpi, a row M_Od where discharge orifices 30c are arrayed at a recording resolution of 600 dpi, and a row S_Ev where discharge orifices 30d are arrayed at a recording resolution of 600 dpi.

Now, the rows L_Ev, L_Od, M_Ev, M_Od, S_Ev, and S_Od, within the discharge orifice rows 42C1 and 42C2 are arranged based on the following arrangement conditions. The row L_Od within the discharge orifice row 42C2 is disposed shifted toward the downstream side in the Y direction (upwards in FIG. 30C) from the row L_Ev within the discharge orifice row 42C1 by 1200 dpi. The row M_Od within the discharge orifice row 42C2 is disposed shifted toward the downstream side in the Y direction (upwards in FIG. 30C) from the row M_Ev within the discharge orifice row 42C1 by 1200 dpi. Note that the row M_Od within the discharge orifice row 42C2 is disposed shifted toward the upstream side in the Y direction (downwards in FIG. 30C) from the row L_Od within the discharge orifice row 42C2 by 2400 dpi.

Also, the row S_Od within the discharge orifice row 42C1 and the row M_Od within the discharge orifice row 42C2, and the row S_Ev within the discharge orifice row 42C2 and the row M_Ev within the discharge orifice row 42C1, are arranged so that the middle positions of each in the Y direction are at approximately the same position. Accordingly, the row S_Od within the discharge orifice row 42C1 is disposed shifted toward the downstream side in the Y direction (upwards in FIG. 30C) from the row S_Ev within the discharge orifice row 42C2 by 1200 dpi.

Although only three discharge orifices are illustrated in FIG. 30C as discharge orifices making up the rows L_Ev, L_Od, M_Ev, M_Od, S_Ev, and S_Od, for the sake of brevity, in reality each row is formed having 128 discharge orifices. Accordingly, with two rows that discharge the same amount of ink (e.g., S_Od and S_Ev) as one row, this row is formed including 256 discharge orifices.

Also note that discharge orifice rows 42M1 and 42M2 for magenta ink have the same configuration as illustrated in FIG. 30C. Further, the discharge orifice rows 42G1 and 42G2 for gray ink have the same configuration as illustrated in FIG. 30C.

The data processing procedures are performed in the same way as the first embodiment through step 404 in FIG. 5. In step S405, unlike the first embodiment, the data C2 obtained in step 404 is subjected to quantization processing by error diffusion to obtain data C3' having five gradations (gradation levels 0, 1, 2, 3, 4) and resolution of 600 dpi×600 dpi. The data C3' will also be referred to as gradation data in the present embodiment. Although error diffusion has been described as being used here, dithering may be used instead.

In step 406, the gradation data C3' is converted into image data C4' for the discharge orifice rows in accordance with the discharge orifice row rasterization table illustrated in FIG. 31A. In the present embodiment, image data for 5 pl discharge orifice rows and image data for 2 pl discharge orifice rows is not generated, and image data 1 pl discharge orifice rows is rasterized in the five gradations of "0", "1", "2", "3", and "4", based on the dot arrangement pattern where the numbers and positions of dot arrangements are determined. Specifically, the image data C4' is made up of three types of 2-bit information "00", "01", and "10", at resolution of 600 dpi×1200 dpi. The image data C4' is also referred to as "quantization data" in the present embodiment.

As described above, the resolution of data C3' is 600 dpi×600 dpi, so the resolution of the image data C4' is higher than the resolution of the gradation data C3'. More specifically, the gradation data C3' stipulates five values of gradation levels for a pixel group made up of 1 pixel×2 pixels, which is to say that the total number of times of discharging ink to a pixel group region corresponding to the pixel group is stipulated. On the other hand, the image data C4' stipulates three pixel values for each of two pixels making up one pixel group, which is to say that the number of times of discharging ink to each pixel region corresponding to the two pixels is stipulated.

FIG. 31B is a diagram illustrating a dot arrangement pattern used in a case where the gradation level (gradation value) of the data C3' is level 1. FIG. 31C is a diagram illustrating a dot arrangement pattern used in a case where the gradation level (gradation value) of the data C3' is level 2. FIG. 31D is a diagram illustrating a dot arrangement pattern used in a case where the gradation level (gradation value) of the data C3' is level 3. FIG. 31E is a diagram illustrating a dot arrangement pattern used in a case where the gradation level (gradation value) of the data C3' is level 4. Note that the "0", "1", and "2" described in the pixels in FIGS. 31B through 31E represent the pixel value of that pixel.

In the present embodiment, the dot arrangement is stipulated as follows in a dot arrangement pattern where the gradation level is level 1 as illustrated in FIG. 31B, which is used in a case where the concentration of image data is low. Of the pixels for dot arrangement in the X direction, the number of pixels to which a pixel for placement of another dot is adjacent in the X direction is greater than the number of pixels to which no pixel for placement of another dot is adjacent in the X direction.

For example, placement of a dot is stipulated at the pixel at the far upper left in the dot arrangement pattern illustrated in FIG. 31B, and further, placement of a dot is stipulated at the pixel adjacent thereto, which is at the uppermost end and is the second pixel from the left. According to this arrangement, multiple dots can be situated at adjacent positions even if the image data has low concentration, so discharge position deviation among reciprocal scans can be suitably suppressed.

The dot arrangement is stipulated in the same way in dot arrangement patterns where the gradation level is level 2, level 3, and level 4, as illustrated in each of FIGS. 31C through 31E, where, of the pixels for dot arrangement in the X direction, the number of pixels to which a pixel for placement of another dot is adjacent in the X direction is greater than the number of pixels to which no pixel for placement of another dot is adjacent in the X direction. Thus, in a case where the data C3' is other than the smallest gradation value (other than level 0) out of the reproducible gradation levels (levels 0 through 4) in the present embodiment, the data C4' can be generated so that the number of dots situated at adjacent positions is larger.

Later-described distribution processing is performed on the image data C4' in step 407, and recording data C5' stipulating discharge or non-discharge of ink for each pixel region in each scan is generated.

Thereafter, the recording data C5' is transmitted to the recording head in step 408, and in step 409 ink is discharged in accordance with the recording data C5'.

Mask Patterns Applied in Present Embodiment

Figure 32A:
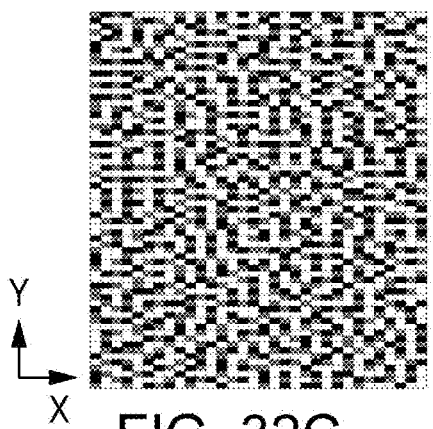
FIGS. 32A through 32F are diagrams illustrating mask patterns applied in an embodiment.
Figure 32B:
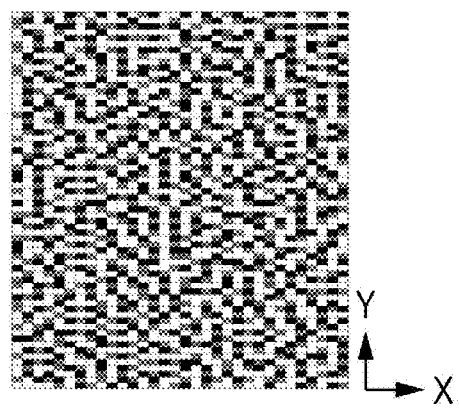
Figure 32C:
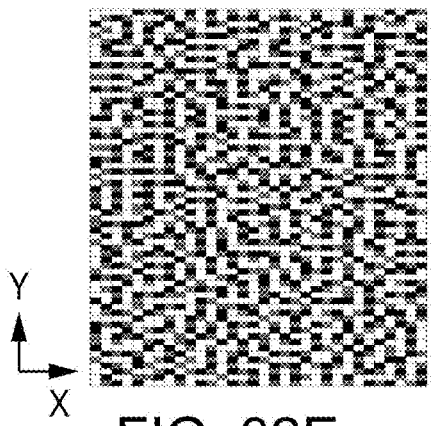
Figure 32D:
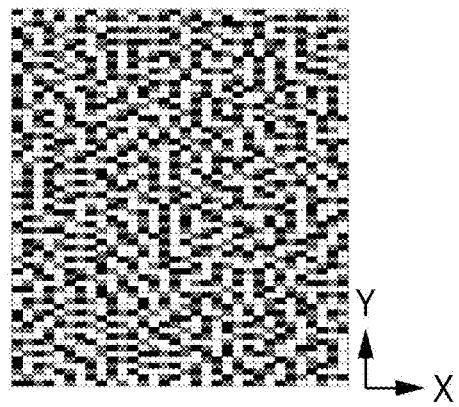
Figure 32E:
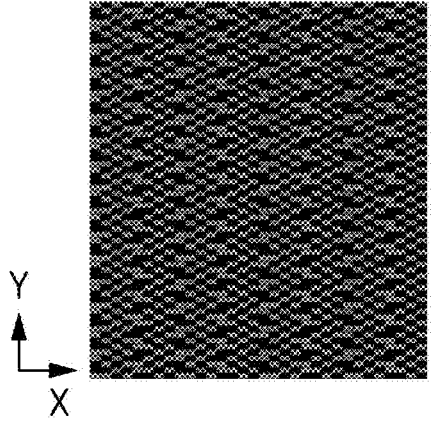
Figure 32F:
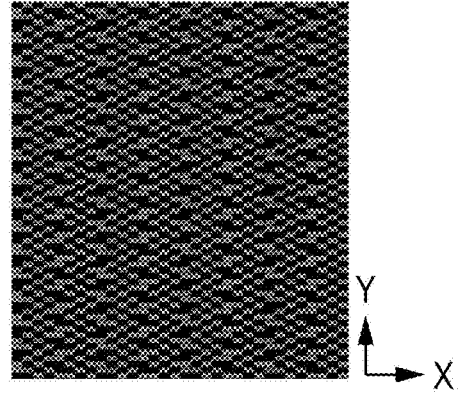

FIGS. 32A through 32F are diagrams illustrating mask patterns used in the present embodiment. Note that FIG. 32A illustrates a mask pattern MP1_2 corresponding to the first scan, FIG. 32B illustrates a mask pattern MP2_2 corresponding to the second scan, FIG. 32C illustrates a mask pattern MP3_2 corresponding to the third scan, and FIG. 32D illustrates a mask pattern MP4_2 corresponding to the fourth scan. Also, FIG. 32E illustrates a logical sum pattern MP1_2+MP3_2 obtained as the logical sum of the number of times of permitted discharge of ink stipulated in the mask pattern MP1_2 corresponding to the first scan in FIG. 32A and the mask pattern MP3_2 corresponding to the third scan in FIG. 32C. Further, FIG. 32F illustrates a logical sum pattern MP2_2+MP4_2 obtained as the logical sum of the number of times of permitted discharge of ink stipulated in the mask pattern MP2_2 corresponding to the second scan in FIG. 32B and the mask pattern MP4_2 corresponding to the fourth scan in FIG. 32D. In FIGS. 32A through 32F, the white pixels indicate pixels to which the code value "0" has been allocated, the gray pixels indicate pixels to which the code value "1" has been allocated, and the black pixels indicate pixels to which the code value "2" has been allocated. It can be seen from these FIGS. 32A through 32F that an arrangement 32 pixels in the X direction and 64 pixels in the Y direction, for a total of 2048 pixels, to which the number of permitted times of ink discharge has been set, is used as a repetitive increment of a mask pattern, and this repetitive increment is repeated in the X direction and the Y direction in the present embodiment.

The setting conditions for the mask patterns MP1_2 through MP4_2 illustrated in FIGS. 32A through 32D are the same as the mask patterns MP1 through MP4 illustrated in FIGS. 17A through 17D in the first embodiment. That is to say, the mask patterns MP1_2 through MP4_2 in FIGS. 32A through 32D are set with code values are allocated to the pixels such that, of four pixels at the same position in the four mask patterns MP1_2 through MP4_2 illustrated in FIGS. 32A through 32D, one each of code values "1" and "2" is allocated to two pixels, and code value "0" is allocated to the remaining two (i.e., 4−2=2) pixels (Condition 1). Further, code values are allocated to the pixels such that, among the four mask patterns MP1_2 through MP4_2 illustrated in FIGS. 32A through 32D, the number of pixels to which the code value "1" has been assigned is about the same, and the number of pixels to which the code value "2" has been assigned is about the same (Condition 2).

In the mask patterns MP1_2 through MP4_2 used in the present embodiment, code values are allocated to the pixels so that, of four pixels at the same position, code value "2" is allocated in mask patterns MP2_2 and MP4_2 for pixels in the backward scans corresponding to pixels to which code value "1" is allocated in mask patterns MP1_2 and MP3_2 corresponding to forward scans, and code value "1" is allocated in mask patterns MP2_2 and MP4_2 for pixels in the backward scans corresponding to pixels to which code value "2" is allocated in mask patterns MP1_2 and MP3_2 corresponding to forward scans. Accordingly, in a case of image data being input for a high-concentration image, such as where the pixel value is "2", recording data can be generated where ink is discharged to one pixel region once each in the forward scan and the backward scan.

Further, in the mask patterns MP1_2 through MP4_2 in the present embodiment, code values are allocated to the pixels so that pixels to which code value "1" has been allocated in mask patterns MP1_2 and MP3_2 in the first and third scans (forward scans), and pixels to which code value "1" has been allocated in mask patterns MP2_2 and MP4_2 in the second and fourth scans (backward scans) are readily generated alternately in the X direction, in rows extending in the X direction. In other words, In other words, in the mask patterns MP1_2 through MP4_2 used in the present embodiment, code values are allocated to the pixels so that pixels to which code value "1" has been allocated in logical sum patterns MP1_2+MP3_2 and pixels to which code value "1" has been allocated in logical sum patterns MP2_2+MP4_2 are readily generated alternately in the X direction, in rows extending in the X direction.

Note that the logical sum pattern MP1_2+MP3_2 and logical sum pattern MP2_2+MP4_2 according to the present embodiment do not have pixels, to which code value "1" has been allocated, alternately disposed for all pixels in each row extending in the X direction, which can be seen in FIGS. 32E and 32F. For example, looking at the edge farthest downstream in the Y direction (top), code value "1" is set for the 1st, 3rd, 6th, 8th, 9th, 11th, 14th, 16th, 17th, 19th, 22nd, 24th, 25th, 27th, 30th, and 32nd pixels at the upstream side (left side) in the X direction in the logical sum pattern MP1_2+MP3_2 illustrated in FIG. 32E. For the logical sum pattern MP2_2+MP4_2 illustrated in FIG. 32F, code value "1" is set for the 2nd, 4th, 5th, 7th, 10th, 12th, 13th, 15th, 18th, 20th, 21st, 23rd, 26th, 28th, 29th, and 31st pixels at the upstream side (left side) in the X direction.

Thus, pixels allocated code value "1" in the logical sum pattern MP1_2+MP3_2 and pixels allocated code value "1" in the logical sum pattern MP2_2+MP4_2 are not necessarily arrayed alternately. However, the advantages of the present invention can be obtained as long as, of the pixels allocated code value "1" in the logical sum pattern MP1_2+MP3_2, the number of pixels adjacent at both sides in the X direction to pixels allocated code value "1" in the logical sum pattern MP2_2+MP4_2 is larger than the number of pixels not adjacent in the X direction to pixels allocated code value "1" in the logical sum pattern MP2_2+MP4_2.

Driving Order of Driving Blocks in Present Embodiment

FIG. 33A is a diagram illustrating a driving order in time-division driving control executed in the present embodiment. FIG. 33B is a schematic diagram illustrating the way in which dots are formed in a case of driving recording element No. 1 through No. 16 while scanning in the forward direction scan following the driving order shown in FIG. 33A. FIG. 33C is a schematic diagram illustrating the way in which dots are formed in a case of driving recording element No. 1 through No. 16 while scanning in the backward direction scan following the driving order shown in FIG. 33A.

An example will be described here where time-division driving is performed for both forward scanning and backward scanning in the driving order of driving block No. 2, driving block No. 10, driving block No. 7, driving block No. 15, driving block No. 4, driving block No. 12, driving block No. 9, driving block No. 1, driving block No. 6, driving block No. 14, driving block No. 3, driving block No. 11, driving block No. 8, driving block No. 16, driving block No. 5, and driving block No. 13, as illustrated in FIG. 33A according to the present embodiment.

In a case of performing time-division driving of the recording elements No. 1 through No. 16 following the driving order illustrated in FIG. 33A, in forward scanning, the dot formed from recording element No. 2 driven the first is situated farthest upstream in the X direction as illustrated in FIG. 33B, the dots formed in the order of recording element Nos. 10, 7, 15, 4, 12, 9, 1, 6, 14, 3, 11, 8, 16, and 5, are situated deviated from the upstream side in the X direction toward the downstream side, and the dot formed by the recording element No. 13 driven last is situated farthest downstream in the X direction.

On the other hand, in the backward scan, the dot formed from recording element No. 2 driven the first is situated farthest downstream in the X direction as illustrated in FIG. 33C, the dots formed in the order of recording element Nos. 10, 7, 15, 4, 12, 9, 1, 6, 14, 3, 11, 8, 16, and 5, are situated deviated from the downstream side in the X direction toward the upstream side, and the dot formed by the recording element No. 13 driven last is situated farthest upstream in the X direction. Thus, by driving the recording elements belonging to the driving blocks according to the driving order illustrated in FIG. 33A, the landing positions of ink from the driving blocks can be made to differ.

Recorded Image According to Present Embodiment

As described above, recording with suppressed discharge position deviation between reciprocal scans is performed by performing time-division driving following the driving order illustrated in FIG. 33A for both forward scanning and backward scanning, further using the dot arrangement patterns illustrated in FIGS. 31B through 31E and the mask patterns MP1_2 through MP4_2 illustrated in FIGS. 32A through 32D according to the present embodiment.

The following is a detailed description of ink discharge positions in a case where image data, having gradation levels 1 through 4, is input for all of 16 pixels×8 pixels, with reference to FIGS. 34A1 through 34C4. FIGS. 34A1 through 34A4 each illustrate the dot arrangement patterns illustrated in FIGS. 31B through 31E having been repeated twice in the X direction, illustrating the positions and number of ink discharges within a region 16 pixels×8 pixels in a case where image data having gradation levels 1 through 4 is input. FIGS. 34B1 and 34B2 each are 16-pixel×8-pixel regions extracted from the upper left of the logical sum patterns MP1_2+MP3_2 and MP2_2+MP4_2 illustrated in FIGS. 32E and 32F, respectively, illustrating the number of times recording is permitted for each pixel in the respective forward scans and backward scans.

FIGS. 34C1 through 34C4 are diagrams illustrating, with regard to positions where ink has been discharged in regions of 16 pixels×8 pixels in a case where image data each having gradation levels 1 through 4 has been input, illustrating whether the positions received discharge of ink during a forward scan or a backward scan. Note that in FIGS. 34C1 through 34C4, grid tiles having only vertical lines indicate pixels where discharge has been performed only during forward scans, grid tiles having only horizontal lines indicate pixels where discharge has been performed only during backward scans, and grid tiles having both vertical and horizontal lines indicate pixels where discharge has been performed during both forward and backward scans.

It can be seen from FIGS. 34C1 through 34C4 that, according to the dot arrangement patterns illustrated in FIGS. 31B through 31E and the mask patterns illustrated in FIGS. 32A through 32D, in each gradation level dots are set to be arranged at positions adjacent in the X direction, with one of the pixels regarding which adjacent dot placement has been set being recorded by at least a forward scan and the other recorded by at least a backward scan.

Figure 35A:
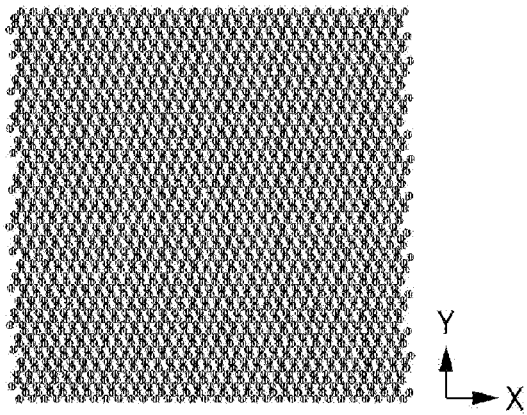
FIGS. 35A through 35E are schematic diagrams illustrating images to be recorded in an embodiment.
Figure 35B:
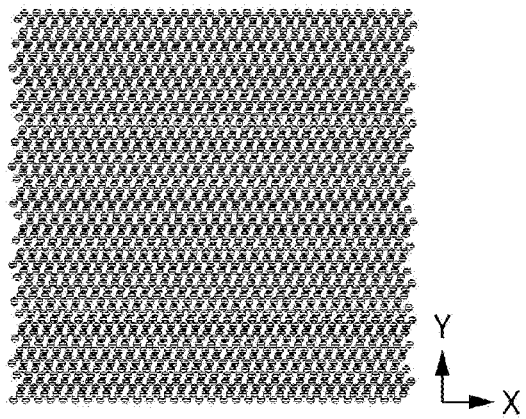
Figure 35C:
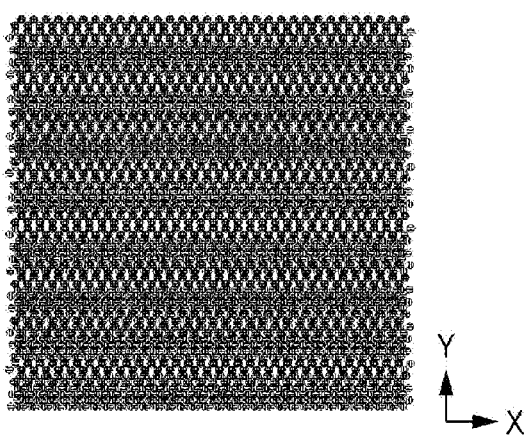
Figure 35D:
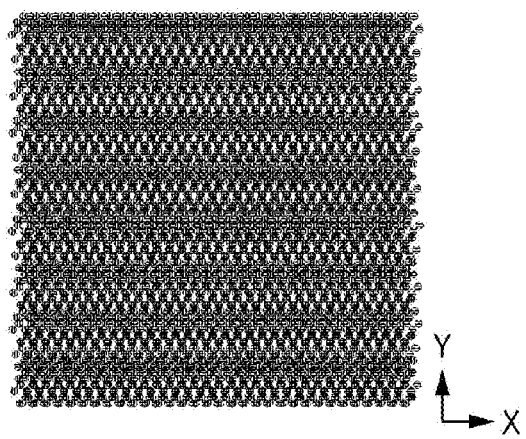
Figure 35E:
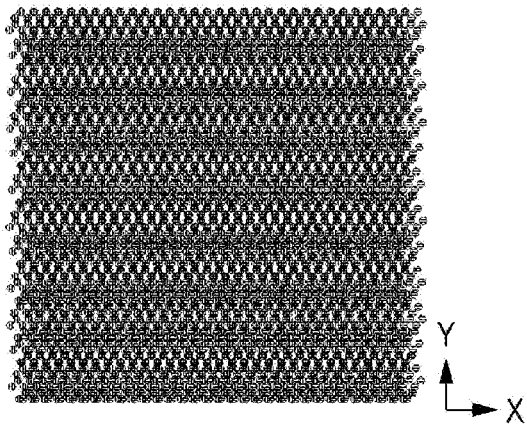

FIGS. 35A through 35E are diagram illustrating images recorded in a case where image data having a gradation level of level 4 is input. FIG. 35C illustrates a dot arrangement where the dot arrangements in FIGS. 35A and 35B have been overlaid with no positional deviation. FIG. 35D illustrates a case where the dot arrangements have been overlaid with positional deviation of 21.2 μm (equivalent to 1200 dpi) toward the downstream side in the X direction in the backward scan, and FIG. 35E illustrates a case where the dot arrangements have been overlaid with positional deviation of 42.3 μm (equivalent to 600 dpi) toward the downstream side in the X direction in the backward scan.

It can be seen in FIG. 35C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 35D, dots in rows overlapped to begin with newly emerge, while dots in rows that were deviated without overlapping to begin with newly overlap, thereby canceling out variation in concentration. This is also true in FIG. 35E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 35C where there is no deviation between reciprocal scans, regardless of whether the amount deviation between reciprocal scans is 21.2 μm upstream in the X direction, illustrated in FIG. 35D, or the amount deviation between reciprocal scans is 42.3 μm upstream in the X direction, illustrated in FIG. 35E. Accordingly, it can be seen that recording can be performed with suppressed discharge position deviation between reciprocal scans when recording images with gradation level 4, according to the mask patterns and driving orders according to the present embodiment.

Figure 36A:
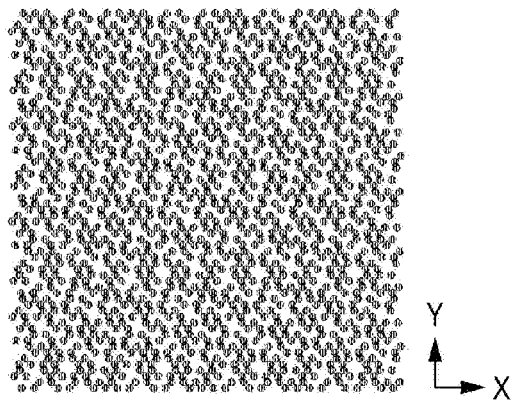
FIGS. 36A through 36E are schematic diagrams illustrating images to be recorded in an embodiment.
Figure 36B:
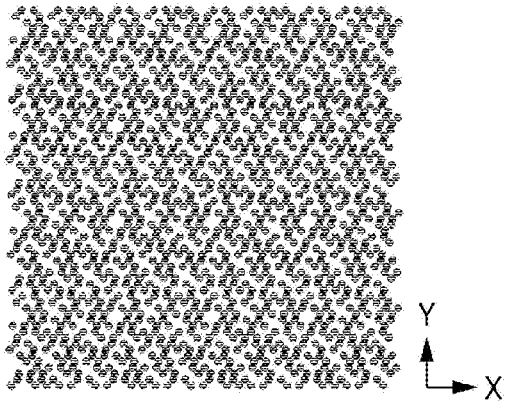
Figure 36C:
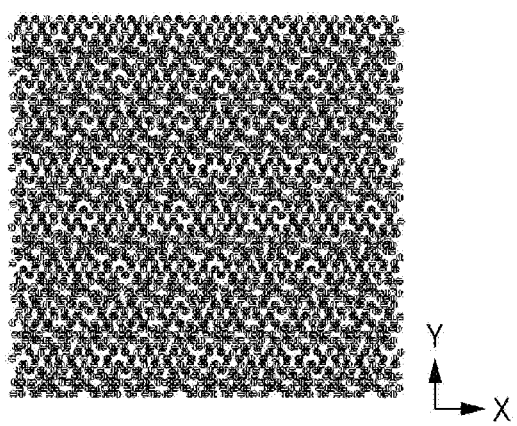
Figure 36D:
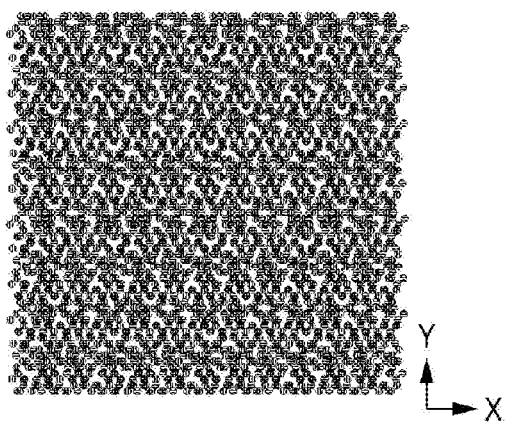
Figure 36E:
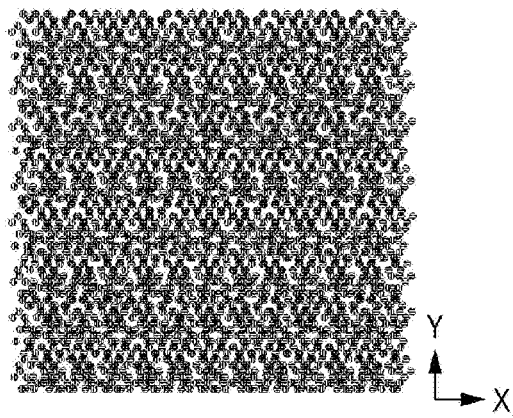

FIGS. 36A through 36E are diagram illustrating images recorded in a case where image data having a gradation level of level 3 is input. FIG. 36C illustrates a dot arrangement where the dot arrangements in FIGS. 36A and 36B have been overlaid with no positional deviation. FIG. 36D illustrates a case where the dot arrangements have been overlaid with positional deviation of 21.2 μm (equivalent to 1200 dpi) toward the downstream side in the X direction in the backward scan, and FIG. 36E illustrates a case where the dot arrangements have been overlaid with positional deviation of 42.3 μm (equivalent to 600 dpi) toward the downstream side in the X direction in the backward scan.

It can be seen in FIG. 36C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 36D, dots in rows overlapped to begin with newly emerge, while dots in rows that were deviated without overlapping to begin with newly overlap, thereby canceling out variation in concentration. This is also true in FIG. 36E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 36C where there is no deviation between reciprocal scans, regardless of whether the amount deviation between reciprocal scans is 21.2 μm upstream in the X direction, illustrated in FIG. 36D, or the amount deviation between reciprocal scans is 42.3 μm upstream in the X direction, illustrated in FIG. 36E. Accordingly, it can be seen that recording can be performed with suppressed discharge position deviation between reciprocal scans when recording images with gradation level 3, according to the mask patterns and driving orders according to the present embodiment.

Figure 37A:
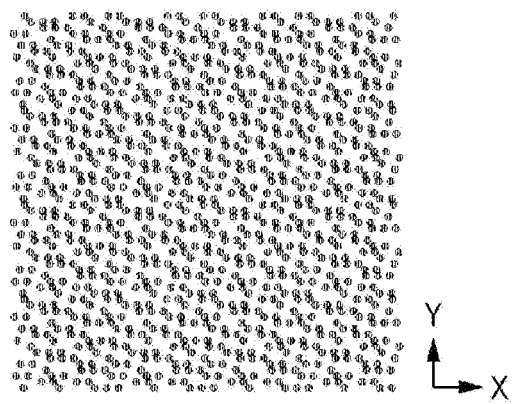
FIGS. 37A through 37E are schematic diagrams illustrating images to be recorded in an embodiment.
Figure 37B:
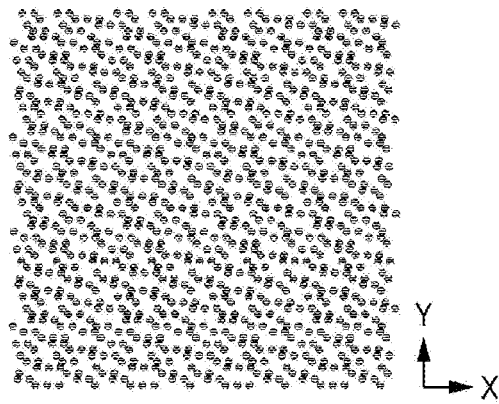
Figure 37C:
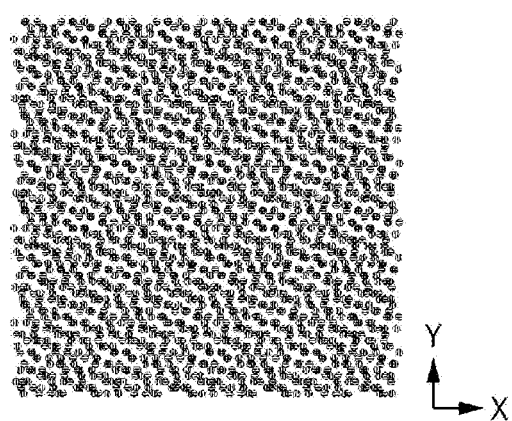
Figure 37D:
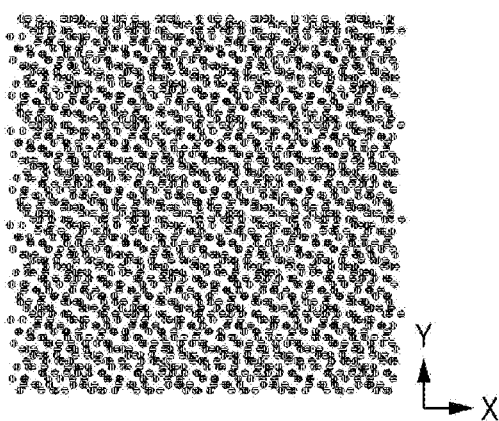
Figure 37E:
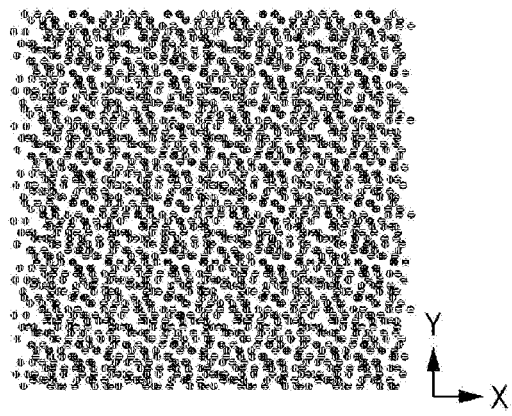

FIGS. 37A through 37E are diagram illustrating images recorded in a case where image data having a gradation level of level 2 is input. FIG. 37C illustrates a dot arrangement where the dot arrangements in FIGS. 37A and 37B have been overlaid with no positional deviation. FIG. 37D illustrates a case where the dot arrangements have been overlaid with positional deviation of 21.2 μm (equivalent to 1200 dpi) toward the downstream side in the X direction in the backward scan, and FIG. 37E illustrates a case where the dot arrangements have been overlaid with positional deviation of 42.3 μm (equivalent to 600 dpi) toward the downstream side in the X direction in the backward scan.

It can be seen in FIG. 37C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 37D, dots in rows overlapped to begin with newly emerge, while dots in rows that were deviated without overlapping to begin with newly overlap, thereby canceling out variation in concentration. This is also true in FIG. 37E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 37C where there is no deviation between reciprocal scans, regardless of whether the amount deviation between reciprocal scans is 21.2 μm upstream in the X direction, illustrated in FIG. 37D, or the amount deviation between reciprocal scans is 42.3 μm upstream in the X direction, illustrated in FIG. 37E. Accordingly, it can be seen that recording can be performed with suppressed discharge position deviation between reciprocal scans when recording images with gradation level 2, according to the mask patterns and driving orders according to the present embodiment.

Figure 38A:
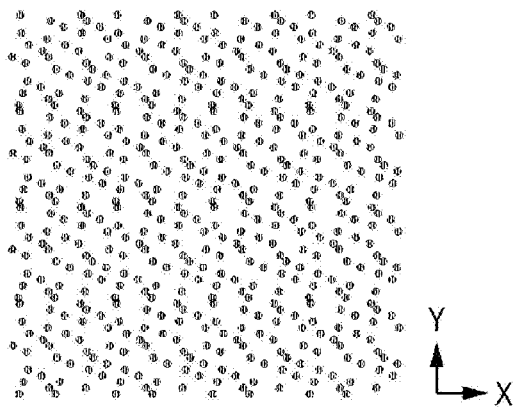
FIGS. 38A through 38E are schematic diagrams illustrating images to be recorded in an embodiment.
Figure 38B:
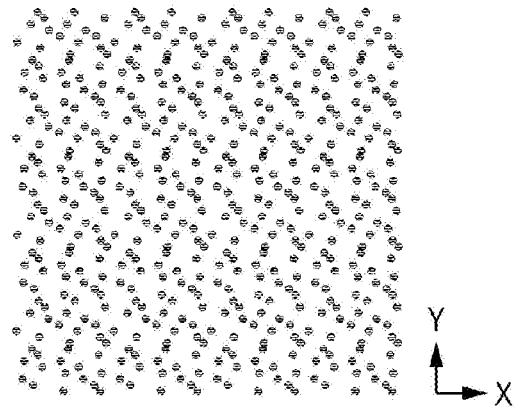
Figure 38C:
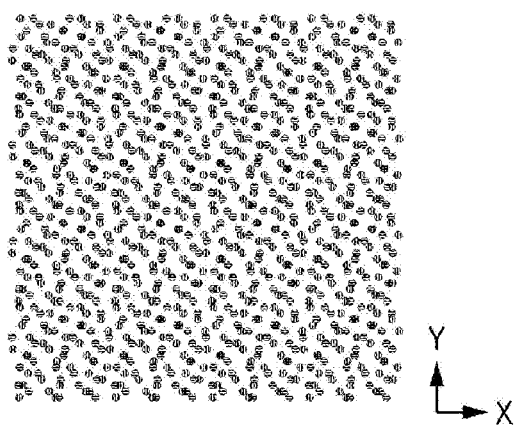
Figure 38D:
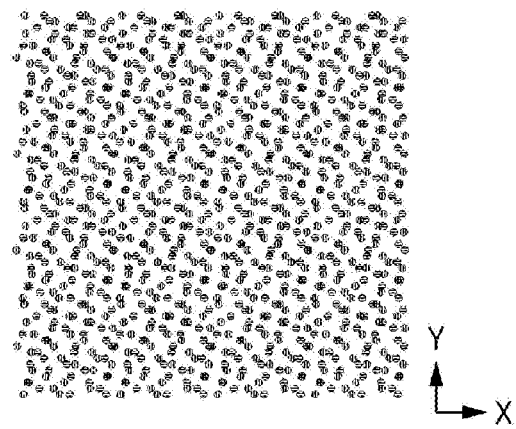
Figure 38E:
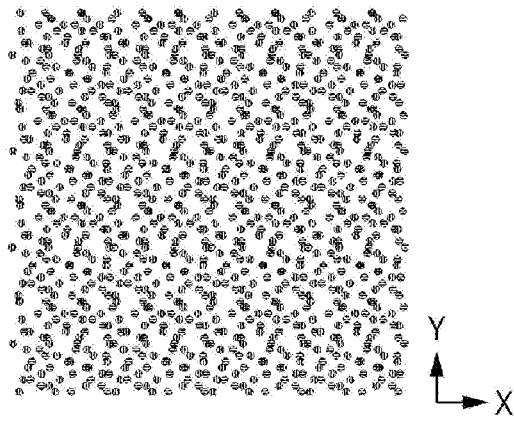

FIGS. 38A through 38E are diagram illustrating images recorded in a case where image data having a gradation level of level 1 is input. FIG. 38C illustrates a dot arrangement where the dot arrangements in FIGS. 38A and 38B have been overlaid with no positional deviation. FIG. 38D illustrates a case where the dot arrangements have been overlaid with positional deviation of 21.2 μm (equivalent to 1200 dpi) toward the downstream side in the X direction in the backward scan, and FIG. 38E illustrates a case where the dot arrangements have been overlaid with positional deviation of 42.3 μm (equivalent to 600 dpi) toward the downstream side in the X direction in the backward scan.

It can be seen in FIG. 38C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 38D, dots in rows overlapped to begin with newly emerge, while dots in rows that were deviated without overlapping to begin with newly overlap, thereby canceling out variation in concentration. This is also true in FIG. 38E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 38C where there is no deviation between reciprocal scans, regardless of whether the amount deviation between reciprocal scans is 21.2 μm upstream in the X direction, illustrated in FIG. 38D, or the amount deviation between reciprocal scans is 42.3 μm upstream in the X direction, illustrated in FIG. 38E. It can be seen from FIGS. 38A through 38E that deterioration in image uniformity can be suppressed when recording low-concentration images in the present embodiment as well, since multiple dots are not recorded in the same pixel region. Further, recording can be performed with suppressed discharge position deviation between reciprocal scans when recording images with gradation level 1, according to the mask patterns and driving orders according to the present embodiment.

Figure 39:
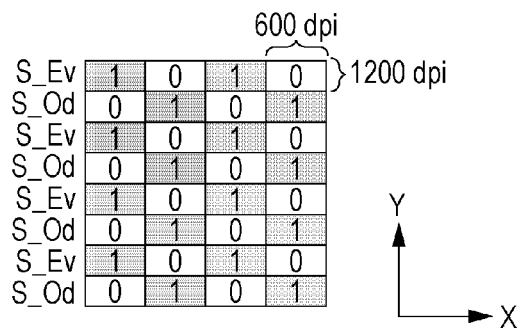
FIG. 39 is a diagram illustrating a dot arrangement pattern in a comparative example.

The advantages of the present invention are obtained by the two points of the ink landing positions from each driving block in time-division driving differing depending on the scanning direction, and adjacent pixels being recorded by different scan directions. In order to realize this, the dot arrangement has to be set so that dots are adjacent at a resolution no more than the time-division driving resolution (600 dpi in the second embodiment) for nozzle row rasterization. If a dot arrangement pattern such as illustrated in FIG. 39 is used in a case where the gradation level is level 1 for all regions of the unit region 211 in FIG. 8, the advantages of the present invention cannot be obtained since there are no pixels adjacent in the X direction.

The reason is that, even if the number of pixels, adjacent on both sides where recording is permitted in different scans among a forward scanning mask pattern and a backward scanning mask pattern, is increased, dots are not placed at mutually adjacent positions in low-concentration images to begin with. Accordingly, even in a state where there is not deviation amount between forward scans and backward scans, portions where dots are overlapped and recorded between forward scans and backward scans cannot be created. Accordingly, when converting the resolution of the image data, the ink droplets need to be placed so that at least some pixels are adjacent in the X direction, and so that the scanning direction of adjacent pixels are opposite.

As described in the present embodiment, the greatest advantages can be obtained by arranging all pixels to be adjacent in the X direction and so that all adjacent pixels have opposite scanning directions, as illustrated in FIG. 34C4. Note however, that not all adjacent pixels have to be laid out with different scanning directions to obtain the advantages of the present embodiment, and that the advantages can be obtained to a certain level if there are more adjacent pixels in all rows are compared to pixels that are not adjacent.

Also in the present embodiment, places where one dot each is placed in both the S_Ev row and S_Od row at 600 dpi in the Y direction, the scanning direction is set to be opposite between the S_Ev row and S_Od row. The reason for this is that, in a case where the S_Ev row and S_Od row have the same time-division driving order, and the scanning direction of the S_Ev row and S_Od row are the same, the dots of the S_Ev row and the dots of the S_Od row will be situated at the same X coordinates, resulting in gaps in the X direction, deteriorating the image uniformity. Conversely, in a case where the S_Ev row and S_Od row are arranged to be scanned in opposite directions, the placement of dots when scanning in the opposite direction by time-division driving are different from when scanning in the forward direction, so the dots of the S_Ev row and the dots of the S_Od row are placed at different X coordinates, reducing gaps in the X direction, so image uniformity can be improved. In a case of placing two dots in 600 dpi, the advantages of the present embodiment can be obtained even in a case where two dots are placed overlapped at some places and one dot each is placed shifted by 1200 dpi in the Y direction at other places, as illustrated in FIG. 31C illustrating the present embodiment. Thus, recording can be performed with suppressed discharge position deviation between reciprocal scans without sacrificing image uniformity, according to the present embodiment as well.

Third Embodiment

Arrangements have been described in the first and second embodiments where the number of dots recorded in forward scans and the number of dots recorded in backward scans are about the same. In comparison with this, an arrangement will be described in the present embodiment where the number of dots recorded in forward scans and the number of dots recorded in backward scans differ, and the scanning direction for adjacent dots is partly the same. Portions which are the same as the above-described first and second embodiments will be omitted from description.

The configuration of the recording head applied in the present embodiment is generally the same as the recording head illustrated in FIGS. 30A through 30C, except that the number of discharge orifices making up the rows is different, each row being made up of 96 discharge orifices. Accordingly, the discharge orifice rows that discharge the same color ink and the same amount of ink in the present embodiment are each made up of 192 discharge orifices.

Figure 40:
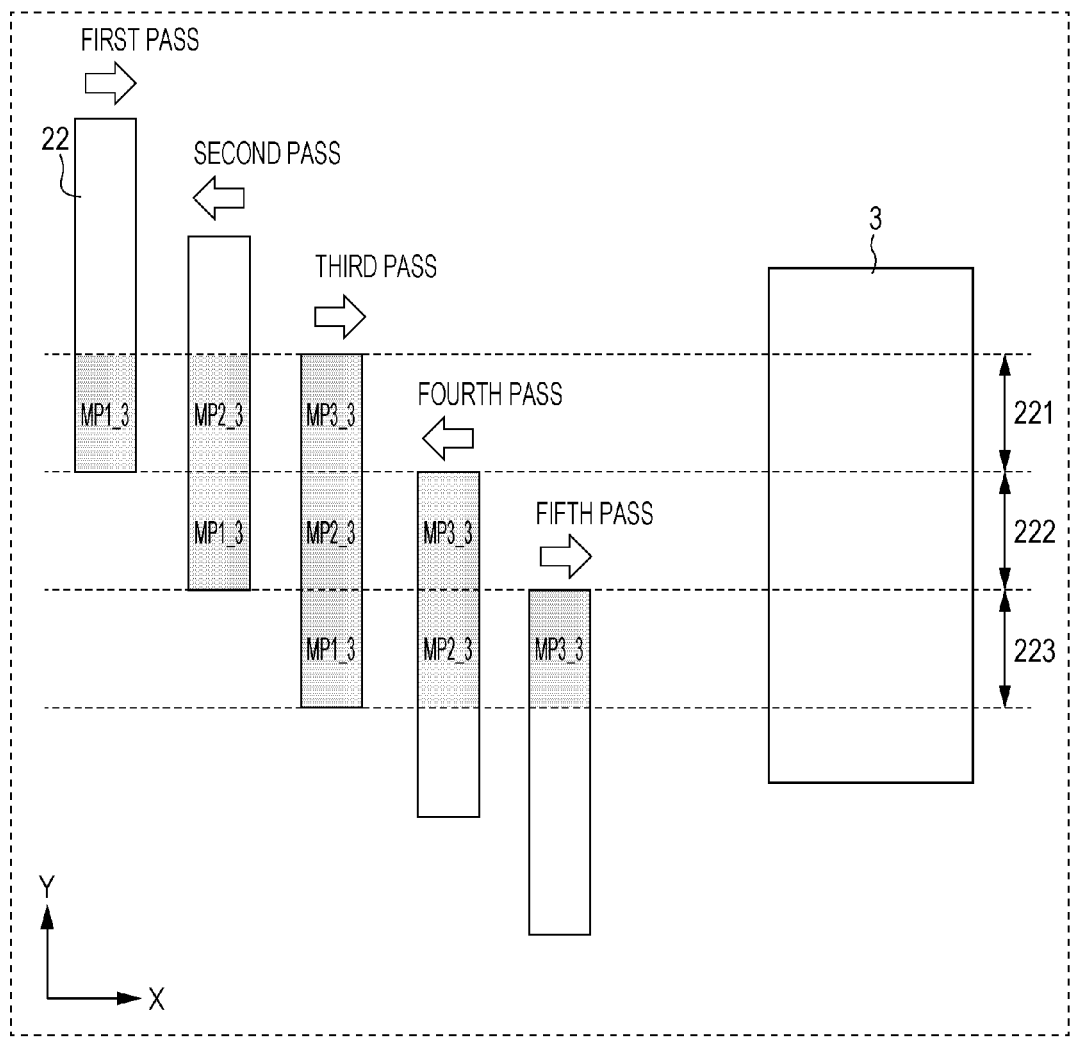
FIG. 40 is a diagram for describing a multi-pass recording method according to an embodiment.

Unlike the first and second embodiments, recording is performed in the present embodiment by performing three scans over a unit region on the recording medium. FIG. 40 is a diagram illustrating the multi-pass recording performed in the present embodiment. It can be seen from FIG. 40 that recording is performed in the order of a forward scan, backward scan, and forward scan, as to the unit region 221 on the recording medium in the present embodiment. Recording is performed in the order of a backward scan, forward scan, and backward scan, as to the unit region 222. That is to say, unit regions where two forward scans and one backward scan, and unit regions where one forward scan and two backward scans, coexist on the recording medium.

Mask Patterns Applied in Present Embodiment

Figure 41A:
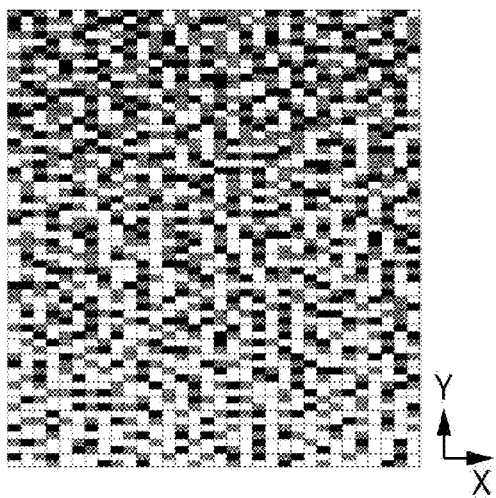
FIGS. 41A through 41D are diagrams illustrating mask patterns applied in an embodiment.
Figure 41B:
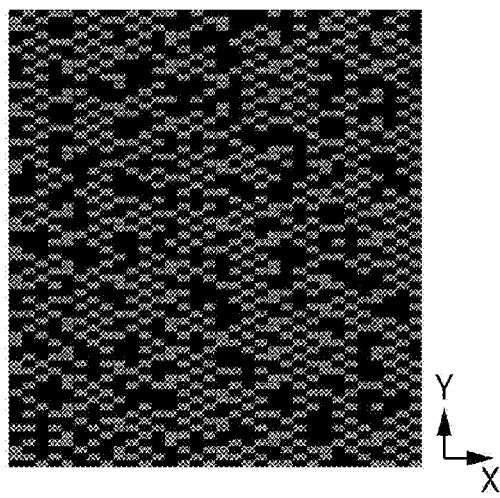
Figure 41C:
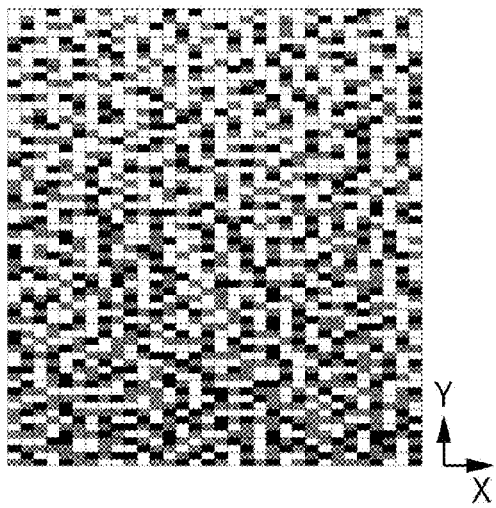
Figure 41D:
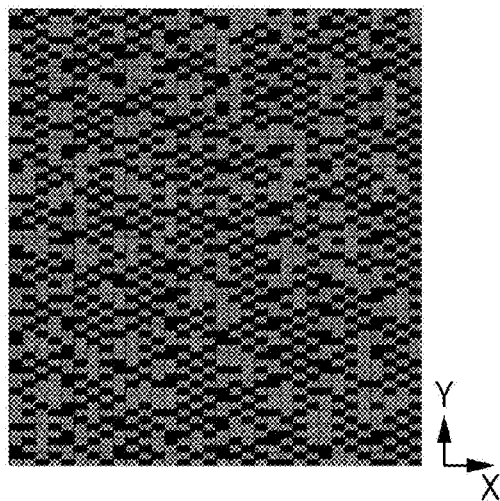

FIGS. 41A through 41D are diagrams illustrating mask patterns used in the present embodiment. Note that FIG. 41A illustrates a mask pattern MP1_3 corresponding to the first scan, FIG. 41B illustrates a mask pattern MP2_3 corresponding to the second scan, and FIG. 41C illustrates a mask pattern MP3_3 corresponding to the third scan. FIG. 41D illustrates a logical sum pattern MP1_3+MP3_3 obtained as the logical sum of number of permitted discharges of ink stipulated in the mask pattern MP1_3 corresponding to the first scan illustrated in FIG. 41A and the mask pattern MP3_3 corresponding to the third scan illustrated in FIG. 41C. In FIGS. 41A through 41C, the white pixels indicate pixels to which the code value "0" has been allocated, the gray pixels indicate pixels each to which the code value "1" has been allocated, and the black pixels indicate pixels to which the code value "2" has been allocated. It can be seen from FIGS. 41A through 41C that an arrangement 32 pixels in the X direction and 64 pixels in the Y direction, for a total of 2048 pixels, each to which the number of permitted times of ink discharge has been set, is used as a repetitive increment of a mask pattern, and this repetitive increment is repeated in the X direction and the Y direction.

The setting conditions of the mask patterns MP1_3 through MP3_3 illustrated in FIGS. 41A through 41C are basically the same as the mask patterns MP1 through MP4 illustrated in FIGS. 17A through 17D described in the first embodiment. That is to say, code values are allocated to the pixels such that, of three pixels at the same position in the mask patterns MP1_3 through MP3_3 illustrated in FIGS. 41A through 41C, one each of code values "1" and "2" is allocated to two pixels, and code value "0" is allocated to the remaining one (i.e., 3−2=1) pixels (Condition 1).

Code values are allocated to the pixels of the mask patterns MP1_3 through MP3_3 used in the present embodiment such that, with regard to a pixel where code value "1" is allocated in mask patterns MP1_3 and MP3_3 corresponding to scanning in one direction, code value "2" is allocated to the corresponding pixel in mask pattern MP2_3 corresponding to scanning in the other direction. For a pixel where code value "2" is allocated in mask patterns MP1_3 and MP3_3 corresponding to scanning in one direction, code value "1" is allocated to the corresponding pixel in mask pattern MP2_3 corresponding to scanning in the other direction. Accordingly, when a high-concentration image, i.e., image data where the pixel value is "2" is input, recording data can be generated where ink is discharged to one pixel region by one forward scan and one backward scan.

Also, the mask patterns MP1_3 through MP3_3 used in the present embodiment each have a different number of pixels to which code value "1" and code value "2" have been allocated. Further, the mask patterns MP1_3 and MP3_3 each have a different number of pixels to which code value "1" and code value "2" have been allocated in accordance with positions in the Y direction.

Specifically, the mask pattern MP1_3 has approximately 40% pixels to which code value "1" has been allocated as to the total number of pixels in the downstream edge portion in the Y direction, approximately 20% in the upstream edge portion in the Y direction, and gradually changing from 40% to 20% therebetween. Also, the mask pattern MP1_3 has approximately 26.7% pixels to which code value "2" has been allocated as to the total number of pixels in the downstream edge portion in the Y direction, approximately 13.3% in the upstream edge portion in the Y direction, and gradually changing from 26.7% to 13.3% therebetween.

Next, the mask pattern MP2_3 has approximately 40% pixels to which code value "1" has been allocated as to the total number of pixels regardless of the position in the Y direction, and has approximately 60% pixels to which code value "2" has been allocated as to the total number of pixels regardless of the position in the Y direction.

Further, the mask pattern MP3_3 has approximately 20% pixels to which code value "1" has been allocated as to the total number of pixels in the downstream edge portion in the Y direction, approximately 40% in the upstream edge portion in the Y direction, and gradually changing from 20% to 40% therebetween. Also, the mask pattern MP3_3 has approximately 13.3% pixels to which code value "2" has been allocated as to the total number of pixels in the downstream edge portion in the Y direction, approximately 26.7% in the upstream edge portion in the Y direction, and gradually changing from 13.3% to 26.7% therebetween.

Such settings allow the amount of ink discharged at the edges of the recording element rows to be less than the amount of ink discharged at the middle portion of the recording element rows. Thus, occurrence of streaks, which can occur when discharging from the edges of the recording element rows, can be suppressed.

Further, in the mask patterns MP1_3 through MP3_3 in the present embodiment, code values are allocated to the pixels so that pixels to which code value "1" has been allocated in mask patterns MP1_3 and MP3_3 corresponding to the first and third scans (scans in one direction), and pixels to which code value "1" has been allocated in mask pattern MP2_3 in the second scan (scan in the other direction) are readily generated alternately in the X direction, in rows extending in the X direction. In other words, In other words, in the mask patterns MP1_3 through MP3_3 used in the present embodiment, code values are allocated to the pixels so that pixels to which code value "1" has been allocated in the logical sum pattern MP1_3+MP3_3 illustrated in FIG. 41D and pixels to which code value "1" has been allocated in mask pattern MP2_3 illustrated in FIG. 41B are readily generated alternately in the X direction, in rows extending in the X direction.

It can be seen from FIGS. 41B and 41D that the mask pattern MP2_3 and logical sum pattern MP1_3+MP3_3 according to the present embodiment do not have pixels, to which code value "1" has been allocated, alternately disposed for all pixels in each row extending in the X direction. For example, looking at the edge farthest downstream in the Y direction (top), code value "1" is set for the 2nd, 4th, 5th, 7th, 10th, 12th, 13th, 15th, 21st, 23rd, 26th, 28th, and 31st pixels from the upstream side (left side) in the X direction in the mask pattern MP2_3 illustrated in FIG. 41B. For the logical sum pattern MP1_3+MP3_3 illustrated in FIG. 41D, code value "1" is set for the 1st, 3rd, 6th, 8th, 9th, 11th, 14th, 16th, 17th, 18th, 19th, 20th, 22nd, 25th, 27th, 29th, 30th, and 32nd pixels from the upstream side (left side) in the X direction.

Thus, pixels allocated code value "1" in the mask pattern MP2_3 and pixels allocated code value "1" in the logical sum pattern MP1_3+MP3_3 are not all necessarily arrayed alternately. However, the advantages of the present invention can be obtained as long as, of the pixels allocated code value "1" in the logical sum pattern MP1_3+MP3_3, the number of pixels adjacent at both sides in the X direction to pixels allocated code value "1" in the mask pattern MP2_3 is larger than the number of pixels not adjacent in the X direction to pixels allocated code value "1" in the mask pattern MP2_3.

Recorded Image According to Present Embodiment

As described above, recording is performed in the present embodiment using the mask patterns MP1_3 through MP3_3 illustrated in FIGS. 41A through 41C. Recording is performed with suppressed discharge position deviation between reciprocal scans by performing time-division driving following the driving order illustrated in FIG. 33A for both forward scanning and backward scanning, using the dot arrangement patterns illustrated in FIGS. 31B through 31E, in the same way as in the second embodiment.

An image recorded in a case where image data is input of which the gradation level is level 4 is very little different from the image illustrated in FIGS. 35A through 35E, described in the second embodiment. Accordingly, description thereof will be omitted here.

Figure 42A:
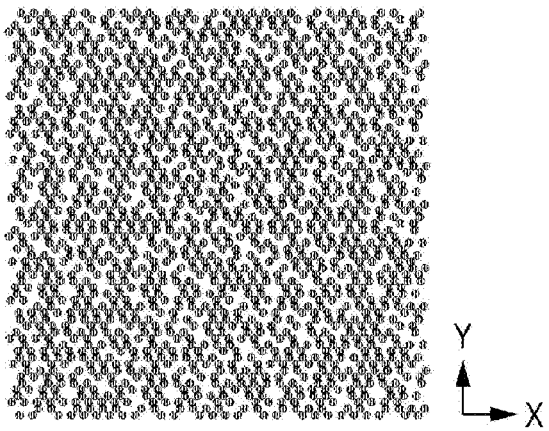
FIGS. 42A through 42E are schematic diagrams illustrating images to be recorded in an embodiment.
Figure 42B:
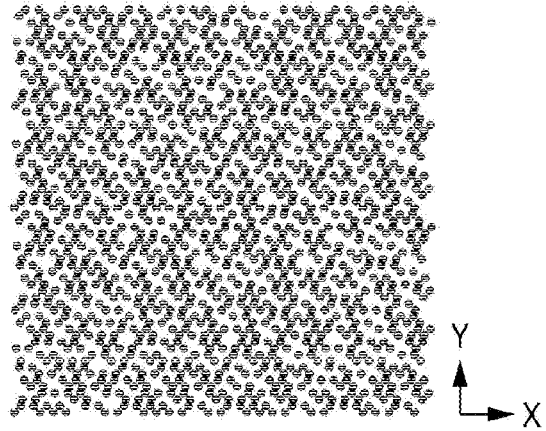
Figure 42C:
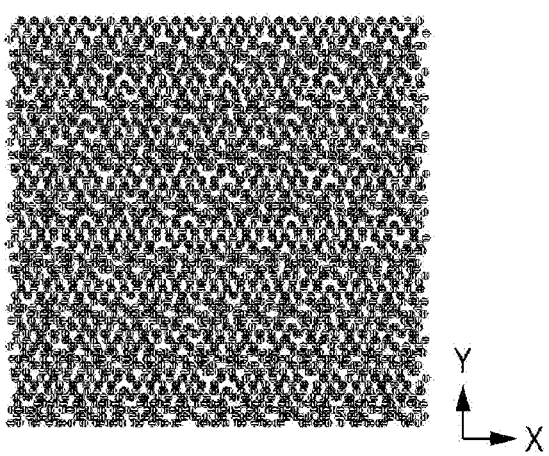
Figure 42D:
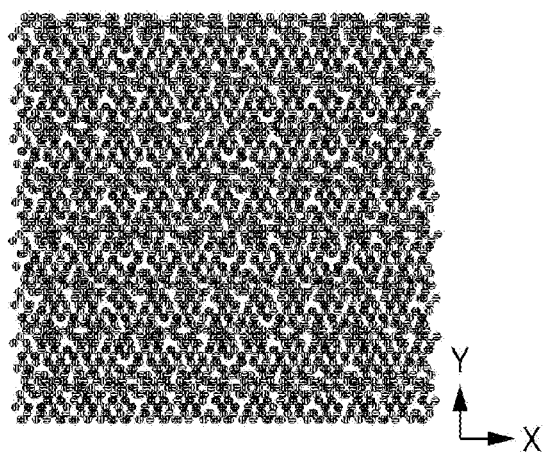
Figure 42E:
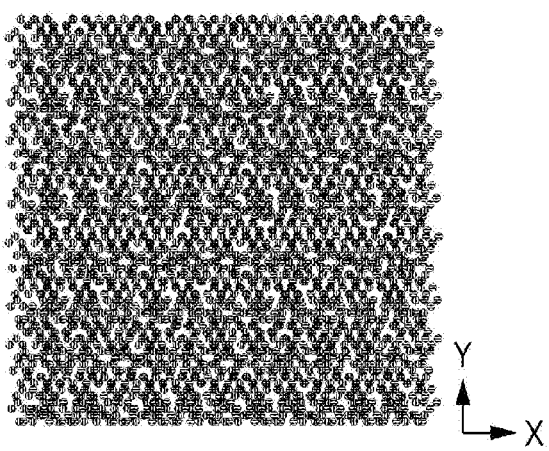

FIGS. 42A through 42E are diagram illustrating images recorded in a case where image data having a gradation level of level 3 is input. FIG. 42C illustrates a dot arrangement where the dot arrangements in FIGS. 42A and 42B have been overlaid with no positional deviation. FIG. 42D illustrates a case where the dot arrangements have been overlaid with positional deviation of 21.2 µm (equivalent to 1200 dpi) toward the downstream side in the X direction in the backward scan, and FIG. 42E illustrates a case where the dot arrangements have been overlaid with positional deviation of 42.3 µm (equivalent to 600 dpi) toward the downstream side in the X direction in the backward scan.

It can be seen in FIG. 42C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 42D, dots in rows overlapped to begin with newly emerge, while dots in rows that were deviated without overlapping to begin with newly overlap, thereby canceling out variation in concentration. This is also true in FIG. 42E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 42C where there is no deviation between reciprocal scans, regardless of whether the amount deviation between reciprocal scans is 21.2 µm upstream in the X direction, illustrated in FIG. 42D, or the amount deviation between reciprocal scans is 42.3 µm upstream in the X direction, illustrated in FIG. 42E. Accordingly, it can be seen that recording can be performed with suppressed discharge position deviation between reciprocal scans when recording images with gradation level 3, according to the mask patterns and driving orders according to the present embodiment.

Figure 43A:
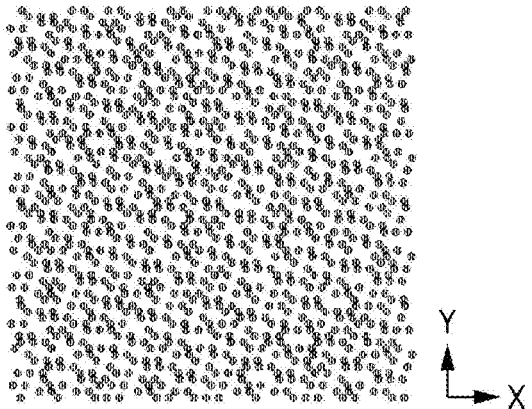
FIGS. 43A through 43E are schematic diagrams illustrating images to be recorded in an embodiment.
Figure 43B:
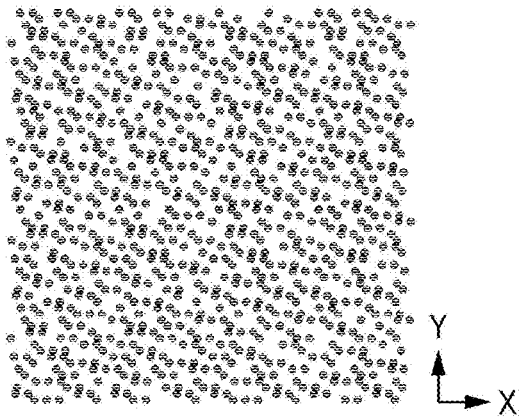
Figure 43C:
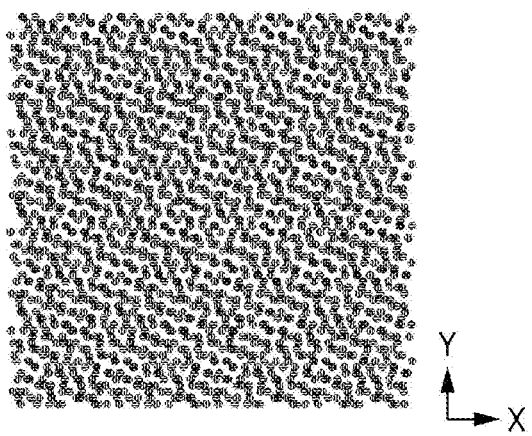
Figure 43D:
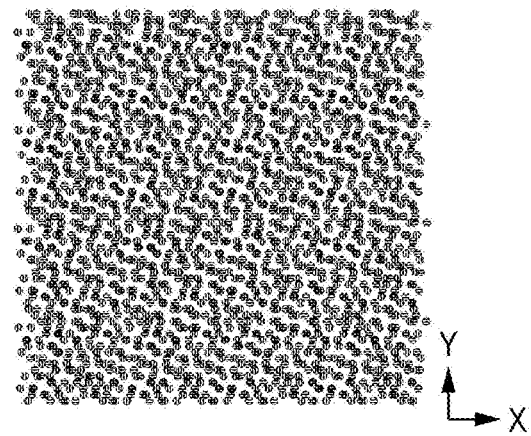
Figure 43E:
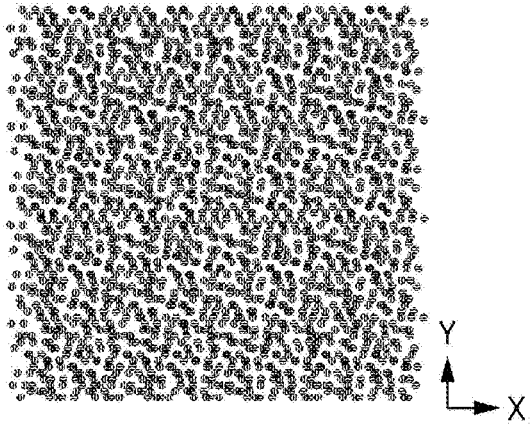

FIGS. 43A through 43E are diagram illustrating images recorded in a case where image data having a gradation level of level 2 is input. FIG. 43C illustrates a dot arrangement where the dot arrangements in FIGS. 43A and 43B have been overlaid with no positional deviation. FIG. 43D illustrates a case where the dot arrangements have been overlaid with positional deviation of 21.2 µm (equivalent to 1200 dpi) toward the downstream side in the X direction in the backward scan, and FIG. 43E illustrates a case where the dot arrangements have been overlaid with positional deviation of 42.3 µm (equivalent to 600 dpi) toward the downstream side in the X direction in the backward scan.

It can be seen in FIG. 43C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 43D, dots in rows overlapped to begin with newly emerge, while dots in rows that were deviated without overlapping to begin with newly overlap, thereby canceling out variation in concentration. This is also true in FIG. 43E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 43C where there is no deviation between reciprocal scans, regardless of whether the amount deviation between reciprocal scans is 21.2 µm upstream in the X direction, illustrated in FIG. 43D, or the amount deviation between reciprocal scans is 42.3 µm upstream in the X direction, illustrated in FIG. 43E. Accordingly, it can be seen that recording can be performed with suppressed discharge position deviation between reciprocal scans when recording images with gradation level 2, according to the mask patterns and driving orders according to the present embodiment.

Figure 44A:
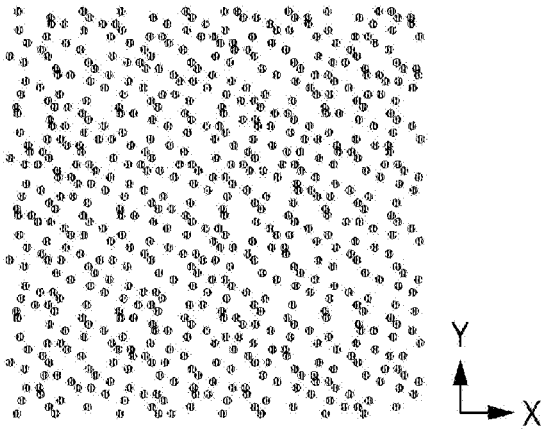
FIGS. 44A through 44E are schematic diagrams illustrating images to be recorded in an embodiment.
Figure 44B:
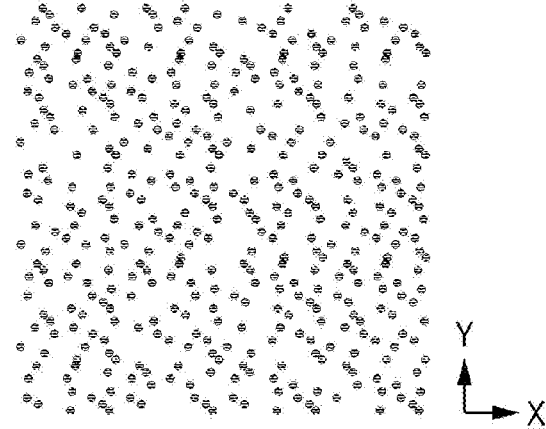
Figure 44C:
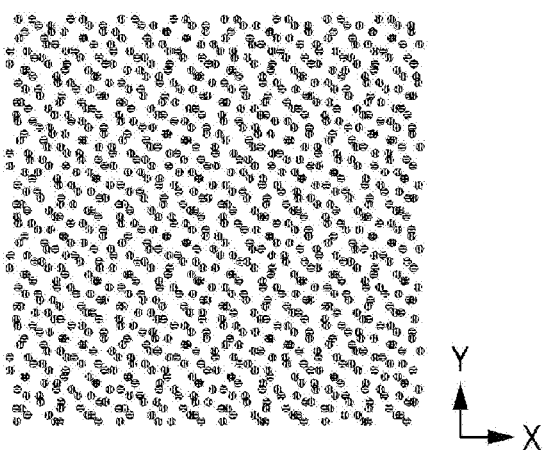
Figure 44D:
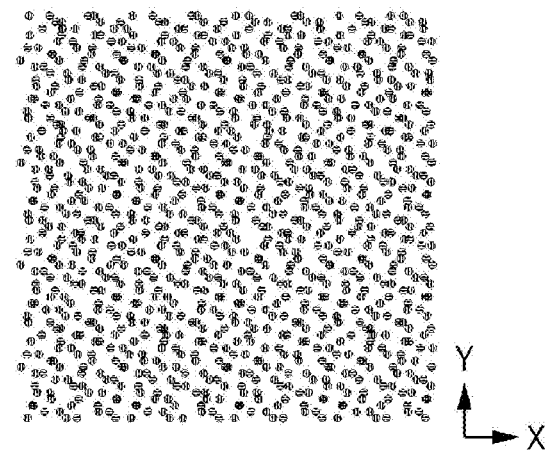
Figure 44E:
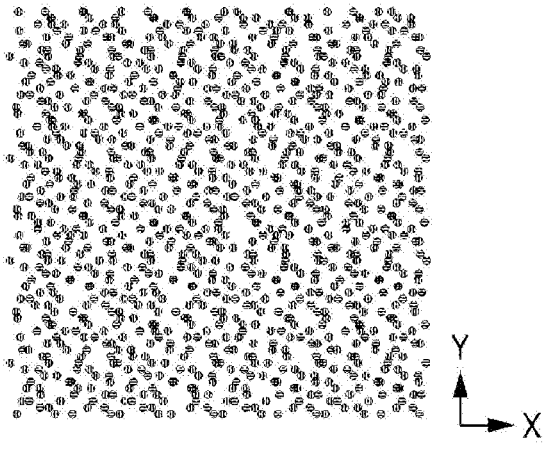

FIGS. 44A through 44E are diagram illustrating images recorded in a case where image data having a gradation level of level 1 is input. FIG. 44C illustrates a dot arrangement where the dot arrangements in FIGS. 44A and 44B have been overlaid with no positional deviation. FIG. 44D illustrates a case where the dot arrangements have been overlaid with positional deviation of 21.2 µm (equivalent to 1200 dpi) toward the downstream side in the X direction in the backward scan, and FIG. 44E illustrates a case where the dot arrangements have been overlaid with positional deviation of 42.3 µm (equivalent to 600 dpi) toward the downstream side in the X direction in the backward scan.

It can be seen in FIG. 44C that, with regard to the rows extending in the X direction, there are rows where dots from the forward scans and dots from the backward scans are recorded almost completely overlapped, rows partly overlapped, and rows recorded without hardly any overlapping, these various states being intermingled. In FIG. 44D, dots in rows overlapped to begin with newly emerge, while dots in rows that were deviated without overlapping to begin with newly overlap, thereby canceling out variation in concentration. This is also true in FIG. 44E, in that dots in rows overlapped to begin with newly emerge, while dots in rows that were deviated without overlapping to begin with newly overlap, thereby canceling out variation in concentration.

Thus, when viewed as an overall image, there is hardly any variation in concentration occurring in comparison with the case in FIG. 44C where there is no deviation between reciprocal scans, regardless of whether the amount deviation between reciprocal scans is 21.2 µm upstream in the X direction, illustrated in FIG. 44D, or the amount deviation between reciprocal scans is 42.3 µm upstream in the X direction, illustrated in FIG. 44E. Accordingly, it can be seen that recording can be performed with suppressed discharge position deviation between reciprocal scans when recording images with gradation level 1, according to the mask patterns and driving orders according to the present embodiment. Thus, recording can be performed with suppressed discharge position deviation between reciprocal scans without sacrificing image uniformity, according to the present embodiment as well.

Fourth Embodiment

The present embodiment relates to using recording element rows discharging two different types of ink out of multiple types of ink, using dot arrangement patterns that are different from each other. The recording head illustrated in FIGS. 30A through 30C are used in the present embodiment. Description will be made regarding a recording element row that discharges 1 pl of cyan ink and a recording element row that discharges 1 pl of magenta ink, as recording element rows that discharge the above-described two different types of ink in the present embodiment.

Note that in the present embodiment, the mask patterns illustrated in FIGS. 32A through 32F are applied to both of quantization data M4 corresponding to the recording element row for 1 pl of magenta ink and quantization data C4 corresponding to the recording element row for 1 pl of cyan ink. Further, time-division driving of both the recording element row for 1 pl of magenta ink and the recording element row for 1 pl of cyan ink is performed according to the driving order of multiple driving blocks, illustrated in FIGS. 18A through 18C.

First, in the present embodiment, rasterization processing is performed for the recording element row that discharges 1 pl of cyan ink by step 406 in FIG. 5, using the discharge orifice row rasterization table and dot arrangement patterns illustrated in FIGS. 31A through 31E. On the other hand, FIGS. 46A through 46E are diagrams illustrating a discharge orifice row rasterization table and dot arrangement patterns applied to image data M3 corresponding to the recording element row discharging 1 pl of magenta ink in the present embodiment.

In the present embodiment, first, image data is rasterized in the five gradations of "0", "1", "2", "3", and "4", to the discharge orifice rows following the discharge orifice row rasterization table illustrated in FIG. 46A. Specifically, it can be seen from FIG. 46A that no data for the 5 pl discharge orifice row nor 2 pl discharge orifice row is generated in the present embodiment, regardless of the type of image data M3. On the other hand, image data M3 is rasterized in the five gradations of "0", "1", "2", "3", and "4", to the discharge orifice row for 1 pl.

Dot arrangement patterns for 1 pl of magenta ink, stipulating the number of positions of 1 pl dots of magenta ink, are applied to the data for the 1 pl discharge orifice row that has been rasterized, in accordance with the gradation values illustrated in FIGS. 46B through 46E. Accordingly, the image data (quantization data) M4 is generated, that is made up of three types of 2-bit information "00", "01", and "10", at resolution of 600 dpi×1200 dpi. The 2-bit information "00", "01", and "10", corresponds to pixel values "0", "1", and "2", in the same way as the quantization data C4.

FIG. 46B is a diagram illustrating a dot arrangement pattern used in a case where the gradation level (gradation value) of the data M3 is level 1. FIG. 46C is a diagram illustrating a dot arrangement pattern used in a case where the gradation level (gradation value) of the data M3 is level 2. FIG. 46D is a diagram illustrating a dot arrangement pattern used in a case where the gradation level (gradation value) of the data M3 is level 3. FIG. 46E is a diagram illustrating a dot arrangement pattern used in a case where the gradation level (gradation value) of the data M3 is level 4. Note that the "0", "1", and "2" described in the pixels in FIGS. 46B through 46E represent the pixel value of that pixel.

In the present embodiment, the dot arrangement is stipulated as follows in a dot arrangement pattern where the gradation level is level 1 as illustrated in FIG. 46B, which is used in a case where the concentration of image data is low. Of the pixels for dot arrangement in the X direction, the number of pixels to which a pixel for placement of another dot is adjacent in the X direction is greater than the number of pixels to which no pixel for placement of another dot is adjacent in the X direction. This is the same as the dot arrangement pattern for 1 pl of cyan ink in FIG. 31B.

For example, placement of a dot is stipulated at the pixel at the far left and second from the top in the dot arrangement pattern illustrated in FIG. 46B, and further, placement of a dot is stipulated at the pixel adjacent thereto in the X direction, which is the second pixel from the top and the second from the left. According to this arrangement, multiple dots can be situated at adjacent positions even if the image data has low concentration, so discharge position deviation among scans can be suitably suppressed when discharging 1 pl of magenta ink.

The dot arrangement is stipulated in the same way in dot arrangement patterns where the gradation level is level 2, level 3, and level 4, as illustrated in each of FIGS. 46C through 46E, where, of the pixels for dot arrangement in the X direction, the number of pixels to which a pixel for placement of another dot is adjacent in the X direction is greater than the number of pixels to which no pixel for placement of another dot is adjacent in the X direction. Thus, in a case where the data M3 is other than the smallest gradation value (other than level 0) out of the reproducible gradation levels (levels 0 through 4) in the present embodiment, the data M4 can be generated so that the number of dots situated at adjacent positions is larger.

Further, all pixels set to discharge ink in the dot arrangement pattern corresponding to gradation level 1 for 1 pl of magenta ink illustrated in FIG. 46B are set to be adjacent in the Y direction to a pixel set to discharge ink in the dot arrangement pattern corresponding to gradation level 1 for 1 pl of cyan ink in FIG. 31B. For example, a pixel farthest to the left and second from the top that is set to discharge ink in the dot arrangement pattern illustrated in FIG. 46B is adjacent to a pixel farthest to the left and third from the top that is set to discharge ink in the dot arrangement pattern illustrated in FIG. 31B. As another example, a pixel second from the left and second from the top that is set to discharge ink in the dot arrangement pattern illustrated in FIG. 46B is adjacent to a pixel second from the left and at the top that is set to discharge ink in the dot arrangement pattern illustrated in FIG. 31B.

Accordingly, both cyan ink and magenta ink can be discharged so that the positions in the Y direction are not superimposed, in a case where quantization data of gradation level 1 is input for both cyan ink and magenta ink. In other words, the dot arrangement of cyan ink and the dot arrangement of magenta ink are in a mutually exclusive relationship. Accordingly, uncovered portions in the image due to the cyan ink and magenta ink dots being superimposed can be prevented from occurring.

Note that all pixels set to discharge ink in the dot arrangement patterns corresponding to gradation level 2, level 3, and level 4, illustrated in FIGS. 46C through 46E respectively, are set to be adjacent in the Y direction to pixels set to discharge ink in the dot arrangement patterns corresponding to gradation level 2, level 3, and level 4, illustrated in FIGS. 31C through 31E respectively.

Although an arrangement has been described here where all pixels set to discharge ink for magenta ink dot arrangement patterns are adjacent in the Y direction to pixels set to discharge ink for cyan ink dot arrangement patterns, other arrangements may be made. Specifically, the advantages of the present embodiment can be obtained as long as, of the pixels set to discharge ink in a magenta ink dot arrangement pattern, the number of pixels adjacent in the Y direction to pixels set to discharge ink in a cyan ink dot arrangement pattern is larger than the number of pixels not adjacent in the Y direction to pixels set to discharge ink in a cyan ink dot arrangement pattern. Thus, recording can be performed with suppressed discharge position deviation between reciprocal scans without sacrificing image uniformity even when using multiple types of ink, according to the present embodiment as well.

Fifth Embodiment

A fifth embodiment will be described. In addition to the configuration of the fourth embodiment, mask patterns are changed in accordance with multiple types of ink in the present embodiment, thereby suppressing discharge position deviation between scans even better. Portions which are the same as in the above-described fourth embodiment will be omitted from description.

Figure 47A:
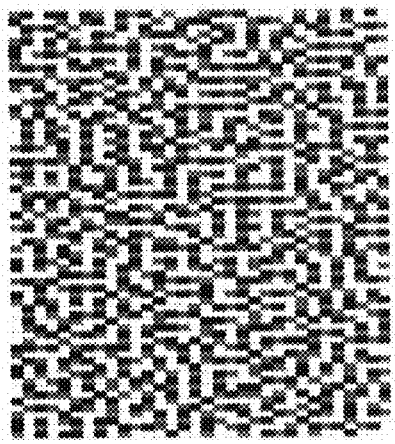
FIGS. 47A through 47F are diagrams illustrating mask patterns applied in an embodiment.
Figure 47B:
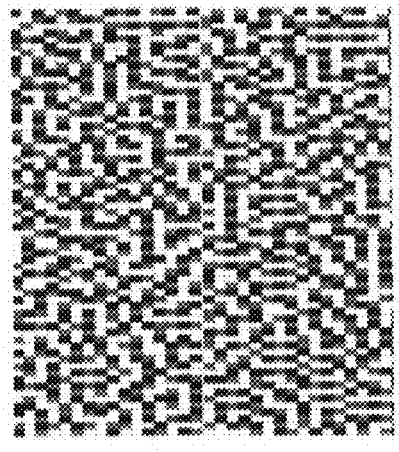
Figure 47C:
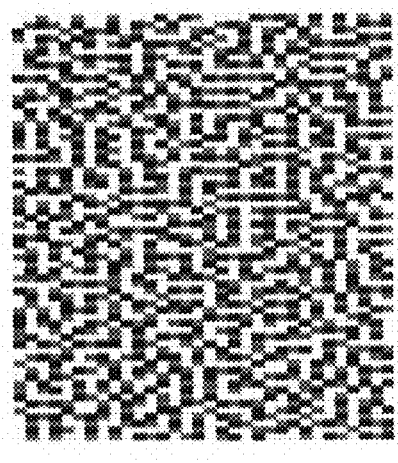
Figure 47D:
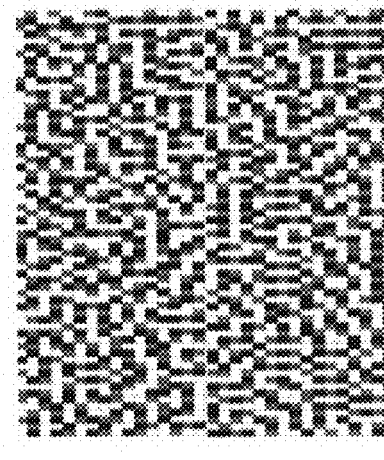
Figure 47E:
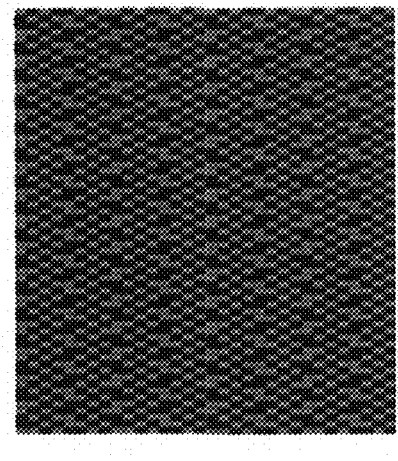
Figure 47F:
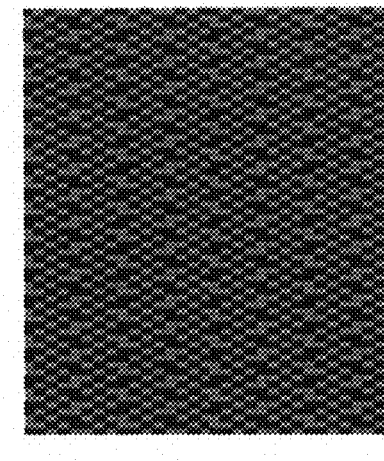

FIGS. 47A through 47F are diagrams illustrating mask patterns used in the present embodiment, applied to quantization data M4 corresponding to recording element row for 1 pl of magenta ink. Note that FIG. 47A illustrates a mask pattern MPM1 corresponding to the first scan, FIG. 47B illustrates a mask pattern MPM2 corresponding to the second scan, FIG. 47C illustrates a mask pattern MPM3 corresponding to the third scan, and FIG. 47D illustrates a mask pattern MPM4 corresponding to the fourth scan. Also, FIG. 47E illustrates a logical sum pattern MPM1+MPM3 obtained as the logical sum of the number of times of permitted discharge of ink stipulated in the mask pattern MPM1 corresponding to the first scan in FIG. 47A and the mask pattern MPM3 corresponding to the third scan in FIG. 47C. Further, FIG. 47F illustrates a logical sum pattern MPM2+MPM4 obtained as the logical sum of the number of times of permitted discharge of ink stipulated in the mask pattern MPM2 corresponding to the second scan in FIG. 47B and the mask pattern MPM4 corresponding to the fourth scan in FIG. 47D. In FIGS. 47A through 47F, the white pixels indicate pixels to which the code value "0" has been allocated, the gray pixels indicate pixels to which the code value "1" has been allocated, and the black pixels indicate pixels to which the code value "2" has been allocated. It can be seen from these FIGS. 47A through 47F that an arrangement 32 pixels in the X direction and 64 pixels in the Y direction, for a total of 2048 pixels, to each of which the number of permitted times of ink discharge has been set, is used as a repetitive increment of a mask pattern, and this repetitive increment is repeated in the X direction and the Y direction in the present embodiment.

Now, the mask patterns MPM1 through MPM4 respectively illustrated in FIGS. 47A through 47D are allocated the code values corresponding to each pixel in accordance with the same conditions as the mask patterns MPC1 through MPC4 respectively illustrated in FIGS. 32A through 32D. In addition, the mask patterns MPM1 through MPM4 are set in the present embodiment so that cyan ink dots and magenta ink dots formed within one pixel group are formed by scans in different directions. Accordingly, the mask patterns MPM1 through MPM4 are set in the present embodiment such that the logical sum pattern MPM1+MPM3 illustrated in FIG. 47E is the same as the logical sum pattern MPC1+MPC3 illustrated in FIG. 32E, and that the logical sum pattern MPM2+MPM4 illustrated in FIG. 47F is the same as the logical sum pattern MPC2+MPC4 illustrated in FIG. 32F.

The following is a detailed description of positions where magenta ink is discharged at each gradation level in all of 8 pixels×8 pixels, and the scanning direction at the time of discharging at each position, with reference to FIGS. 48A1 through 48C4. FIGS. 48A1 through 48A4 each illustrate the dot arrangement patterns illustrated in FIGS. 32B through 32E having been repeated twice in the X direction, illustrating the positions and number of ink discharges within 8 pixels×8 pixels in a case where quantization data M4 each having gradation levels 1 through 4 is input. FIGS. 48B1 and 48B2 each are 8-pixel×8-pixel regions extracted from the upper left of the logical sum patterns MPM1+MPM3 and MPM2+MPM4 illustrated in FIGS. 32E and 32F, respectively, illustrating the number of times recording is permitted for each pixel in the respective forward scans and backward scans.

FIGS. 48C1 through 48C4 are diagrams illustrating, with regard to positions where ink has been discharged in regions of 8 pixels×8 pixels in a case where quantization data having gradation levels 1 through 4 has been input, illustrating whether the positions received discharge of ink during a forward scan or a backward scan. Note that in FIGS. 48C1 through 48C4, grid tiles having only vertical lines indicate pixels where discharge has been performed only during forward scans, grid tiles having only horizontal lines indicate pixels where discharge has been performed only during backward scans, and grid tiles having both vertical and horizontal lines indicate pixels where discharge has been performed during both forward and backward scans.

For example, a pixel value of "1" is allocated to the region at the farthest upper right in the 8 pixels×8 pixels in the dot arrangement pattern illustrated in FIG. 48A4. It can be seen from the decoding table in FIG. 10 that a pixel to which the pixel value "1" has been allocated is set to discharge ink only in a case where the pixel code value is "1". The code value "1" is allocated in the logical sum pattern MPM1+MPM3 to the pixel at the farthest upper right in the 8 pixels×8 pixels, which can be seen in FIG. 48B1. Accordingly, ink is discharged to the pixel at the farthest upper right in the 8 pixels×8 pixels only during forward scans, as can be seen in FIG. 48C4.

It can be seen from FIGS. 48C1 through 48C4 that, according to the dot arrangement patterns illustrated in FIGS. 31B through 31E and the mask patterns in FIGS. 47A through 47D, the placement of dots is set adjacent to each other in the X direction in all gradation levels, and also one of the pixels set to be adjacent to each other is recorded at least by forward scanning, and the other is recorded at least by backward scanning. Moreover, according to the present embodiment, in a case where a cyan dot and a magenta dot are to be formed one each in two pixels making up one pixel group, it can be seen by comparing FIG. 48C4 with FIG. 34C4 that these two dots are formed by scans in different directions. This point will be described below in detail with reference to FIGS. 49A and 49B.

Figure 49A:
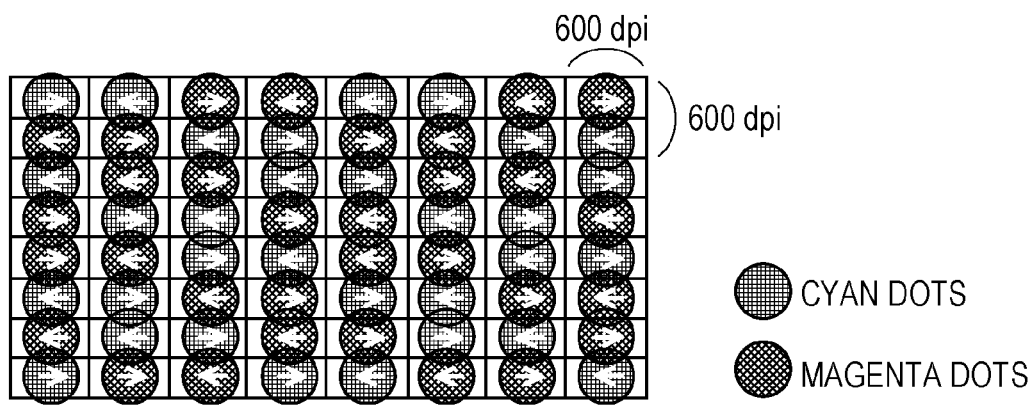
FIGS. 49A and 49B are diagrams for describing the degree of ink discharge position deviation among scans.

FIG. 49A is a diagram for describing the positions of dots formed in a case where cyan ink and magenta ink both are gradation level 1, and the scan direction in which the dots are formed. In other words, the pixels where a cyan dot is formed in a forward scan in FIG. 49A corresponds to the pixels in FIG. 34C4 where vertical lines are drawn, the pixels where a cyan dot is formed in a backward scan to the pixels in FIG. 34C4 where horizontal lines are drawn, the pixels where a magenta dot is formed in a forward scan to the pixels in FIG. 48C4 where vertical lines are drawn, and the pixels where a magenta dot is formed in a backward scan to the pixels in FIG. 48C4 where horizontal lines are drawn. Note that dots indicated by the right-facing arrows here represent dots formed in a forward scan, and dots indicated by the left-facing arrows here represent dots formed in a backward scan.

It can be seen from FIG. 49A that, regarding two pixels in a 600 dpi×600 dpi pixel group made up of 1 pixel×2 pixels, a cyan dot is formed at one pixel and a magenta dot is formed at the other pixel. Further, the cyan dot and magenta dot are formed in scans in differing directions.

For example, observing the two pixels making up the pixel group at the farthest upper left of the 8 pixels×8 pixels in FIG. 49A, cyan ink is formed at the farthest upper left pixel by a forward scan, and magenta ink is formed at the pixel farthest to the left and second from the top, by a backward scan. Similarly, observing the two pixels making up the pixel group at the farthest lower left of the 8 pixels×8 pixels in FIG. 49A, magenta ink is formed at the pixel farthest to the left and second from the bottom by a backward scan, and cyan ink is formed at the farthest lower left pixel by a forward scan. Accordingly, discharge position deviation of multiple types of ink that occur when there is deviation between forward scans and backward scans can be suppressed even better.

Figure 49B:
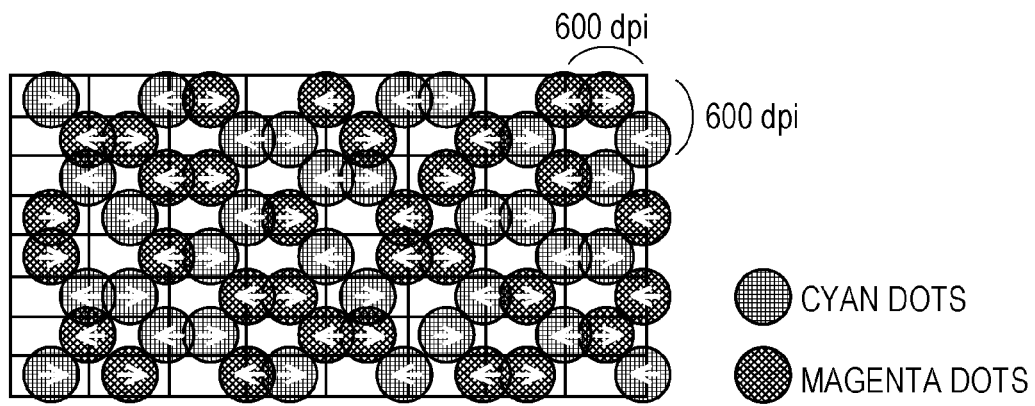

FIG. 49B is a diagram illustrating the positions of cyan dots and magenta dots in a case where there is deviation in the backward scan from the state in FIG. 49A, and deviation of 21.2 µm (equivalent to 1200 dpi) has occurred toward the downstream side in the X direction in the backward scan. FIG. 49B shows that even if there is deviation in the backward scan, missing dots (white portions) are not connected in the Y direction very much according to the present embodiment. Accordingly, discharge position deviation can be suitably suppressed.

Figure 50A:
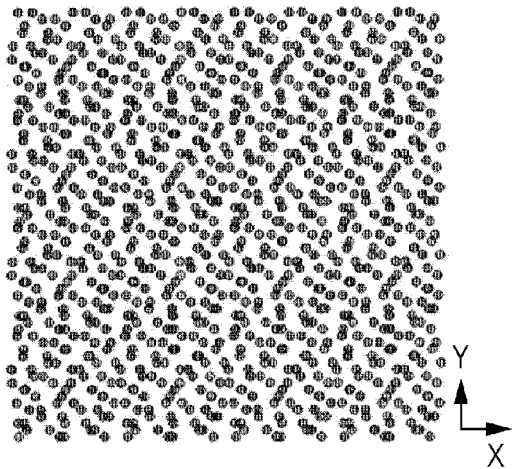
FIGS. 50A through 50E are schematic diagrams illustrating images to be recorded in an embodiment.
Figure 50B:
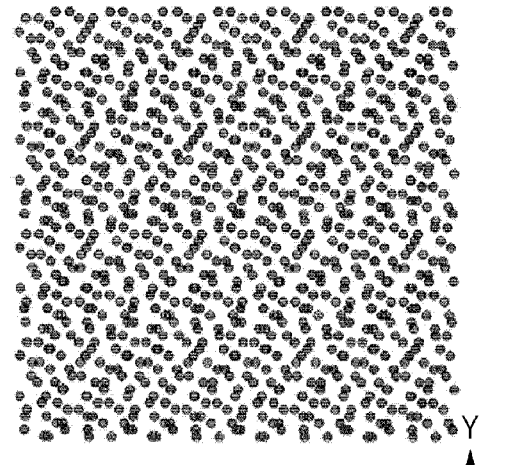
Figure 50C:
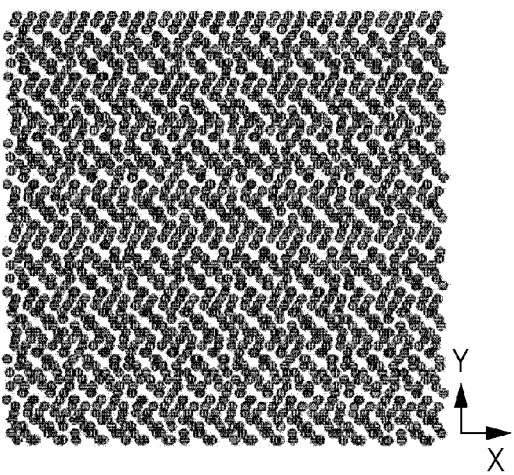
Figure 50D:
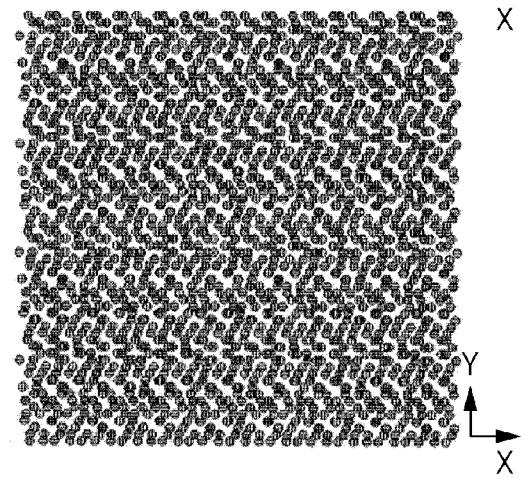
Figure 50E:
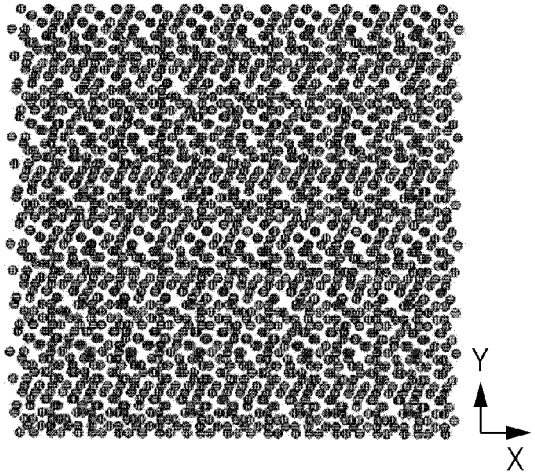

FIGS. 50A through 50E are diagrams illustrating images recorded in a case where image data having a gradation level of level 1 is input for both cyan ink and magenta ink. FIG. 50A illustrates a dot arrangement in a case where cyan ink has been overlaid with no positional deviation for both forward scanning and backward scanning, and FIG. 50B illustrates a dot arrangement in a case where magenta ink has been overlaid with no positional deviation for both forward scanning and backward scanning. FIG. 50C illustrates a dot arrangement where the dot arrangements of cyan ink and magenta ink in FIGS. 50A and 50B have been overlaid with no positional deviation. FIG. 50D illustrates a case where the dot arrangements have been overlaid with positional deviation of 21.2 µm (equivalent to 1200 dpi) toward the downstream side in the X direction in the backward scan, and FIG. 50E illustrates a case where the dot arrangements have been overlaid with positional deviation of 42.3 µm (equivalent to 600 dpi) toward the downstream side in the X direction in the backward scan. Unlike the illustration in FIGS. 20A through 20E, in FIGS. 50A through 50E the circles with vertical lines inside represent cyan ink dots, and the circles with horizontal lines inside represent magenta ink dots. It can be seen here from FIGS. 50C through 50E that there is hardly any deterioration in image quality even if there is deviation between scans.

Although an arrangement has been described here where all cyan and magenta dots formed in two pixels making up one pixel group are formed by scans in different directions, other arrangements may be made. Specifically, the advantages of the present embodiment can be obtained as long as, in pixel groups within a certain region, the number of pixel groups where cyan dots and magenta dots are formed by scans in different directions is larger than the number of pixel groups where cyan dots and magenta dots are formed by scans in the same direction.

A reference example regarding the fifth embodiment will be described below in detail. In the reference example, cyan dots and magenta dots formed in two pixels making up one pixel group are formed by scans in the same direction.

Figure 51A:
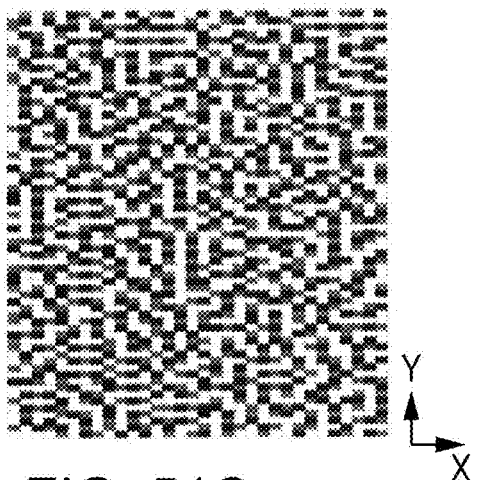
FIGS. 51A through 51F are diagrams illustrating mask patterns applied in a comparative example.
Figure 51B:
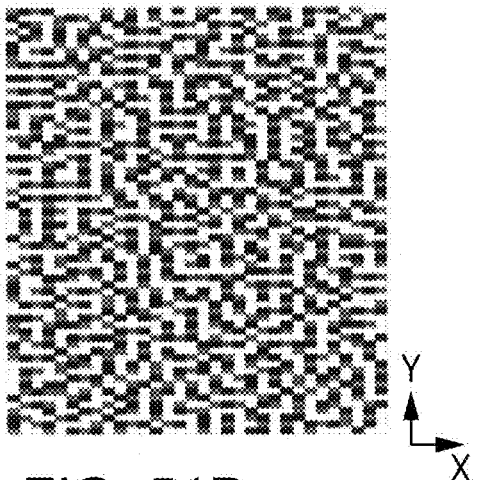
Figure 51C:
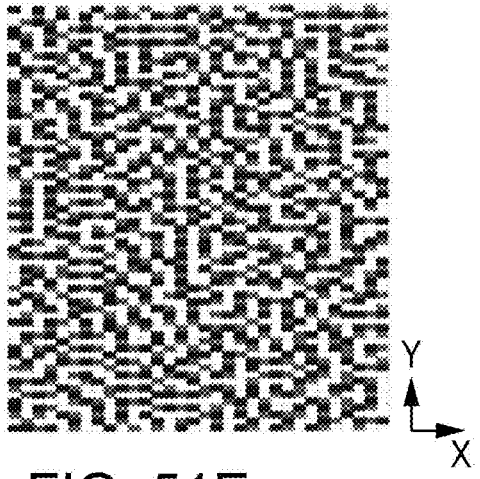
Figure 51D:
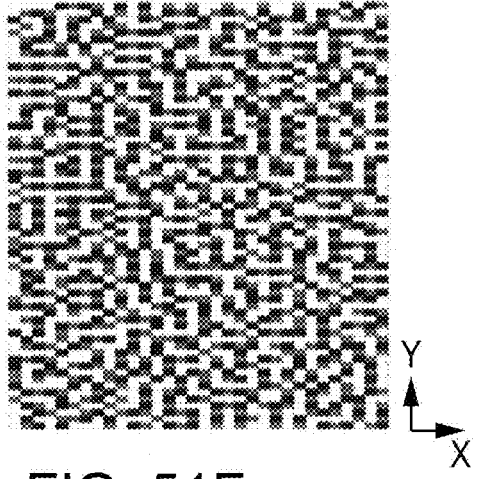
Figure 51E:
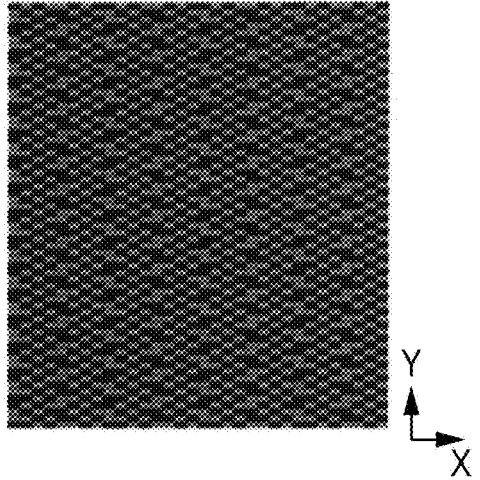
Figure 51F:
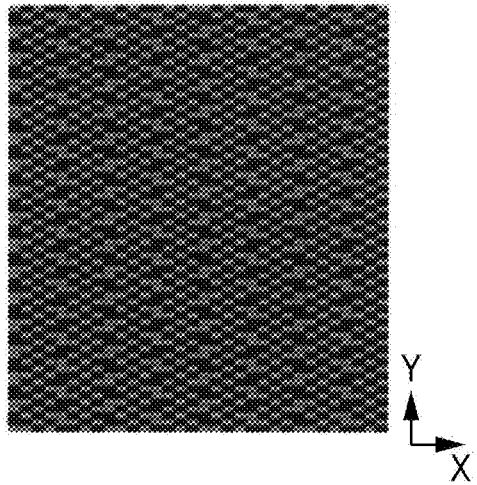

FIGS. 51A through 51F are diagrams illustrating mask patterns applied to quantization image data M4 corresponding to the recording element row for 1 pl of magenta ink, used in the reference example. Note that FIG. 51A illustrates a mask pattern MPM1_C corresponding to the first scan, FIG. 51B illustrates a mask pattern MPM2_C corresponding to the second scan, FIG. 51C illustrates a mask pattern MPM3_C corresponding to the third scan, and FIG. 51D illustrates a mask pattern MPM4_C corresponding to the fourth scan. Also, FIG. 51E illustrates a logical sum pattern MPM1_C+MPM3_C obtained as the logical sum of the number of times of permitted discharge of ink stipulated in the mask pattern MPM1_C corresponding to the first scan in FIG. 51A and the mask pattern MPM3_C corresponding to the third scan in FIG. 51C. Further, FIG. 51F illustrates a logical sum pattern MPM2_C+MPM4_C obtained as the logical sum of the number of times of permitted discharge of ink stipulated in the mask pattern MPM2_C corresponding to the second scan in FIG. 51B and the mask pattern MPM4_C corresponding to the fourth scan in FIG. 51D. In FIGS. 51A through 51F, the white pixels indicate pixels to which the code value "0" has been allocated, the gray pixels indicate pixels to which the code value "1" has been allocated, and the black pixels indicate pixels to which the code value "2" has been allocated. It can be seen from these FIGS. 51A through 51F that an arrangement 32 pixels in the X direction and 64 pixels in the Y direction, for a total of 2048 pixels, to which the number of permitted times of ink discharge has been set, is used as a repetitive increment of a mask pattern in the reference example, and this repetitive increment is repeated in the X direction and the Y direction.

Now, the pixels in the mask patterns MPM1_C through MPM4_C illustrated in FIGS. 51A through 51D are allocated code values following the same conditions as the mask patterns MPC1 through MPC4 illustrated in FIGS. 32A through 32D. In addition to this, the mask patterns MPM1_C through MPM4_C according to the reference example are set so that the cyan ink dots and magenta ink dots formed within the same pixel group are formed by scans in the same direction. Specifically, the mask patterns MPM1_C through MPM4_C are set such that the logical sum pattern MPM1_C+MPM3_C in FIG. 51E and the logical sum pattern MPC1+MPC3 in FIG. 32E are in an exclusive relationship, and the logical sum pattern MPM2_C+MPM4_C in FIG. 51F and the logical sum pattern MPC2+MPC4 in FIG. 32F are in an exclusive relationship. Note that in the present embodiment, a relationship where code value "1" is allocated to all pixels in one logical sum pattern and code value "2" is allocated to the other logical sum pattern is referred to as "exclusive".

For example, the pixels to which code value "1" is allocated in the logical sum pattern MPC1+MPC3 in FIG. 32E are allocated code value "2" in the logical sum pattern MPM1_C+MPM3_C in FIG. 51E. Further, the pixels to which code value "2" is allocated in the logical sum pattern MPC1+MPC3 in FIG. 32E are allocated code value "1" in the logical sum pattern MPM1_C+MPM3_C in FIG. 51E. Accordingly, it can be seen that the logical sum pattern MPC1+MPC3 and the logical sum pattern MPM1_C+MPM3_C are in a mutually exclusive relationship.

The following is a detailed description of positions where magenta ink is discharged at each gradation level in all of 8 pixels×8 pixels, and the scanning direction at the time of discharging at each position, with reference to FIGS. 52A1 through 52C4. FIGS. 52A1 through 52A4 each illustrate the dot arrangement patterns illustrated in FIGS. 31B through 31E having been repeated twice in the X direction, illustrating the positions and number of ink discharges within 8 pixels×8 pixels in a case where quantization data M4 having gradation levels 1 through 4 is input. FIGS. 52B1 and 52B2 each are 8-pixel×8-pixel regions extracted from the upper left of the logical sum patterns MPM1_C+MPM3_C and MPM2_C+MPM4_C illustrated in FIGS. 51E and 51F, respectively, illustrating the number of times recording is permitted for each pixel in the respective forward scans and backward scans.

FIGS. 52C1 through 52C4 are diagrams illustrating, with regard to positions where ink has been discharged in regions of 8 pixels×8 pixels in a case where quantization data having gradation levels 1 through 4 has been input, illustrating whether the positions received discharge of ink during a forward scan or a backward scan. Note that in FIGS. 52C1 through 52C4, grid tiles having only vertical lines indicate pixels where discharge has been performed only during forward scans, grid tiles having only horizontal lines indicate pixels where discharge has been performed only during backward scans, and grid tiles having both vertical and horizontal lines indicate pixels where discharge has been performed during both forward and backward scans.

For example, a pixel value of "1" is allocated to the region at the farthest upper right in the 8 pixels×8 pixels in the dot arrangement pattern illustrated in FIG. 52A4. It can be seen from the decoding table in FIG. 10 that a pixel to which the pixel value "1" has been allocated is set to discharge ink only in a case where the pixel code value is "1". The code value "1" is allocated in the logical sum pattern MPM2_C+MPM4_C to the pixel at the farthest upper right in the 8 pixels×8 pixels, which can be seen in FIG. 52B2. Accordingly, ink is discharged to the pixel at the farthest upper right in the 8 pixels×8 pixels only during backward scans, as can be seen in FIG. 52C4.

It can be seen from FIGS. 52C1 through 52C4 that, according to the dot arrangement patterns illustrated in FIGS. 31B through 31E and the mask patterns in FIGS. 51A through 51D, the placement of dots is set adjacent to each other in the X direction in all gradation levels, and also one of the two pixels set to be adjacent to each other is recorded at least by forward scanning, and the other is recorded at least by backward scanning. Moreover, according to the present embodiment, in a case where a cyan dot and a magenta dot are to be formed one each in two pixels making up one pixel group, it can be seen by comparing FIG. 52C4 with FIG. 31C4 that these two dots are formed by scans in the same direction. This point will be described below in detail with reference to FIGS. 53A and 53B.

Figure 53A:
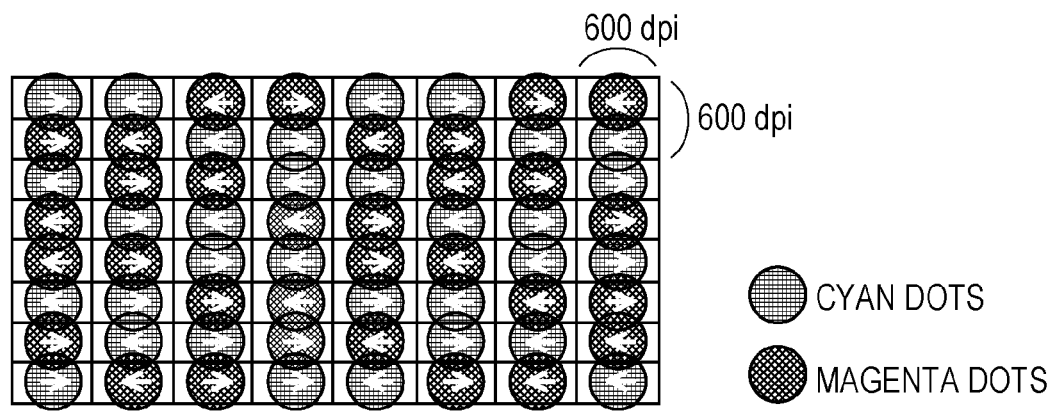
FIGS. 53A and 53B are diagrams for describing the degree of ink discharge position deviation among scans.

FIG. 53A is a diagram for describing the positions of dots formed in a case where cyan ink and magenta ink both are gradation level 1, and the scan direction in which the dots are formed. In other words, the pixels where a cyan dot is formed in a forward scan in FIG. 53A corresponds to the pixels in FIG. 31C4 where vertical lines are drawn, the pixels where a cyan dot is formed in a backward scan to the pixels in FIG. 31C4 where horizontal lines are drawn, the pixels where a magenta dot is formed in a forward scan to the pixels in FIG. 52C4 where vertical lines are drawn, and the pixels where a magenta dot is formed in a backward scan to the pixels in FIG. 52C4 where horizontal lines are drawn. Note that dots indicated by the right-facing arrows here represent dots formed in a forward scan, and dots indicated by the left-facing arrows here represent dots formed in a backward scan.

It can be seen from FIG. 53A that, regarding two pixels in a 600 dpi×600 dpi pixel group made up of 1 pixel×2 pixels that a cyan dot is formed at one pixel and a magenta dot is formed at the other pixel. Further, the cyan dot and magenta dot are formed in scans in the same direction.

For example, observing the two pixels making up the pixel group at the farthest upper left of the 8 pixels×8 pixels in FIG. 53A, cyan ink is formed at the farthest upper left pixel by a forward scan, and magenta ink is formed at the pixel farthest to the left and second from the top, by a forward scan. Similarly, observing the two pixels making up the pixel group at the farthest upper right of the 8 pixels×8 pixels in FIG. 53A, magenta ink is formed at the farthest upper right pixel by a backward scan, and cyan ink is formed at the pixel farthest to the right and second from the top by a backward scan.

Figure 53B:
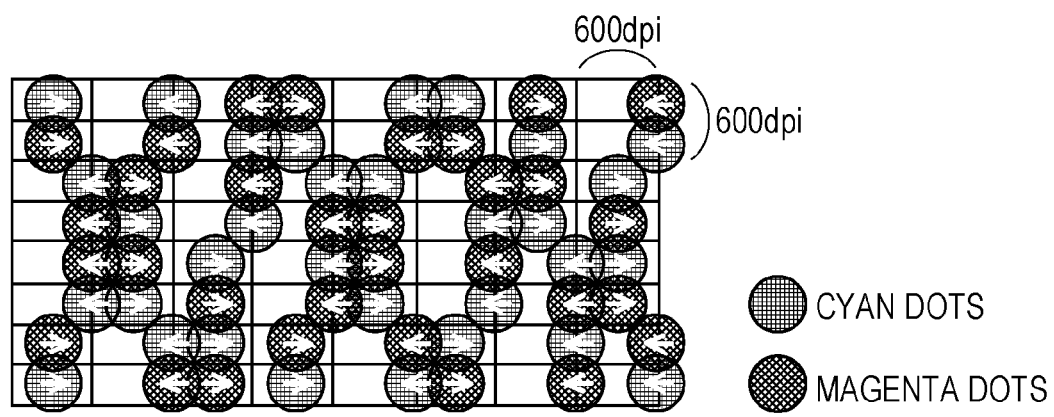

FIG. 53B is a diagram illustrating the positions of cyan dots and magenta dots in a case where there is deviation in the backward scan from the state in FIG. 53A, and deviation of 21.2 µm (equivalent to 1200 dpi) has occurred toward the downstream side in the X direction in the backward scan. FIG. 53B shows that if there is deviation in the backward scan, missing dots (white portions) connected in the Y direction occur. Accordingly, image quality is poorer as compared to the case illustrated in FIG. 49B.

Figure 54A:
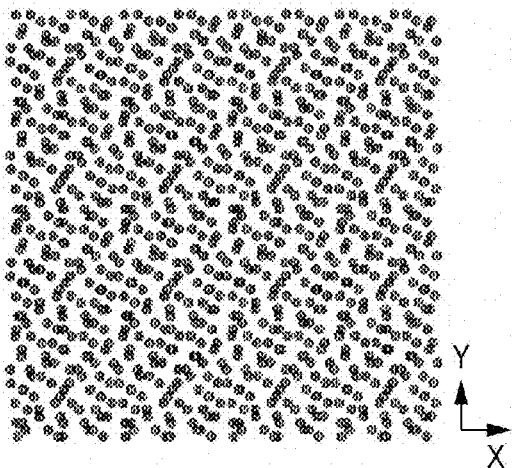
FIGS. 54A through 54E are schematic diagrams illustrating images to be recorded in a comparative example.
Figure 54B:
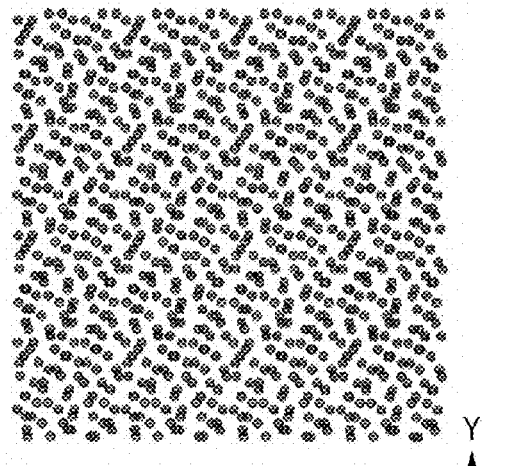
Figure 54C:
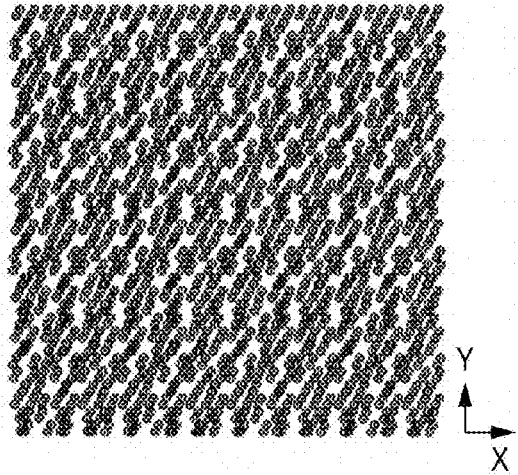
Figure 54D:
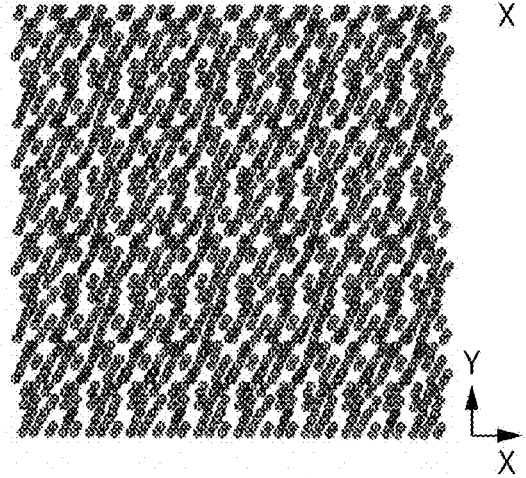
Figure 54E:
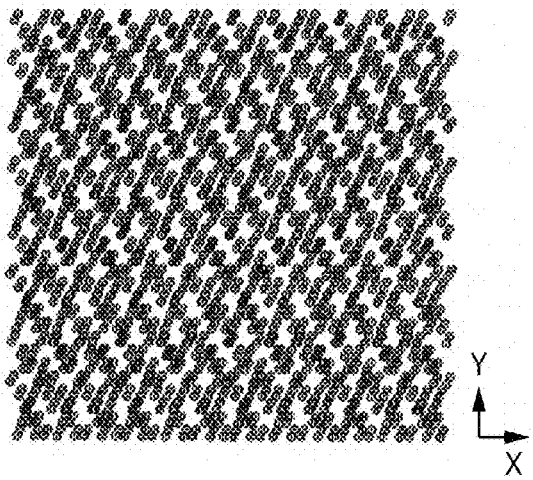

FIGS. 54A through 54E are diagrams illustrating images recorded in a case where image data having a gradation level of level 1 is input for both cyan ink and magenta ink. FIG. 54A illustrates dot arrangement where cyan ink is overlapped without deviation in both the forward scan and backward scan. FIG. 54B illustrates dot arrangement where magenta ink is overlapped without deviation in both the forward scan and backward scan. FIG. 54C illustrates a dot arrangement where the dot arrangements in FIGS. 54A and 54B have been overlaid with no positional deviation. FIG. 54D illustrates a case where the dot arrangements have been overlaid with positional deviation of 21.2 µm (equivalent to 1200 dpi) toward the downstream side in the X direction in the backward scan, and FIG. 54E illustrates a case where the dot arrangements have been overlaid with positional deviation of 42.3 µm (equivalent to 600 dpi) toward the downstream side in the X direction in the backward scan. Unlike the illustration in FIGS. 20A through 20E, in FIGS. 54A through 54E the circles with vertical lines inside represent cyan ink dots, and the circles with horizontal lines inside represent magenta ink dots. It can be seen from FIGS. 54C through 54E that in the reference example, the larger the deviation in scans is, the more conspicuous the missing dots (white portions) are. It can thus be seen that the reference example is not capable of sufficiently controlling discharge deviation between scans.

As described above, recording can be performed with suppressed discharge position deviation between scans according to the present embodiment, even in a case of using inks of multiple types.

Sixth Embodiment

A sixth embodiment will be described in detail. Portions that are the same as the above-described first embodiment will be omitted from description.

Discharge position deviation can be suppressed between reciprocal scans within one unit region according to the mask patterns and driving order described in the first embodiment. However, streaks and unevenness may occur at the boundaries between multiple unit regions, such as the boundary between unit region 211 and unit region 212 illustrated in FIG. 8 for example. This problem will be described in detail by way of the mask patterns MP1A through MP4A, with reference to FIGS. 25A through 25D.

It can be seen from FIG. 8 that in the unit region 211, the mask pattern MP1A is used for the first pass, mask pattern MP2A is used for the second pass, mask pattern MP3A is used for the third pass, and mask pattern MP4A is used for the fourth pass. That is to say, mask patterns MP1A and MP3A are used for the forward passes, and mask patterns MP2A and MP4A are used for the backward passes.

On the other hand, in the unit region 212, the mask pattern MP1A is used for the second pass, mask pattern MP2A is used for the third pass, mask pattern MP3A is used for the fourth pass, and mask pattern MP4A is used for the fifth pass. That is to say, mask patterns MP2A and MP4A are used for the forward passes, and mask patterns MP1A and MP3A are used for the backward passes. In other words, ink droplets are disposed in scans in different directions between the unit region 211 and unit region 212.

Figure 55A:
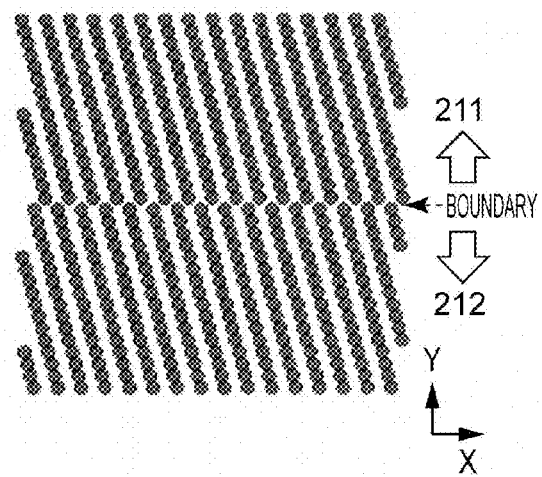
FIGS. 55A through 55C are schematic diagrams illustrating images to be recorded in a comparative example.
Figure 55B:
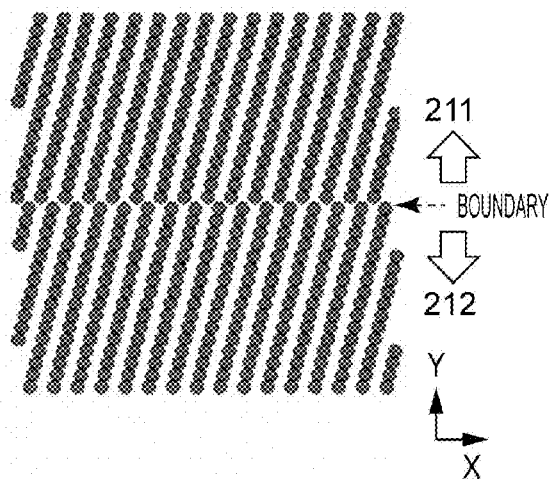
Figure 55C:
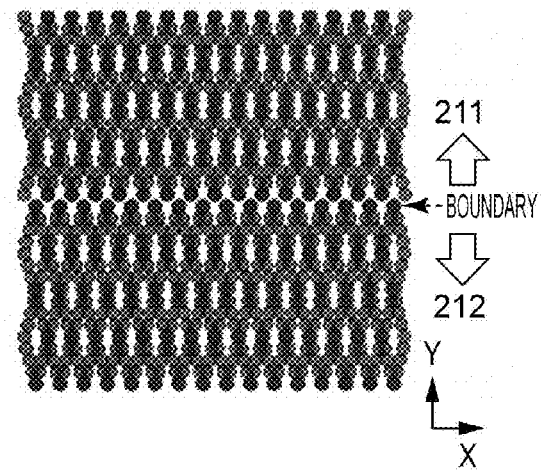

Of these regions, FIGS. 55A through 55C illustrate dot arrangements taking into consideration time-division driving around the boundary of a formed image in the unit region 211 and a formed image in the unit region 212. FIG. 55A illustrates a dot arrangement in forward scanning, FIG. 55B illustrates a dot arrangement in backward scanning, and FIG. 55C illustrates a dot arrangement where forward and backward scans are overlapped with no deviation between scanning directions. The distance in the X direction between dots that are disposed by the same nozzle in the same scanning direction is 42.3 µm (equivalent to 600 dpi), and the distance in the X direction between the first driving block and second driving block is 2.65 µm (i.e., 9600 dpi, obtained by multiplying 600 dpi by 16). Portions indicated by vertical lines have been recorded by forward scans, portions indicated by horizontal lines have been recorded by backward scans, and checked portions have been recorded by both forward and backward scans. The dotted arrows indicate the boundary portion of formed image in the unit region 211 and the formed image in the unit region 212 in FIG. 8. It can be seen from FIG. 55C that a gap is formed between the dots at the boundary, and that the gap continues in the X direction.

Although the same mask patterns are used to form an image in the unit region 211 and to form an image in the unit region 212, these images are formed by different scan recording operations with different time-division driving, so the Y-directional cycle of the dot arrangement making up the formed image in the unit region 211 and the dot arrangement making up the formed image in the unit region 212 is disrupted, resulting in this gap.

For example, in a case where image data having pixel value "1" for all pixels is input, ink is discharged in the unit region 211 where the dot landing positions of pixels set to code value "1" by the logical sum pattern MP1A+MP3A are such as illustrated in FIG. 18B, and where the dot landing positions of pixels set to code value "1" by the logical sum pattern MP2A+MP4A are such as illustrated in FIG. 18C. On the other hand, ink is discharged in the unit region 212 where the dot landing positions of pixels set to code value "1" by the logical sum pattern MP2A+MP4A are such as illustrated in FIG. 18B, and where the dot landing positions of pixels set to code value "1" by the logical sum pattern MP1A+MP3A are such as illustrated in FIG. 18C. The ink landing positions at the same pixels between unit regions adjacent in the Y direction differ in this way in time-division driving, which is thought to be the cause of the above-described streaks and unevenness. Even though this may seem to be a scant difference from the image in FIG. 55C, X-directional streaks and unevenness can be visually recognized in actual images.

In order to resolve this issue of streaks and unevenness, the present embodiment uses different mask patterns in a first unit region where recording is started from a forward scan, and a second unit region where recording is started from a backward scan. More specifically, the mask patterns MP1A through MP4A illustrated in FIGS. 25A through 25D are applied to image data corresponding to the first unit region where recording is started from the forward scan (e.g., unit region 211). On the other hand, the mask patterns MP1B through MP4B illustrated in FIGS. 56A through 56D are applied to image data corresponding to the second unit region where recording is started from the backward scan (e.g., unit region 212).

Figure 56A:
FIGS. 56A through 56F are diagrams illustrating mask patterns applied in an embodiment.
Figure 56B:
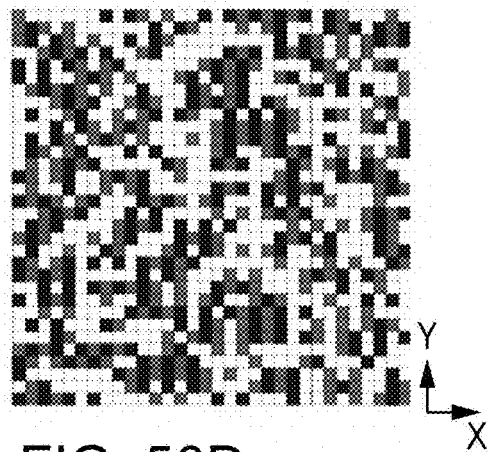
Figure 56C:
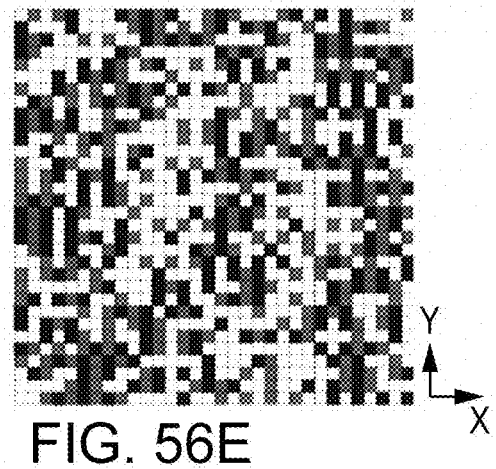
Figure 56D:
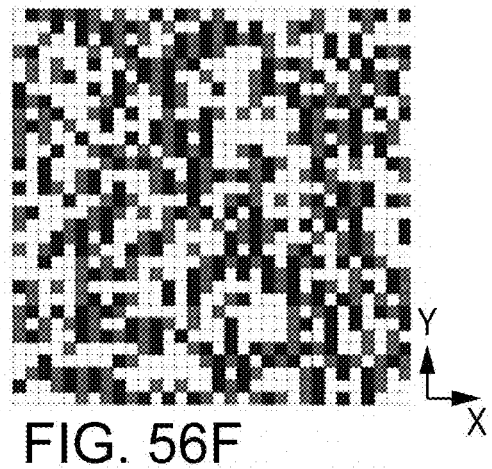
Figure 56E:
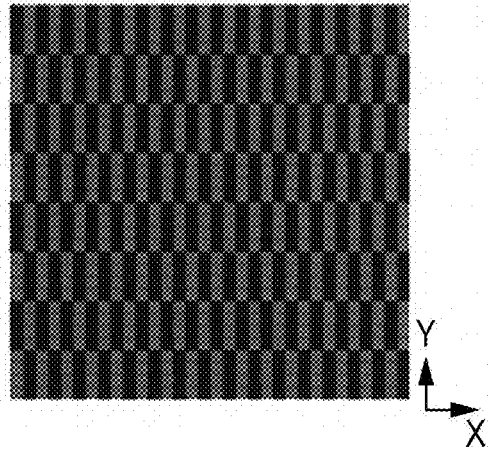

FIGS. 56A through 56D illustrate the mask patterns MP1B through MP4B corresponding to the first through fourth scans, respectively. FIG. 56E illustrates the logical sum pattern MP1B+MP3B of the mask patterns MP1B and MP3B corresponding to the first and third scans, and FIG. 56F illustrates the logical sum pattern MP2B+MP4B of the mask patterns MP2B and MP4B corresponding to the second and fourth scans, respectively.

It can be seen by comparing FIGS. 25E and 56E that pixels to which code value "1" has been allocated in the logical sum pattern MP1B+MP3B are allocated code value "2" in the logical sum pattern MP1A+MP3A. On the other hand, pixels to which code value "2" has been allocated in the logical sum pattern MP1B+MP3B are allocated code value "1" in the logical sum pattern MP1A+MP3A. Thus, the logical sum pattern MP1B+MP3B is an inverted form of the logical sum pattern MP1A+MP3A.

Figure 56F:
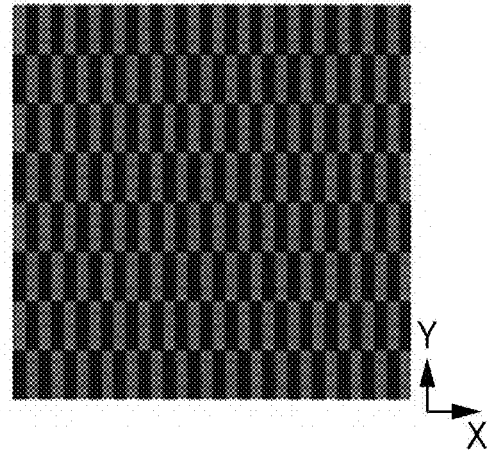

It can similarly be seen by comparing FIGS. 25F and 56F that pixels to which code value "1" has been allocated in the logical sum pattern MP2B+MP4B are allocated code value "2" in the logical sum pattern MP2A+MP4A. On the other hand, pixels to which code value "2" has been allocated in the logical sum pattern MP2B+MP4B are allocated code value "1" in the logical sum pattern MP2A+MP4A. Thus, the logical sum pattern MP2B+MP4B is an inverted form of the logical sum pattern MP2A+MP4A. Thus, the mask patterns MP1A through MP4A illustrated in FIGS. 25A through 25D and the mask patterns MP1B through MP4B illustrated in FIGS. 56A through 56D are applied having been switched every unit region, in the present embodiment.

Figure 57:
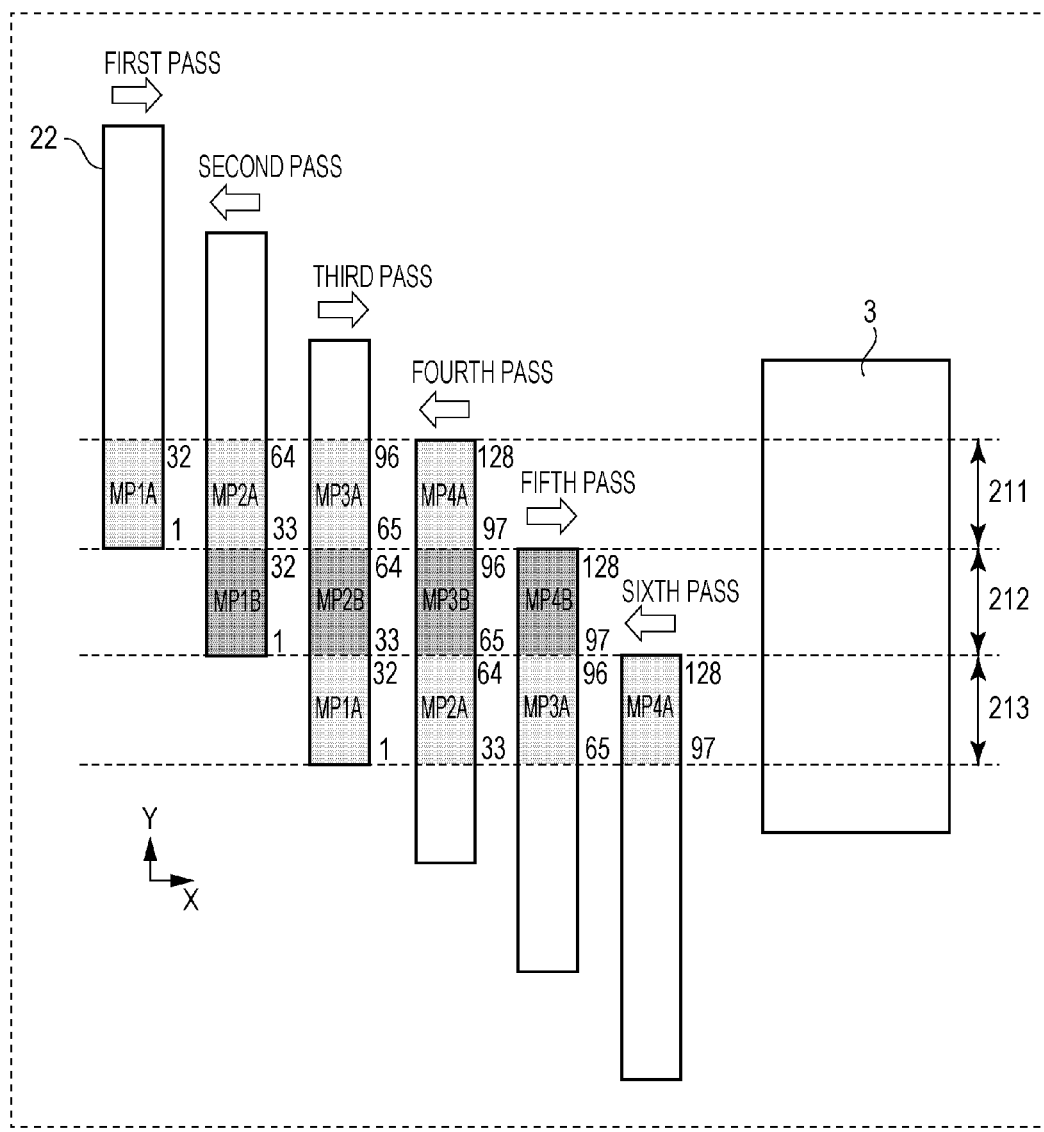
FIG. 57 is a diagram for describing a multi-pass recording method according to an embodiment.

Next, a method according to the present invention for forming images to solve the streaks and unevenness will be described. FIG. 57 is a schematic diagram illustrating the relationship between recording medium conveyance, positions of nozzles being used, and scanning direction, at the time of forming images according to the present invention.

In the first recording scan (first pass), ink is discharged into the unit region 211 on the recording medium 3 from a first recording element group. This first pass is performed from the upstream side in the X direction toward the downstream side (in the forward direction). The unit region 211 is a unit region where recording starts by forward scanning, so the mask patterns MP1A through MP4A are used for image data corresponding to the unit region 211. The first pass is the first scan as to the unit region 211, so the mask pattern MP1A is used here.

Next, the recording medium 3 is conveyed relative to the recording head 7, from the upstream side toward the downstream side in the Y direction, by a distance L/4. Although a case is illustrated here where the recording head 7 has been conveyed over the recording medium 3 from the downstream side toward the upstream side in the Y direction for the sake of brevity, the relative positional relationship of the recording medium 3 after conveyance as to the recording head 7 is the same as the recording medium 3 having been conveyed in downstream in the Y direction.

Thereafter, the second recording scan is performed. In the second recording scan (second pass), ink is discharged from the second recording element group to the unit region 211, and from the first recording element group to the unit region 212, on the recording medium 3. This second pass is made from the downstream side toward the upstream side in the X direction (in the backward direction). The second pass is the second scan as to the unit region 211, so the mask pattern MP2A is used as the image data corresponding to the second recording element group. On the other hand, the unit region 212 is a unit region where recording starts by backward scanning, so the mask patterns MP1B through MP4B are used for image data corresponding to the unit region 212.

The second pass is the first scan as to the unit region 212, so the mask pattern MP1B is used for the image data corresponding to the first recording element group. The reciprocal scanning of the recording head 7 and the relative conveyance of the recording medium 3 is alternately repeated thereafter, until the recording is completed.

An image recorded in a case where image data is input in which pixel values of all pixels are "1", following the recording method illustrated in FIG. 57 and applying the mask patterns MP1A through MP4A and mask patterns MP1B through MP4B by switching every unit region, will be described with reference to FIGS. 58A through 58C. In a case where the pixel values is "1" for all pixels, ink will be discharged to portions of the mask patterns MP1A through MP4A and mask patterns MP1B through MP4B where the code value is "1". That is to say, in the image recorded in unit region 211, ink is discharged to portions indicated by gray in FIGS. 25A through 25D, which are the pixels to which code value "1" has been allocated in the first scan as to the unit region 211 in FIG. 25A, the second scan in FIG. 25B, the third scan in FIG. 25C, and the fourth scan in FIG. 25D. Also, in the image recorded in unit region 212, ink is discharged to portions indicated by gray in FIGS. 56A through 56D, which are the pixels to which code value "1" has been allocated in the first scan as to the unit region 212 in FIG. 56A, the second scan in FIG. 56B, the third scan in FIG. 56C, and the fourth scan in FIG. 56D.

It can thus be seen that, with regard to the unit region 211 where recording starts by a forward scan, pixels in the unit region 211 set to code value "1" in the logical sum pattern illustrated in FIG. 25E are applied ink in the first and third scans, i.e., the forward scans to the unit region 211. As a result, the dot landing positions by time-division driving control of these pixels are positions such as illustrated in FIG. 18B. Pixels in the unit region 211 set to code value "1" in the logical sum pattern illustrated in FIG. 25F are applied ink in the second and fourth scans, i.e., the backward scans to the unit region 211. As a result, the dot landing positions by time-division driving control of these pixels are positions such as illustrated in FIG. 18C.

On the other hand, with regard to the unit region 212 where recording starts by a backward scan, pixels in the unit region 212 set to code value "1" in the logical sum pattern illustrated in FIG. 56E are applied ink in the second and fourth scans, i.e., the backward scans to the unit region 212. As a result, the dot landing positions by time-division driving control of these pixels are positions such as illustrated in FIG. 18C. Pixels in the unit region 212 set to code value "1" in the logical sum pattern illustrated in FIG. 56F are applied ink in the first and third scans, i.e., the forward scans to the unit region 212. As a result, the dot landing positions by time-division driving control of these pixels are positions such as illustrated in FIG. 18B.

Now, the logical sum pattern illustrated in FIG. 25E and the logical sum pattern illustrated in FIG. 56F have code value "1" allocated to the same positions as each other. Accordingly, the pixels within the unit regions 211 and 212 where time-division driving is performed can be made to be the same, so that the dot landing positions are as illustrated in FIG. 18B.

In the same way, the logical sum pattern illustrated in FIG. 25F and the logical sum pattern illustrated in FIG. 56E have code value "1" allocated to the same positions as each other. Accordingly, the pixels within the unit regions 211 and 212 where time-division driving is performed can be made to be the same, so that the dot landing positions are as illustrated in FIG. 18C.

Figure 58A:
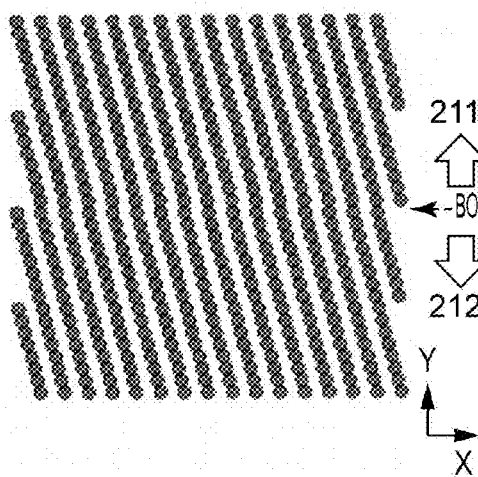
FIGS. 58A through 58C are schematic diagrams illustrating images to be recorded in an embodiment.
Figure 58B:
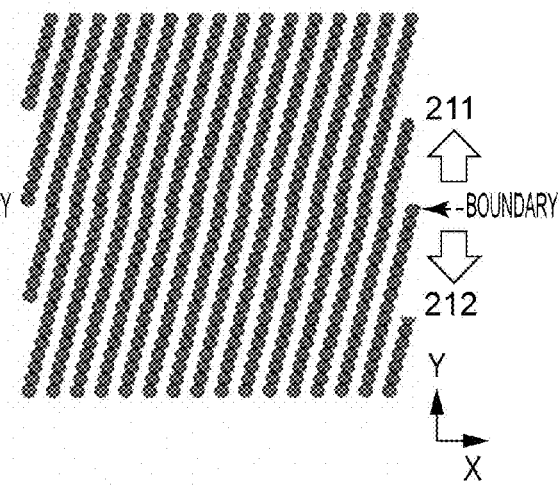
Figure 58C:
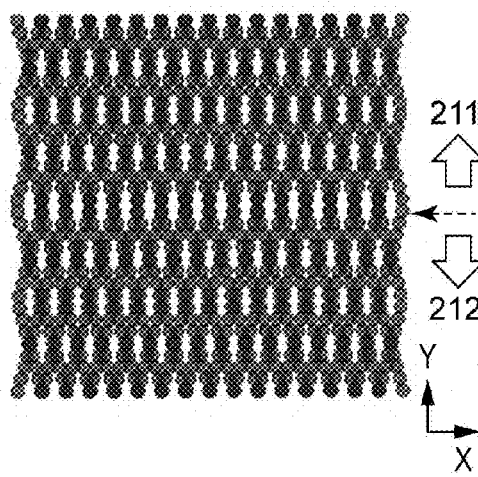

FIGS. 58A through 58C illustrate dot arrangements taking into consideration time-division driving around the boundary of a formed image in the unit region 211 and a formed image in the unit region 212. FIG. 58A illustrates a dot arrangement in forward scanning, FIG. 58B illustrates a dot arrangement in backward scanning, and FIG. 55C illustrates a dot arrangement where forward and backward scans are overlapped with no deviation between scanning directions. The distance in the X direction between dots that are disposed by the same nozzle in the same scanning direction is 42.3 µm (equivalent to 600 dpi), and the distance in the X direction between the first driving block and second driving block is 2.65 µm (i.e., 9600 dpi, obtained by multiplying 600 dpi by 16). The description of portions indicated by vertical lines, portions indicated by horizontal lines, and checked portions is the same as above. The dotted arrows indicate the boundary portion of the unit region 211 and unit region 212 in FIGS. 58A through 58C. It can be seen from FIG. 58C that the gap that had occurred between the dots at the boundary portion in FIG. 55C has been resolved, and that the disruption in the dot arrangement in Y-directional cycle has been suppressed.

As described above, switching between mask patterns in unit regions starting from a forward scan and unit regions starting from a backward scan, so that pixels recorded when performing +X direction (forward direction) scanning in band A and pixels recorded when performing −X direction (backward direction) scanning in band B are at inverted positions, enables streaks and unevenness occurring at boundaries between bands starting from different scanning directions.

Seventh Embodiment

According to the mask patterns and driving orders described above, discharge position deviation between reciprocal scans within one unit region can be suppressed. However, an arrangement may be made where one set of mask pattern portions is stored, and multiple mask pattern portions are generated by offsetting each of the mask pattern portions. It should be noted, though, that image quality may deteriorate between mask pattern portions in a case of generating one mask pattern based on multiple mask pattern portions in this way.

Figure 59A:
FIGS. 59A through 59F are diagrams illustrating mask pattern portions applied in an embodiment.
Figure 59B:
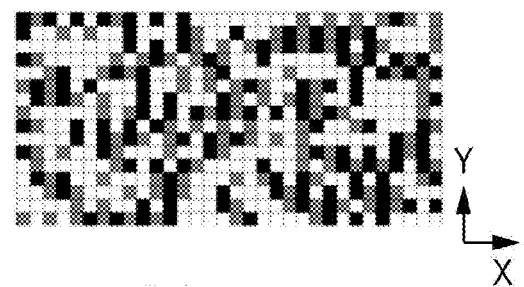
Figure 59C:
Figure 59D:
Figure 59E:
Figure 59F:
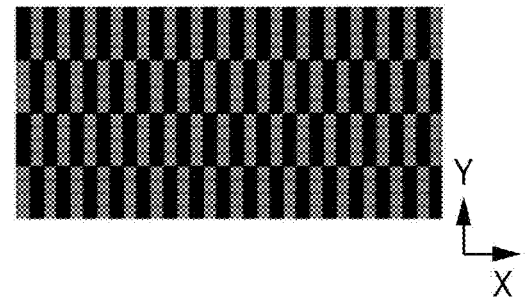

FIGS. 59A through 59F are diagrams illustrating examples of mask pattern portions. FIGS. 59A through 59D illustrate mask pattern portions MP1A_P through MP4A_P. FIG. 59E illustrates a logical sum pattern portion MP1A_P+MP3A_P of the mask pattern portions MP1A_P and MP3A_P corresponding to the first and third scans, and FIG. 59F illustrates a logical sum pattern portion MP2A_P+MP4A_P of the mask pattern portions MP2A_P and MP4A_P corresponding to the second and fourth scans. The mask pattern portions illustrated in each of FIG. 59A through FIG. 59D satisfy the above-described conditions.

It can be seen from FIGS. 59A through 59D that the mask pattern portions MP1A_P through MP4A_P used in the present embodiment have a size of 16 pixels in the Y direction and 32 pixels in the X direction. Now, the unit regions in the present embodiment have a size of 32 pixels in the Y direction as described above, one more mask pattern portion having the same size as the mask pattern portions MP1A_P through MP4A_P illustrated in FIGS. 59A through 59D needs to be applied, to match the size of the mask patterns and unit regions in the Y direction.

If a mask pattern corresponding to each scan is made by applying two each of the mask pattern portions MP1A_P through MP4A_P illustrated in FIGS. 59A through 59D in array in the Y direction, the upper half at the upstream side in the Y direction of the mask pattern and the lower half at the downstream side will have pixels to which code values have been allocated existing in the same form. As a result, the dot arrangement of recording data within the unit region generated using this mask pattern will be similar at the upper half at the upstream side in the Y direction and the lower half at the downstream side in the Y direction. Consequently, unevenness corresponding to pixel arrangements where code values have been allocated in the mask pattern portions may be readily visible in the image recorded within the unit region, leading to poor image quality.

Thus, according to the present embodiment, mask pattern portions MP1B_P through MP4B_P are generated by offsetting mask pattern portions MP1A_P through MP4A_P, and the mask patterns corresponding to the scans are generated by applying the mask pattern portions MP1A_P through MP4A_P and mask pattern portions MP1B_P through MP4B_P in array in the Y direction. Thus, in order to generate the mask pattern portions MP1B_P through MP4B_P in the present embodiment, the logical sum pattern portions MP1A_P+MP3A_P and MP2A_P+MP4A_P are offset in each of the X direction and Y direction by an amount equivalent to a multiple of the cycle of the form of pixels allocated the code values therein.

It can be seen that the logical sum pattern portions MP1A_P+MP3A_P and MP2A_P+MP4A_P illustrated in FIGS. 59E and 59F have pixels in which the code values cyclically are allocated thereto every two pixels in the X direction and every eight pixels in the Y direction. For example, in the logical sum pattern portion MP1A_P+MP3A_P illustrated in FIG. 59E, at the end portion on the downstream side in the Y direction for example, pixels are arranged in the order of a pixel allocated code value "1" from the end portion in the upstream side in the X direction, a pixel allocated code value "2", and so on toward the downstream side in the X direction. It can thus be inferred that, with regard to the X direction, pixels allocated the code values are cyclically arranged every two pixels, i.e., that the cycle in the X direction of the form of pixels allocated the code values is two pixels.

Also, for example in the logical sum pattern portion MP1A_P+MP3A_P illustrated in FIG. 59E, at the end portion on the upstream side in the X direction for example, pixels are arranged in the order of a pixel allocated code value "1" from the end portion in the downstream side in the Y direction, a pixel allocated code value "1", a pixel allocated code value "1", a pixel allocated code value "1", a pixel allocated code value "2", a pixel allocated code value "2", a pixel allocated code value "2", a pixel allocated code value "2", and so on toward the upstream side in the Y direction. It can thus be inferred that, with regard to the Y direction, pixels allocated the code values are cyclically arranged every eight pixels, i.e., that the cycle in the Y direction of the form of pixels allocated the code values is eight pixels. Accordingly, the mask pattern portions MP1B_P through MP4B_P are generated in the present embodiment by offsetting the mask pattern portions MP1A_P through MP4A_P by 2×p (where p is an integer) in the X direction and by 8×q (where q is an integer) in the Y direction.

FIGS. 60A through 60D are drawings illustrating mask pattern portions MP1B_P through MP4B_P. FIGS. 60A through 60D show the mask pattern portions MP1B_P through MP4B_P corresponding to the first through fourth scans, respectively. FIG. 60E illustrates a logical sum pattern portion MP1B_P+MP3B_P of the mask pattern portions MP1B_P and MP3B_P corresponding to the first and third scans, and FIG. 60F illustrates a logical sum pattern portion MP2B_P+MP4B_P of the mask pattern portions MP2B_P and MP4B_P corresponding to the second and fourth scans.

It can be seen from FIGS. 60A through 60D that the mask pattern portions MP1B_P through MP4B_P in the present embodiment are the mask pattern portions MP1A_P through MP4A_P in FIGS. 59A through 59D that have been offset by eight (i.e., 2×4) pixels to the upstream side in the X direction, and eight (i.e., 8×1) pixels to the downstream side in the Y direction.

For example, code value "1" is allocated at the 9th pixel from the upstream side in the X direction and the 12th pixel from the downstream side in the Y direction within the mask pattern portion MP1A_P illustrated in FIG. 59A. Accordingly, code value "1" is allocated at a pixel that has been offset by eight pixels to the upstream side in the X direction and eight pixels to the downstream side in the Y direction, from the 9th pixel from the upstream side in the X direction and the 12th pixel from the downstream side in the Y direction within the mask pattern MP1B_P illustrated in FIG. 60A, i.e., the 1st pixel from the upstream side in the X direction and the 4th pixel from the downstream side in the Y direction.

Note that the downstream edge portion in the X direction and the upstream edge portion in the X direction are considered to be adjacent in the mask patterns in FIGS. 59A through 60F, as well as are the downstream edge portion in the Y direction and the upstream edge portion in the Y direction. Thus, a position offset by one pixel to the upstream side in the X direction from the upstream side edge portion in the X direction is considered to be the downstream edge portion in the X direction. In the same way, a position offset by one pixel to the upstream side in the Y direction from the upstream side edge portion in the Y direction is considered to be the downstream edge portion in the Y direction.

For example, code value "2" is allocated to a pixel that is the 1st pixel from the upstream side in the X direction within the mask pattern portion MP1A_P in FIG. 59A and the 5th pixel from the downstream side in the Y direction. Accordingly, code value "2" is allocated at a pixel that has been offset by eight pixels to the upstream side in the X direction and eight pixels to the downstream side in the Y direction, from the 1st pixel from the upstream side in the X direction and the 5th pixel from the downstream side in the Y direction within the mask pattern MP1B_P in FIG. 60A, i.e., the 8th pixel from the downstream side in the X direction and the 4th pixel from the upstream side in the Y direction.

Figure 60A:
FIGS. 60A through 60F are diagrams illustrating mask pattern portions applied in an embodiment.
Figure 60B:
Figure 60C:
Figure 60D:
Figure 60E:
Figure 60F:
Figure 62A:
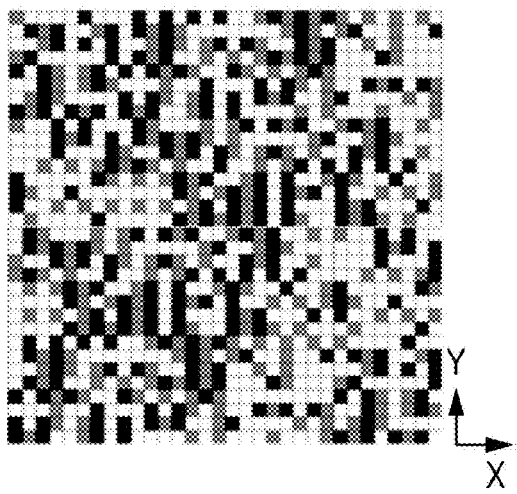
FIGS. 62A through 62D are diagrams illustrating patterns where mask pattern portions applied in an embodiment have been connected.
Figure 62B:
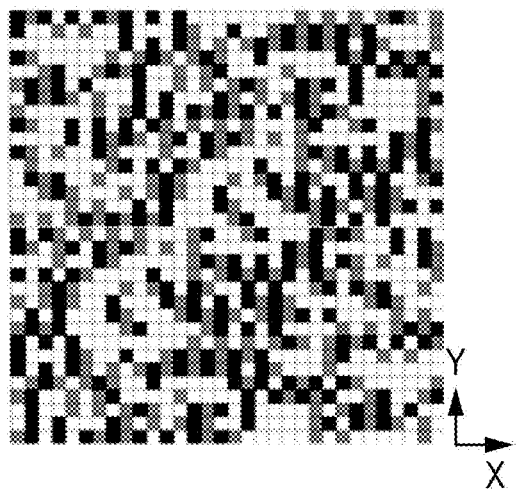
Figure 62C:
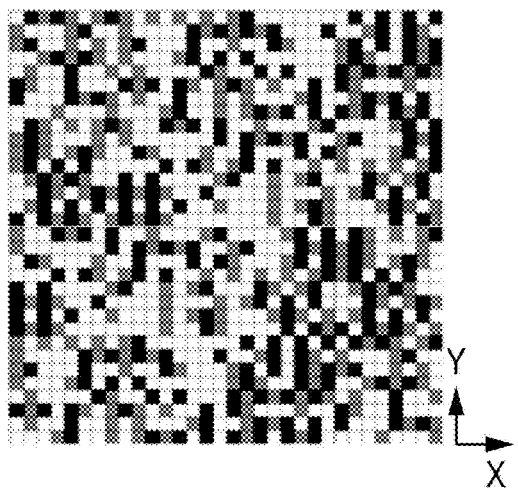
Figure 62D:
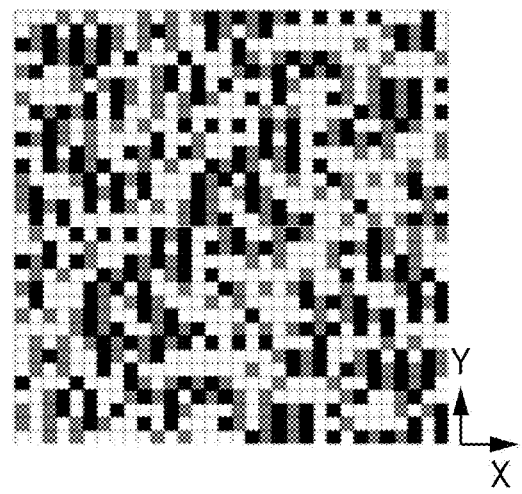

In the same way, the mask pattern portion MP2B_P illustrated in FIG. 60B has a form where the mask pattern portion MP2A_P has been offset to the upstream side in the X direction by 8 pixels, and to the downstream side in the Y direction by 8 pixels illustrated in FIG. 59B. Further, the mask pattern portion MP3B_P illustrated in FIG. 60C has a form where the mask pattern portion MP3A_P has been offset to the upstream side in the X direction by 8 pixels, and to the downstream side in the Y direction by 8 pixels illustrated in FIG. 59C. Moreover, the mask pattern portion MP4B_P illustrated in FIG. 60D has a form where the mask pattern portion MP4A_P has been offset to the upstream side in the X direction by 8 pixels, and to the downstream side in the Y direction by 8 pixels illustrated in FIG. 59D.

As described above, the mask pattern portions MP1A_P through MP4A_P have each been offset by an amount equivalent to a multiple of the cycle of the form of pixels allocated the code values in the logical sum pattern portions MP1A_P+MP3A_P and MP2A_P+MP4A_P, thereby yielding the mask pattern portions MP1B_P through MP4B_P. Accordingly, the logical sum pattern portion MP1B_P+MP3B_P illustrated in FIG. 60E is the same form as the logical sum pattern portion MP1A_P+MP3A_P illustrated in FIG. 59E, and the logical sum pattern portion MP2B_P+MP4B_P illustrated in FIG. 60F is the same form as the logical sum pattern portion MP2A_P+MP4A_P illustrated in FIG. 59F.

A method of applying the mask pattern portions MP1A_P through MP4A_P and MP1B_P through MP4B_P in the present embodiment will be described with reference to FIG. 61. In the present embodiment, each of the first through fourth recording element groups are divided in the Y direction in each scan, with the mask pattern portions MP1A_P through MP4A_P illustrated in FIGS. 59A through 59D being applied to image data corresponding to the recording elements in the downstream half in the Y direction of the first through fourth recording element groups, and the mask pattern portions MP1B_P through MP4B_P illustrated in FIGS. 60A through 60D being applied to image data corresponding to the recording elements in the upstream half in the Y direction of the first through fourth recording element groups. Accordingly, recording data can be generated that is the same as applying the mask patterns illustrated in FIGS. 62A through 62D to image data corresponding to the first through fourth recording element groups. Note that FIGS. 62A through 62D are mask patterns corresponding to the first through fourth scans, and have been obtained by connecting the upstream edge portion in the Y direction of the mask pattern portions MP1A_P through MP4A_P illustrated in FIGS. 59A through 59D and the downstream edge portion in the Y direction of the mask pattern portions MP1B_P through MP4B_P illustrated in FIGS. 60A through 60D.

Figure 64A:
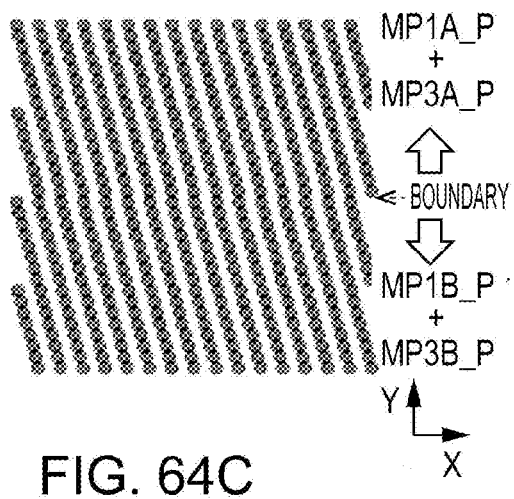
FIGS. 64A through 64C are schematic diagrams illustrating images to be recorded in an embodiment.
Figure 64B:
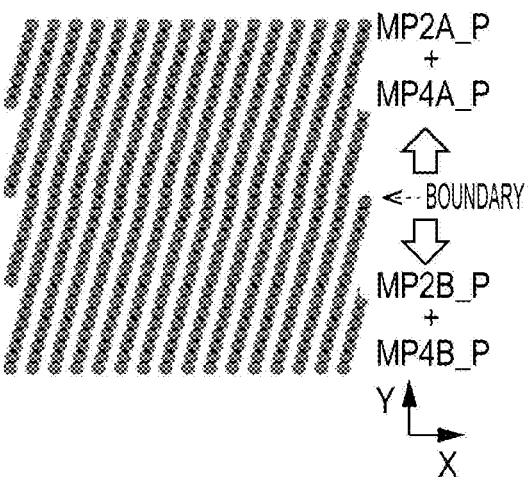
Figure 64C:
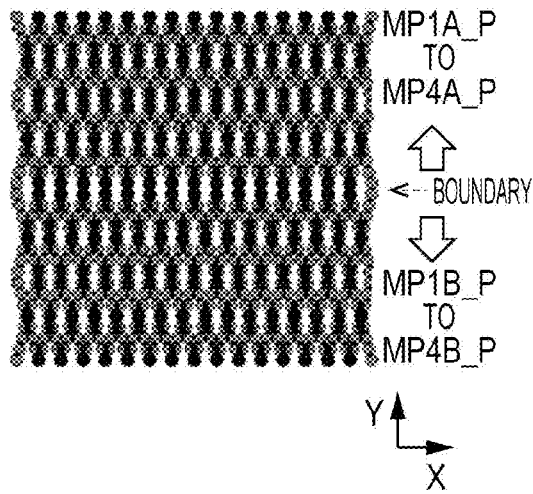

FIGS. 64A through 64C illustrate images recorded by performing time-division driving in the driving order illustrated in FIG. 63A for both forward and backward scans, using the mask pattern portions MP1A_P through MP4A_P illustrated in FIGS. 59A through 59D and the mask pattern portions MP1B_P through MP4B_P illustrated in FIGS. 60A through 60D. FIG. 63B is a schematic diagram illustrating the way in which dots are formed in a case of driving recording element No. 1 through No. 16 while scanning in the forward direction following the driving order shown in FIG. 63A. FIG. 63C is a schematic diagram illustrating the way in which dots are formed in a case of driving recording element No. 1 through No. 16 while scanning in the backward direction following the driving order shown in FIG. 63A.

FIG. 64A illustrates a dot arrangement in forward scanning, FIG. 64B illustrates a dot arrangement in backward scanning, and FIG. 64C illustrates a dot arrangement where forward and backward scans are overlapped with no deviation between scanning directions. The distance in the X direction between dots that are disposed by the same nozzle in the same scanning direction is 42.3 μm (equivalent to 600 dpi), and the distance in the X direction between the first driving block and second driving block is 2.65 μm (i.e., 9600 dpi, obtained by multiplying 600 dpi by 16). Portions indicated by vertical lines have been recorded by forward scans, portions indicated by horizontal lines have been recorded by backward scans, and checked portions have been recorded by both forward and backward scans.

It can be seen from FIG. 64C that there is no disruption in the cycle in the Y direction regarding the dot arrangements between the region formed by the recording data generated by the mask pattern portions MP1A_P through MP4A_P and the recording data generated by the mask pattern portions MP1B_P through MP4B_P in the present embodiment. Dots thus can be arranged so that there is not particular gap at the boundary portion.

Comparative Example

Next, a case will be described where mask pattern portions MP1C_P through MP4C_P are used. The mask pattern portions MP1C_P through MP4C_P have been generated by offsetting the logical sum pattern portions MP1A_P+ MP3A_P and MP2A_P+MP4A_P in the X direction and Y direction each by an amount equivalent to a number that is not a multiple of the cycle of the form of pixels allocated the code values therein. The cycle of the logical sum pattern portions MP1A_P+MP3A_P and MP2A_P+MP4A_P is two pixels in the X direction and eight pixels in the Y direction, as described above. Accordingly, in the comparative example, the mask pattern portions MP1C_P through MP4C_P generated by offsetting the mask pattern portions MP1A_P through MP4A_P each by 3 (i.e., a number other than 2) upstream in the X direction and by 3 (i.e., a number other than 2) downstream in the Y direction.

FIGS. 65A through 65D are diagrams illustrating the mask pattern portions MP1C_P through MP4C_P. FIGS. 65A through 65D illustrate the mask pattern portions MP1C_P through MP4C_P corresponding to the first through fourth scans, FIG. 65E illustrates the logical sum pattern portion MP1C_P+MP3C_P of the mask pattern portions MP1C_P and MP3C_P corresponding to the first and third scans, and FIG. 65F illustrates the logical sum pattern portion MP2C_P+MP4C_P of the mask pattern portions MP2C_P and MP4C_P corresponding to the second and fourth scans.

Figure 65A:
FIGS. 65A through 65F are diagrams illustrating mask pattern portions applied in a comparative example.
Figure 65B:
Figure 65C:
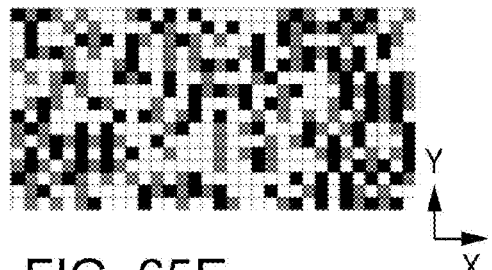
Figure 65D:
Figure 65E:
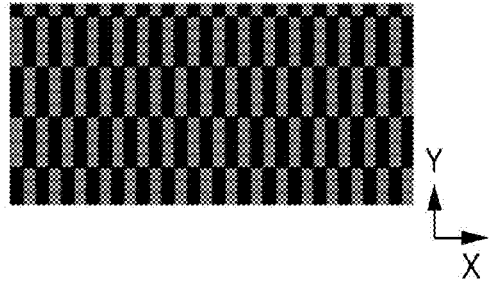
Figure 65F:

It can be seen by comparing FIG. 65E and FIG. 59E that the logical sum pattern portion MP1C_P+MP3C_P differs in form from the logical sum pattern portion MP1A_P+ MP3A_P. The reason is that the offset amount used to generate the mask pattern portions MP1C_P through MP4C_P was not a multiple of the cycle of the form of pixels allocated the code values in the logical sum pattern portions MP1A_P+MP3A_P. Accordingly, the dot arrangement formed by the mask pattern portions MP1C_P through MP4C_P is different from the dot arrangement formed by the mask pattern portions MP1A_P through MP4A_P.

Figure 66A:
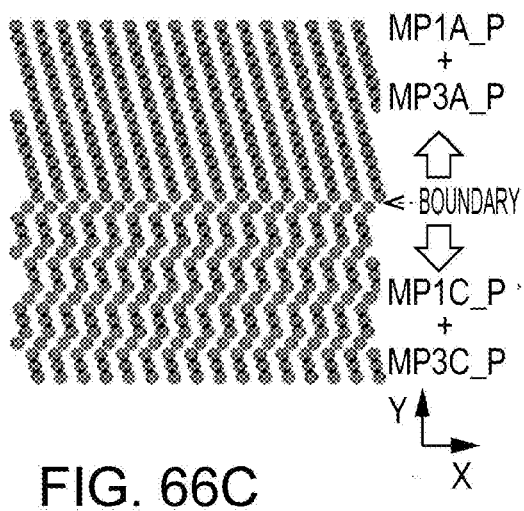
FIGS. 66A through 66C are schematic diagrams illustrating images to be recorded in a comparative example.
Figure 66B:
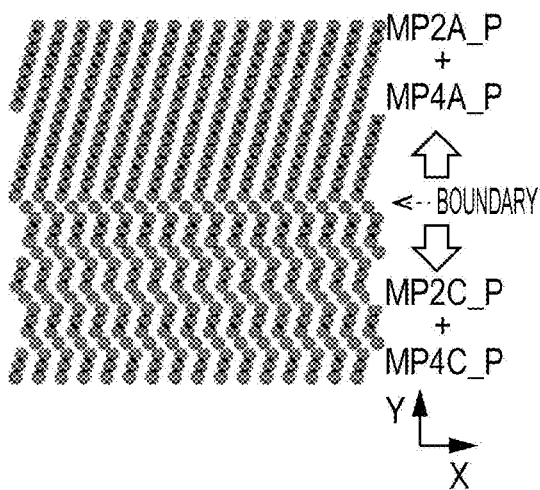
Figure 66C:
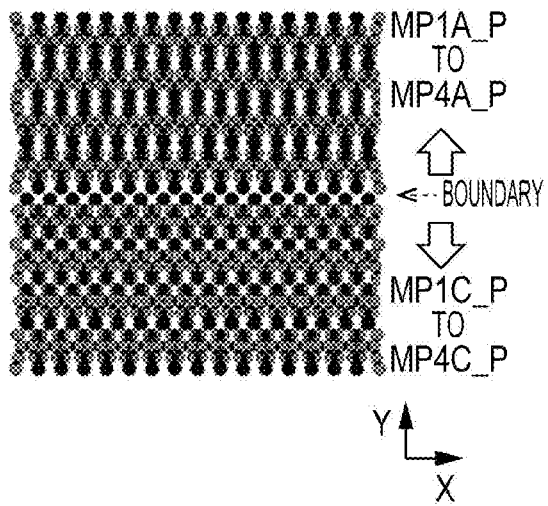

FIGS. 66A through 66C illustrate images recorded by performing time-division driving in the driving order illustrated in FIG. 63A for both forward and backward scans, using the mask pattern portions MP1A_P through MP4A_P illustrated in FIGS. 59A through 59D and the mask pattern portions MP1C_P through MP4C_P illustrated in FIGS. 65A through 65D. FIG. 66A illustrates a dot arrangement in forward scanning, FIG. 66B illustrates a dot arrangement in backward scanning, and FIG. 66C illustrates a dot arrangement where forward and backward scans are overlapped with no deviation between scanning directions. The distance in the X direction between dots that are disposed by the same nozzle in the same scanning direction is 42.3 µm (equivalent to 600 dpi), and the distance in the X direction between the first driving block and second driving block is 2.65 µm (i.e., 9600 dpi, obtained by multiplying 600 dpi by 16). Portions indicated by vertical lines have been recorded by forward scans, portions indicated by horizontal lines have been recorded by backward scans, and checked portions have been recorded by both forward and backward scans.

It can be seen from FIG. 66C that there is disruption in the cycle in the Y direction regarding the dot arrangements between the region formed by the recording data generated by the mask pattern portions MP1A_P through MP4A_P and the recording data generated by the mask pattern portions MP1C_P through MP4C_P in the comparative example. This disruption causes a gap extending in the X direction at the boundary portion, which may be visually recognized as a streak in the image that is formed.

As described above, an arrangement may be made where one set of first mask pattern portions is stored, second mask pattern portions are generated by offsetting each of the first mask pattern portions by an integer multiple of the cycle of arrangement of pixels allocated the code values in a first logical sum pattern obtained as the logical sum of the first mask pattern portions corresponding to one scan. Thus, the form of the first logical sum pattern, and the form of a second logical sum pattern obtained as the logical sum of the second mask pattern portions corresponding to the one scan, can be made the same. Thus, images can be recorded without deterioration in image quality between mask pattern portions.

The cycle of mask patterns in the Y direction preferably is equivalent to a divisor of the number of driving blocks in the time-division driving control.

Although an arrangement has been described where different mask pattern portions MP1A_P through MP4A_P and mask pattern portions MP1B_P through MP4B_P are separately applied to different regions in each recording element group, this is not restrictive. The mask pattern portions MP1A_P through MP4A_P and mask pattern portions MP1B_P through MP4B_P may be used to generate mask patterns such as illustrated in FIGS. 62A through 62D, and the generated mask patterns applied to the recording element groups.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Description has been made in the above embodiments regarding an arrangement where discharge position deviation between forward scans and backward scans is suppressed in a case where forward scans and backward scans are performed as to a unit region. Accordingly, description has been made that the driving order for backward scans needs to be different from the opposite order of the driving order for forward scans, and that the driving order preferably is different from the opposite order of an offset order of the driving order for forward scanning, and more preferably the same as the driving order for forward scanning.

However, the present invention is not restricted to this arrangement. In a case of recording multiple times by scans only in one direction to a unit region, discharge position deviation between a first type of scan and a second type of scan can be suppressed. For example, in a case where the first type of scan is the first half of multiple scans and the second type of scan is the later half of multiple scans, discharge position deviation between the scans in the first half and the scans in the later half can be suppressed. At this time, the driving order for the second type of scan needs to be different from the driving order for first type of scan, the driving order preferably is different from an offset order of the driving order for the first type of scan, and more preferably the opposite order of from the driving order for the first type of scan.

The reason for this is that, as described with reference to FIGS. 11A through 11C and other drawings, when reciprocal scanning is performed using the same driving order, the landing positions of ink from each driving block under time-division driving control will be inverted positions, and when one-way scanning is performed using the same driving order, the landing positions of ink from each driving block under time-division driving control will be the same positions. It can thus be understood that the ink landing positions from the driving blocks in time-division driving where one-way driving for example is performed at the driving order of the second type of scan is the opposite order from the driving order of the first type of scan, and the ink landing positions from the driving blocks in time-division driving where reciprocal scanning is performed with the driving order for backward scans and the driving order for forward scans is the same order, will be the same positions.

Although an arrangement has been described in the above embodiments where multi-value mask patterns are configured using multi-bit information indicating the number of times of ink discharge permitted to each pixel, other arrangements may be made as well. For example, binary mask patterns may be used that are configured using 1-bit information indicating permission/non-permission of ink discharge to each pixel. In this case, it is sufficient that, with regard to a first logical sum pattern obtained from mask patterns corresponding to forward scans and a second logical sum pattern obtained from mask patterns corresponding to backward scans, multiple mask patterns are set such that, of pixels where recording is set to be permitted in the second logical sum pattern, the number of pixels adjacent at both sides in the X direction to pixels where recording is set to be permitted in the first logical sum pattern is larger than the number of pixels not adjacent at both sides in the X direction to pixels where recording is set to be permitted in the first logical sum pattern.

Although description has been made in the embodiments regarding an arrangement where two passes each are performed of a forward scan and a backward scan as to a unit region, and to an arrangement where two passes each are performed for one of a forward scan and a backward scan as to a unit region and one pass for the other, other arrangements may be made. That is, the present invention can be applied as long as K (K≥1) forward scans and L (L≥1) backward scans are performed as to a unit region. In this case, K mask patterns for forward scanning and L mask patterns for backward scanning may be used.

In the above-describe embodiments, description has been made regarding an arrangement where recording data is generated using image data that is made up of two bits of information per pixel and sets the number of times of ink discharge to one of 0, 1, and 2, and mask patterns that is made up of two bits of information per pixel and sets the number of times of discharge permitted to one of 0, 1, and 2, but other arrangements may be made. Image data and mask patterns may be used that are made up of information having three bits or more per pixel. In a case where the information per pixel making up the image data and mask patterns is n bits, the number of times of ink discharge and the number of times permitted can be set to a maximum of $(2^n)$.

An example will be made regarding a case of forming image data and mask patterns from information having three or more bits per pixel. That is, 3-bit information making up the image data and mask patterns will be one of "001", "010", "011", "100", "101", "110", and "111".

In a case where the 3-bit information making up image data for a certain pixel is "000", the pixel value is "0", so the number of times of ink discharge to that pixel is zero times. In a case where the 3-bit information making up image data for a certain pixel is "001", the pixel value is "1", so the number of times of ink discharge to that pixel is once. In a case where the 3-bit information making up image data for a certain pixel is "010", the pixel value is "2", so the number of times of ink discharge to that pixel is twice. In a case where the 3-bit information making up image data for a certain pixel is "011", the pixel value is "3", so the number of times of ink discharge to that pixel is three times. In a case where the 3-bit information making up image data for a certain pixel is "100", the pixel value is "4", so the number of times of ink discharge to that pixel is four times. In a case where the 3-bit information making up image data for a certain pixel is "101", the pixel value is "5", so the number of times of ink discharge to that pixel is five times. In a case where the 3-bit information making up image data for a certain pixel is "110", the pixel value is "6", so the number of times of ink discharge to that pixel is six times. In a case where the 3-bit information making up image data for a certain pixel is "111", the pixel value is "7", so the number of times of ink discharge to that pixel is seven times.

On the other hand, in a case where the 3-bit information making up a mask pattern for a certain pixel is "000", the code value is "0", so the number of times of ink discharge permitted for that pixel is zero times. In a case where the 3-bit information making up a mask pattern for a certain pixel is "001", the code value is "1", so the number of times of ink discharge permitted for that pixel is once. In a case where the 3-bit information making up a mask pattern for a certain pixel is "010", the code value is "2", so the number of times of ink discharge permitted for that pixel is twice. In a case where the 3-bit information making up a mask pattern for a certain pixel is "011", the code value is "3", so the number of times of ink discharge permitted for that pixel is three times. In a case where the 3-bit information making up a mask pattern for a certain pixel is "100", the code value is "4", so the number of times of ink discharge permitted for that pixel is four times. In a case where the 3-bit information making up a mask pattern for a certain pixel is "101", the code value is "5", so the number of times of ink discharge permitted for that pixel is five times. In a case where the 3-bit information making up a mask pattern for a certain pixel is "110", the code value is "6", so the number of times of ink discharge permitted for that pixel is six times. In a case where the 3-bit information making up a mask pattern for a certain pixel is "111", the code value is "7", so the number of times of ink discharge permitted for that pixel is seven times.

FIG. 67 shows a decoding table setting the rules described above. For example, if a pixel has been allocated code value "1", recording data is generated where non-discharge of ink is stipulated in a case where the pixel value is "0" to "6" and discharge of ink is stipulated if the pixel value is "7". If a pixel has been allocated code value "7" for example, recording data is generated where non-discharge of ink is stipulated in a case where the pixel value is "0" and discharge of ink is stipulated if the pixel value is "1" to "7".

Pixels regarding which discharge of ink is set even in a case where the image is low in concentration, such as in a case where the pixel value of the image data is "1" for example, are pixels to which the code value "7" has been allocated, which is the largest number of times of ink discharge permitted in the mask pattern. Accordingly, in order to use the decoding table such as illustrated in FIG. 67 and obtain the advantages of the present invention, using the image data and mask patterns made up of 3-bit information per pixel, pixels allocated the code value "7" in the mask pattern are of particular interest. More specifically, it is sufficient to use a mask pattern where, of predetermined pixels allocated the code value "7" in a forward scanning mask pattern, the number of predetermined pixels adjacent at both sides in the X direction to pixels allocated the code value "7" in the backward scanning mask pattern is larger than the number of predetermined pixels not adjacent at both sides in the X direction to pixels allocated the code value "7" in the backward scanning mask pattern.

Pixels to which code value "6" have been allocated, so that non-discharge of ink is stipulated if the pixel value of the image data is "1" but discharge is stipulated if the pixel value is "2", and pixels to which code value "5" have been allocated, so that non-discharge of ink is stipulated if the pixel value of the image data is "1" or "2" but discharge is stipulated if the pixel value is "3", also are pixels set to discharge ink with recording relatively low-concentration images. Accordingly, pixels to which code value "6" and code value "5" are allocated preferably are set to the same conditions as the pixels to which the code value "7" has been set. In order to suppress position deviation between reciprocal scans when recording low-concentration images, pixels to which code values have been allocated where the number of times of ink discharge permitted is S (S≥R/2, where R is the greatest value of number of times of ink discharge that the image data is capable of expressing) preferably have been set under the same conditions as the pixels to which the above-described code value "7" has been set.

Although description has been made in the embodiments regarding an arrangement where recording is performed while conveying a recording medium between multiple scans as to a unit region, the present invention may be carried out by other arrangements as well. That is to say, an arrangement may be made where multiple scans are performed for recording on a unit region without performing conveyance of the recording medium.

The present invention is not restricted to a thermal-jet ink jet recording apparatus. The present invention can be effectively applied to various recording apparatuses, such as a piezoelectric ink jet recording apparatus that discharges ink using piezoelectric elements, for example.

Although a recording method using a recording apparatus has been described in the embodiments, an arrangement may be made where an image processing apparatus, image processing method, and program, to generate data for performing the recording method described in the embodiments, are provided separately from the recording apparatus. It is needless to say that the present invention is widely applicable to an arrangement provided to part of a recording apparatus.

Also, the term "recording medium" is not restricted to paper used in general recording apparatuses, and broadly includes any material capable of accepting ink, including cloth, plastic film, metal plates, glass, ceramics, wood, leather, and so forth.

Further, the term "ink" refers to a liquid that, by being applied onto a recording medium, is used to form images designs, patterns, or the like, or to process the recording medium, or for processing of ink (e.g., solidification or insolubilization of coloring material in the ink applied to the recording medium).

According to the recording apparatus and recording method of the present invention, recording can be performed with suppressed discharge position deviation of ink between two types of scans, without conspicuous graininess even when recording images with different concentration, such as when recording low-concentration images, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-157605, 2015-157607, 2015-157712, and 2015-157713, all filed Aug. 7, 2015, which are hereby incorporated by reference herein in their entirety.

What is claimed is:
1. A recording apparatus comprising:
 a recording head including a recording element row where a plurality of recording elements configured to generate energy to discharge ink are arrayed in a predetermined direction;
 a scanning unit configured to execute
  a first scan of the recording head over a unit region on a recording medium, K (K≥1) times in a first direction following an intersecting direction intersecting the predetermined direction, and
  a second scan of the recording head over the unit region, L (L≥1) times in a second direction opposite to the first direction;
 a generating unit configured to generate recording data stipulating discharge or non-discharge of ink, as to each of a plurality of pixel regions within the unit region, in each of K+L scans by the scanning unit, based on image data that corresponds to an image to be recorded in the unit region and stipulates a plurality of combinations of number of times of discharge of ink to each of the plurality of pixel regions, and K+L mask patterns corresponding to the K+L scans by the scanning unit;
 a time-division driving unit configured to
  perform time-division driving of a plurality of recording elements corresponding to the unit region following first driving order in the K first scans, and perform time-division driving of a plurality of recording elements corresponding to the unit region following a second driving order, that is different from an opposite order to the first driving order, in the L second scans; and a control unit configured to effect control to discharge ink to the unit region by driving the plurality of recording elements by the time-division driving unit, based on the recording data generated by the generating unit, in the K+L scans by the scanning unit, wherein, disposed in the K+L mask patterns are at least
first recording permitted pixels regarding which discharge of ink is permitted in a case where the number of times of discharge of ink indicated by the image data is N (N≥1) times or more,
second recording permitted pixels regarding which discharge of ink is permitted in a case where the number of times of discharge of ink indicated by the image data is M (M>N) times or more, but not permitted to discharge ink if less than M times, and
recording non-permitted pixels not permitted to discharge ink regardless of the number of times of discharge of ink indicated by the image data, and wherein, of the pixel regions corresponding to the first recording permitted pixels in the L mask patterns corresponding to the L times of second scans, the number of pixels adjacent on both sides in the intersecting direction to pixel regions that correspond to the first recording permitted pixels in the K mask patterns corresponding to the K times of first scans, is larger than the number of pixels not adjacent on both sides in the intersecting direction to pixel regions that correspond to the first recording permitted pixels in the K mask patterns corresponding to the K times of first scans.

2. The recording apparatus according to claim 1, wherein N=1.

3. The recording apparatus according to claim 2, wherein M=2.

4. The recording apparatus according to claim 1, wherein the second driving order is different from an opposite order of the first driving order that has been offset.

5. The recording apparatus according to claim 4, wherein the second driving order is the same driving order as the first driving order.

6. The recording apparatus according to claim 1, wherein the scanning unit alternately performs the first scan and the second scan as to the unit region.

7. The recording apparatus according to claim 1, wherein K=L.

8. The recording apparatus according to claim 1, further comprising:
an acquisition unit configured to acquire gradation data that corresponds to an image to be recorded in the unit region, and that sets a gradation value as to a pixel group region made up of a plurality of the pixel regions,
wherein the generating unit further includes
a first generating unit configured to generate the image data based on the gradation data, and a dot arrangement pattern setting the number of times and positions of ink discharge to each of the plurality of pixel regions within the pixel group region in accordance with the gradation value, and
a second generating unit configured to generate the recording data based on the image data generated by the first generating unit, and the K+L mask patterns.

9. The recording apparatus according to claim 8,
wherein the dot arrangement pattern, corresponding to a gradation value that is next smallest as to a smallest gradation value that the image data is capable of reproducing, sets positions for discharge of ink where, of pixel regions regarding which at least one discharge of ink is set, the number of the pixel regions adjacent in the intersecting direction to other pixel regions regarding which at least one discharge of ink is set, is larger than the number of the pixel regions not adjacent in the intersecting direction to other pixel regions regarding which at least one discharge of ink is set.

10. The recording apparatus according to claim 9,
wherein the recording head includes
a first recording element row where a plurality of recording elements configured to generate energy to discharge a first type of ink are arrayed in a predetermined direction, and
a second recording element row where a plurality of recording elements configured to generate energy to discharge a second type of ink, that is different from the first type of ink, are arrayed in the predetermined direction,
and wherein the first dot arrangement pattern corresponding to the gradation value that is next smallest as to the smallest gradation value and also corresponding to the first type of ink, and a second dot arrangement pattern corresponding to the gradation value that is next smallest as to the smallest gradation value and also corresponding to the second type of ink, discharge the first and second types of ink at positions different from each other.

11. The recording apparatus according to claim 10,
wherein the generating unit generates the recording data such that the number of two dots adjacent in the predetermined direction that are recorded by the first type of ink and the second type of ink by scans in different directions, is larger than the number of two dots adjacent in the predetermined direction that are recorded by the first type of ink and the second type of ink by scans in the same direction.

12. The recording apparatus according to claim 1,
wherein the scanning unit executes the first scan K times and the second scan L times in each of
a first unit region where the first scan is first performed, and
a second unit region where the second scan is first performed and that is adjacent to the first unit region in the predetermined direction,
and wherein the generating unit generates the recording data such that the predetermined pixel region in a case of recording in the first unit region and the predetermined pixel region in a case of recording in the second unit region are situated at different positions in the intersecting direction.

13. The recording apparatus according to claim 1,
wherein each of the K+L mask patterns include at least
K+L first mask pattern portions, and
K+L second mask pattern portions obtained by offsetting each of the K+L first mask pattern portions,
and wherein a first logical sum pattern portion obtained as the logical sum of the K first mask pattern portions corresponding to the K first scans, out of the K+L first mask pattern portions, and a second logical sum pattern portion obtained as the logical sum of the K second mask pattern portions corresponding to the K first scans, out of the K+L second mask pattern portions, are the same form as each other.

14. The recording apparatus according to claim 1, wherein pixel regions corresponding to the first recording permitted pixels in the L mask patterns corresponding to the L times of second scans are each adjacent in the intersecting direction with pixel regions corresponding to the first recording permitted pixels in the K mask patterns corresponding to the K times of first scans.

15. The recording apparatus according to claim 1, wherein, of the pixel regions corresponding to the first recording permitted pixels in the L mask patterns corresponding to the L times of second scans, the number of the pixel regions at the same position as the pixel regions corresponding to the second recording permitted pixels in the K mask patterns corresponding to the K times of first scans, is larger than the number of the pixel regions at different positions as the pixel regions corresponding to the second recording permitted pixels in the K mask patterns corresponding to the K times of first scans.

16. The recording apparatus according to claim 15, wherein pixel regions corresponding to the first recording permitted pixels in the L mask patterns corresponding to the L times of second scans are each at the same position as pixel regions corresponding to the second recording permitted pixels in the K mask patterns corresponding to the K times of first scans.

17. A recording method of recording using a recording head including a recording element row where a plurality of recording elements configured to generate energy to discharge ink are arrayed in a predetermined direction, the method comprising:

executing
a first scan of the recording head over a unit region on a recording medium, K (K≥1) times in a first direction following an intersecting direction intersecting the predetermined direction, and
a second scan of the recording head over the unit region, L (L≥1) times in a second direction opposite to the first direction;

generating recording data stipulating discharge or non-discharge of ink, as to each of a plurality of pixel regions within the unit region, in each of K+L scans, based on image data that corresponds to an image to be recorded in the unit region and stipulates a plurality of combinations of number of times of discharge of ink to each of the plurality of pixel regions, and K+L mask patterns corresponding to the K+L scans;

performing
time-division driving of a plurality of recording elements corresponding to the unit region following first driving order in the K first scans, and
time-division driving of a plurality of recording elements corresponding to the unit region following a second driving order, that is different from an opposite order to the first driving order, in the L second scans; and controlling, to discharge ink to the unit region by driving the plurality of recording elements, based on the generated recording data, in the K+L scans, wherein, disposed in the K+L mask patterns are at least
first recording permitted pixels regarding which discharge of ink is permitted in a case where the number of times of discharge of ink indicated by the image data is N (N≥1) times or more,
second recording permitted pixels regarding which discharge of ink is permitted in a case where the number of times of discharge of ink indicated by the image data is M (M>N) times or more, but not permitted to discharge ink if less than M times, and
recording non-permitted pixels not permitted to discharge ink regardless of the number of times of discharge of ink indicated by the image data, and wherein, of the pixel regions corresponding to the first recording permitted pixels in the L mask patterns corresponding to the L times of second scans, the number of pixels adjacent on both sides in the intersecting direction to pixel regions that correspond to the first recording permitted pixels in the K mask patterns corresponding to the K times of first scans, is larger than the number of pixels not adjacent on both sides in the intersecting direction to pixel regions that correspond to the first recording permitted pixels in the K mask patterns corresponding to the K times of first scans.

* * * * *